(12) United States Patent  (10) Patent No.: US 8,774,983 B2
Perry et al.  (45) Date of Patent: Jul. 8, 2014

(54) TOWBARLESS AIRPLANE TUG
(71) Applicant: Israel Aerospace Industries LTD., Lod (IL)
(72) Inventors: Arie Perry, Hod Hasharon (IL); Ran Braier, Shoham (IL)
(73) Assignee: Israel Aerospace Industries Ltd., Lod (IL)
( * ) Notice: Subject to any disclaimer, the term of this patent is extended or adjusted under 35 U.S.C. 154(b) by 0 days.
(21) Appl. No.: 13/796,989
(22) Filed: Mar. 12, 2013
(65) Prior Publication Data
US 2013/0238214 A1    Sep. 12, 2013

Related U.S. Application Data
(63) Continuation of application No. 13/130,364, filed as application No. PCT/IL2009/001110 on Nov. 25, 2009, now Pat. No. 8,515,594.

(30) Foreign Application Priority Data

Nov. 25, 2008 (IL) .......................................... 195505
May 25, 2009 (IL) .......................................... 198950

(51) Int. Cl.
*B64F 1/10* (2006.01)
*G06F 11/30* (2006.01)
*B64F 1/22* (2006.01)
*B60S 13/00* (2006.01)
(52) U.S. Cl.
CPC . *B64F 1/227* (2013.01); *B64F 1/22* (2013.01); *B64F 1/10* (2013.01); *G06F 11/30* (2013.01); *Y02T 50/826* (2013.01); *B60S 13/00* (2013.01)
USPC ................................................ 701/2; 244/50
(58) Field of Classification Search
CPC .............. B64F 1/227; B64F 1/22; B64F 1/10; G06F 11/30; Y02T 50/826; B60S 13/00
USPC .......... 701/2, 23, 517; 244/50, 197; 180/14.7, 180/904, 11, 14.1, 14.4, 167; 416/426, 429; 280/477, 508
See application file for complete search history.

(56) References Cited

U.S. PATENT DOCUMENTS 2,539,010 A    1/1951    Cox
(Continued)

FOREIGN PATENT DOCUMENTS

CN    2458238 Y    11/2001
(Continued)

OTHER PUBLICATIONS

International Search Report from International Application No. PCT/IL2007/001172 mailed May 14, 2008.
(Continued)

*Primary Examiner* — Marthe Marc-Coleman
(74) *Attorney, Agent, or Firm* — Dorsey & Whitney LLP

(57) ABSTRACT

In an embodiment, a towbarless airplane tug configured for receiving a landing gear of an airplane and towing the airplane thereby at an actual speed is disclosed. The towbarless airplane tug includes a chassis configured for receiving thereon at least a portion of the landing gear, and a propulsion arrangement configured to move the towbarless airplane tug in a direction along a trajectory. The towbarless airplane tug further includes a controller configured to compare between the actual speed of the towbarless airplane tug, when towing the airplane, and a predetermined desired speed thereof, and to direct the propulsion arrangement to maintain the actual speed of the towbarless airplane tug if: the actual speed is lower than the desired speed, and the actual speed was maintained within a predefined speed range during a predefined period that preceded the comparing.

14 Claims, 46 Drawing Sheets

(56) References Cited

U.S. PATENT DOCUMENTS

| | | | |
|---|---|---|---|
| 2,751,990 A | 6/1956 | Finlay et al. |
| 2,957,650 A | 10/1960 | Hornan et al. |
| 2,966,222 A | 12/1960 | Lambert, Jr. |
| 3,064,746 A | 11/1962 | Williamson et al. |
| 3,279,722 A | 10/1966 | Glover, Jr. et al. |
| 4,007,890 A | 2/1977 | Bremer et al. |
| 4,036,384 A | 7/1977 | Johnson |
| 4,113,041 A | 9/1978 | Birkeholm |
| 4,122,960 A | 10/1978 | Bauer et al. |
| 4,225,279 A | 9/1980 | Boyer |
| 4,237,994 A | 12/1980 | McColl |
| 4,375,244 A | 3/1983 | Morin |
| 4,482,961 A | 11/1984 | Kilner et al. |
| 4,632,625 A | 12/1986 | Schuller et al. |
| 4,658,924 A | 4/1987 | Dobbie |
| 4,730,685 A | 3/1988 | Sinkkonen |
| 4,745,410 A | 5/1988 | Schuller et al. |
| 4,810,157 A | 3/1989 | Schopf |
| 4,836,734 A | 6/1989 | Pollner et al. |
| 4,842,220 A | 6/1989 | Versteeg |
| 4,911,603 A | 3/1990 | Pollner et al. |
| 4,911,604 A | 3/1990 | Pollner et al. |
| 4,913,253 A | 4/1990 | Bowling |
| 4,917,563 A | 4/1990 | Pollner et al. |
| 4,917,564 A | 4/1990 | Pollner et al. |
| 4,923,253 A | 5/1990 | Pollner et al. |
| 4,950,121 A | 8/1990 | Meyer et al. |
| 4,976,499 A | 12/1990 | Guichard et al. |
| 4,994,681 A | 2/1991 | Mann |
| 4,997,331 A | 3/1991 | Grinsted et al. |
| 5,013,205 A | 5/1991 | Schardt |
| 5,048,625 A | 9/1991 | Birkeholm |
| 5,051,052 A | 9/1991 | Franken et al. |
| 5,054,714 A | 10/1991 | Franken et al. |
| 5,078,340 A | 1/1992 | Anderberg |
| 5,082,082 A | 1/1992 | Hvolka |
| 5,110,067 A | 5/1992 | Sinkkonen |
| 5,151,003 A | 9/1992 | Zschoche |
| 5,176,341 A | 1/1993 | Ishikawa et al. |
| 5,202,075 A | 4/1993 | Barnard et al. |
| 5,219,033 A * | 6/1993 | Pollner et al. ................ 180/14.6 |
| 5,259,572 A | 11/1993 | Franken et al. |
| 5,261,778 A | 11/1993 | Zschoche |
| 5,302,074 A | 4/1994 | Elfstrom |
| 5,302,075 A | 4/1994 | Zschoche |
| 5,302,076 A | 4/1994 | Bammel et al. |
| 5,308,212 A | 5/1994 | Pollner et al. |
| 5,314,287 A | 5/1994 | Wichert |
| 5,346,354 A | 9/1994 | Hellstrom |
| 5,381,987 A | 1/1995 | Carns |
| 5,480,274 A | 1/1996 | Franken et al. |
| 5,511,926 A | 4/1996 | Iles |
| 5,516,252 A | 5/1996 | Francke et al. |
| 5,549,436 A | 8/1996 | Fresia |
| 5,562,388 A | 10/1996 | Le Gall et al. |
| 5,655,733 A | 8/1997 | Roach |
| 5,680,125 A | 10/1997 | Elfstrom et al. |
| 5,860,785 A | 1/1999 | Eberspacher |
| 6,209,671 B1 | 4/2001 | Klein et al. |
| 6,283,696 B1 | 9/2001 | Trummer et al. |
| 6,301,529 B1 | 10/2001 | Itoyama et al. |
| 6,305,484 B1 | 10/2001 | Leblanc |
| 6,305,848 B1 * | 10/2001 | Gregory ........................ 385/53 |
| 6,352,130 B2 | 3/2002 | Klein et al. |
| 6,352,318 B1 | 3/2002 | Hosomi et al. |
| 6,357,989 B1 | 3/2002 | Iles |
| 6,390,762 B1 | 5/2002 | Peery et al. |
| 6,405,975 B1 | 6/2002 | Sankrithi et al. |
| 6,543,790 B2 | 4/2003 | Johnson |
| 6,600,992 B2 | 7/2003 | Dow |
| 6,675,920 B1 | 1/2004 | Diez et al. |
| 6,739,822 B2 | 5/2004 | Johansson |
| 6,751,588 B1 | 6/2004 | Menendez-Pidal et al. |
| 6,923,281 B2 | 8/2005 | Chernoff et al. |
| 6,945,354 B2 | 9/2005 | Goff |
| 7,975,959 B2 | 7/2011 | Perry et al. |
| 8,181,725 B2 | 5/2012 | Andres et al. |
| 8,245,980 B2 | 8/2012 | Perry et al. |
| 2002/0173904 A1 | 11/2002 | Dow |
| 2003/0047362 A1 | 3/2003 | Chernoff et al. |
| 2003/0095854 A1 | 5/2003 | Abela |
| 2005/0196256 A1 | 9/2005 | Rodenkirch et al. |
| 2006/0056949 A1 | 3/2006 | Eckert |
| 2006/0278756 A1 | 12/2006 | Marshall |
| 2008/0083851 A1 | 4/2008 | Perry et al. |
| 2009/0183499 A1 | 7/2009 | Boorse |
| 2010/0140392 A1 | 6/2010 | Perry et al. |
| 2011/0224845 A1 | 9/2011 | Perry et al. |
| 2012/0061521 A1 | 3/2012 | Perry et al. |
| 2012/0119018 A1 | 5/2012 | Perry et al. |
| 2012/0310482 A1 | 12/2012 | Decoux et al. |

FOREIGN PATENT DOCUMENTS

| | | | |
|---|---|---|---|
| CN | 1511759 A | 7/2004 |
| DE | 3327628 | 2/1985 |
| DE | 3327629 | 2/1985 |
| DE | 3521429 | 12/1986 |
| DE | 3534045 | 4/1987 |
| DE | 3928854 | 3/1991 |
| DE | 4007610 | 9/1991 |
| DE | 4009419 | 9/1991 |
| DE | 4102861 | 8/1992 |
| DE | 4131649 | 3/1993 |
| DE | 4324211 | 1/1995 |
| DE | 4340919 | 3/1995 |
| DE | 4446047 | 7/1996 |
| DE | 4446048 | 7/1996 |
| DE | 3844744 | 5/1997 |
| DE | 19734238 | 2/1998 |
| EP | 235845 | 9/1987 |
| EP | 649787 | 4/1995 |
| EP | 1190947 | 3/2002 |
| EP | 1574430 | 9/2005 |
| EP | 1623924 | 2/2006 |
| EP | 1634808 | 3/2006 |
| FR | 2581965 | 11/1986 |
| FR | 2675919 | 10/1992 |
| FR | 2675919 A1 * | 10/1992 ................ B64F 1/22 |
| FR | 2911658 | 7/2008 |
| GB | 1249465 | 10/1971 |
| JP | 56002237 | 1/1981 |
| JP | 57070741 | 5/1982 |
| JP | 2279497 | 11/1990 |
| JP | 4138997 | 5/1992 |
| JP | 2001-505512 | 4/2001 |
| JP | 2003189412 | 7/2003 |
| RU | 2271316 | 3/2006 |
| RU | 2302980 | 7/2007 |
| WO | 85/00790 | 2/1985 |
| WO | 89/03343 | 4/1989 |
| WO | 90/11932 | 10/1990 |
| WO | 93/13985 | 7/1993 |
| WO | WO 98/25822 | 6/1998 |
| WO | 98/52822 | 11/1998 |
| WO | 2004/028903 | 4/2004 |
| WO | 2004/114252 | 12/2004 |
| WO | 2008/038270 | 4/2008 |
| WO | 2008/139437 | 11/2008 |
| WO | 2008/139440 | 11/2008 |
| WO | 2010/012261 | 2/2010 |
| WO | 2010/061384 | 6/2010 |
| WO | 2011/101782 | 8/2011 |

OTHER PUBLICATIONS

International Search Report from International Application No. PCT/IL2008/000036 mailed Oct. 14, 2008.

International Search Report from International Application No. PCT/IL2008/00459 mailed Nov. 6, 2008.

(56) References Cited

OTHER PUBLICATIONS

International Search Report from International Application No. PCT/IL2009/001110 mailed Oct. 26, 2010.

International Search Report from International Application No. PCT/IB2011/050626 mailed Jul. 1, 2011.

International Search Report from International Application No. PCT/IL2012/050357 mailed Mar. 11, 2013.

* cited by examiner

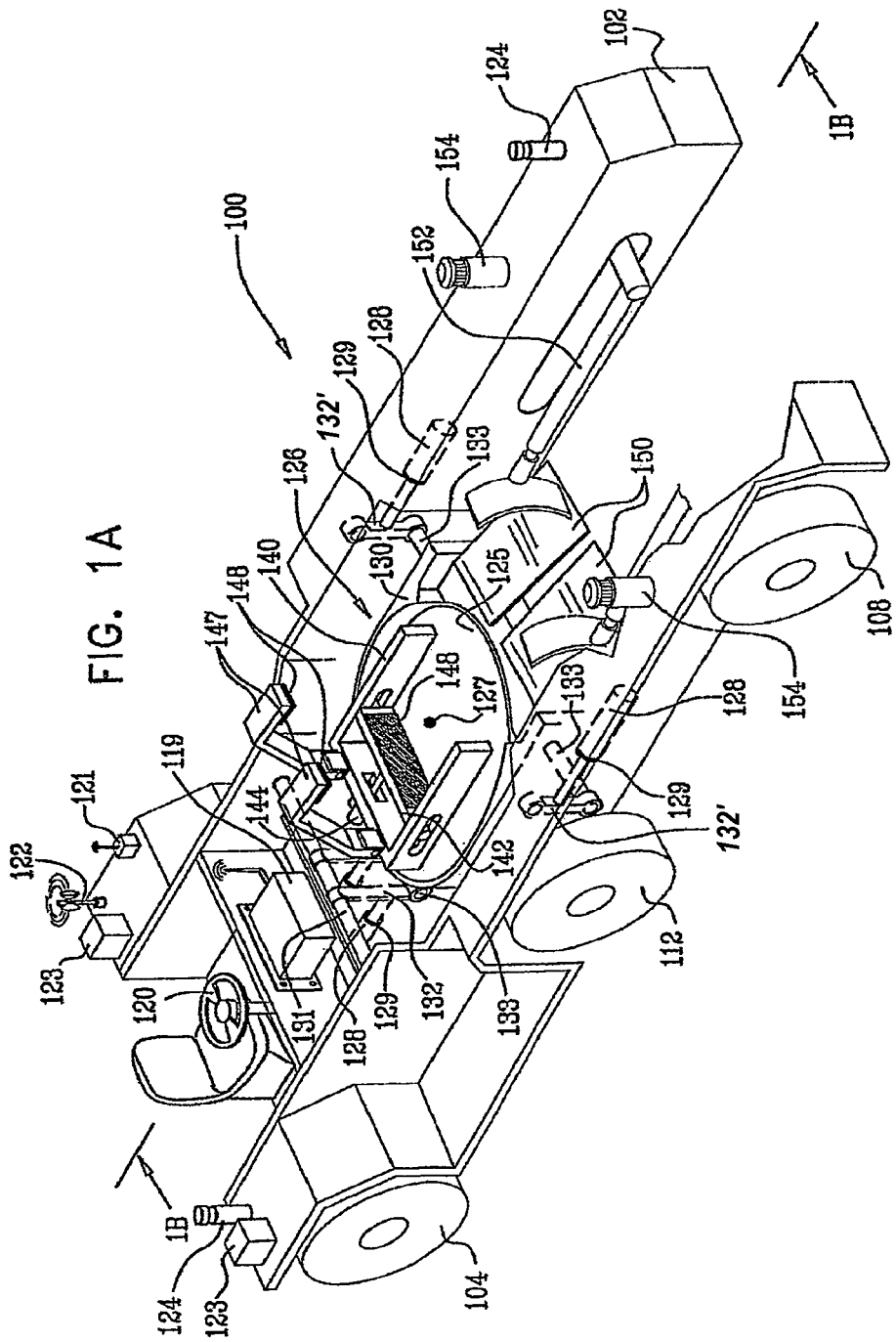

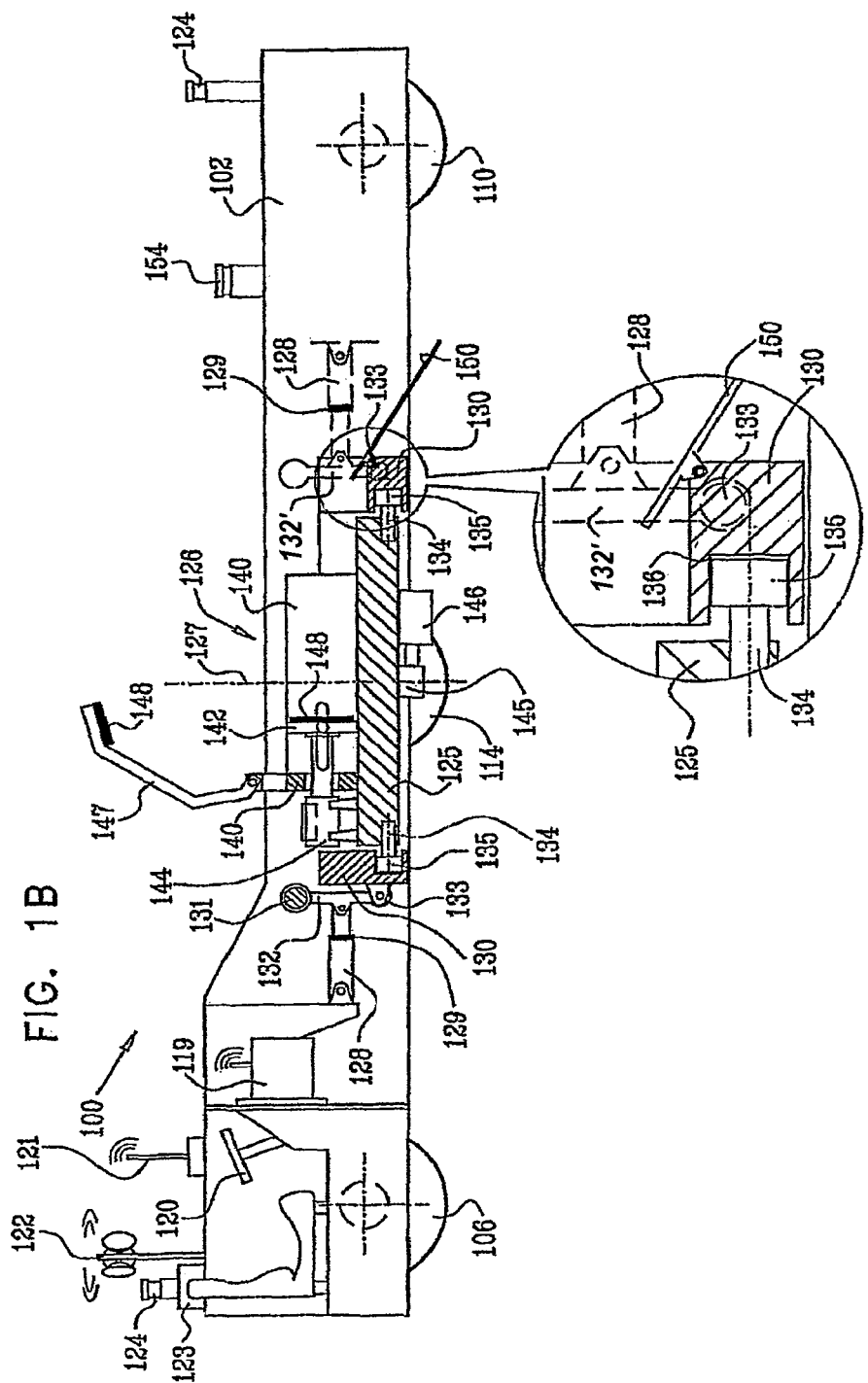

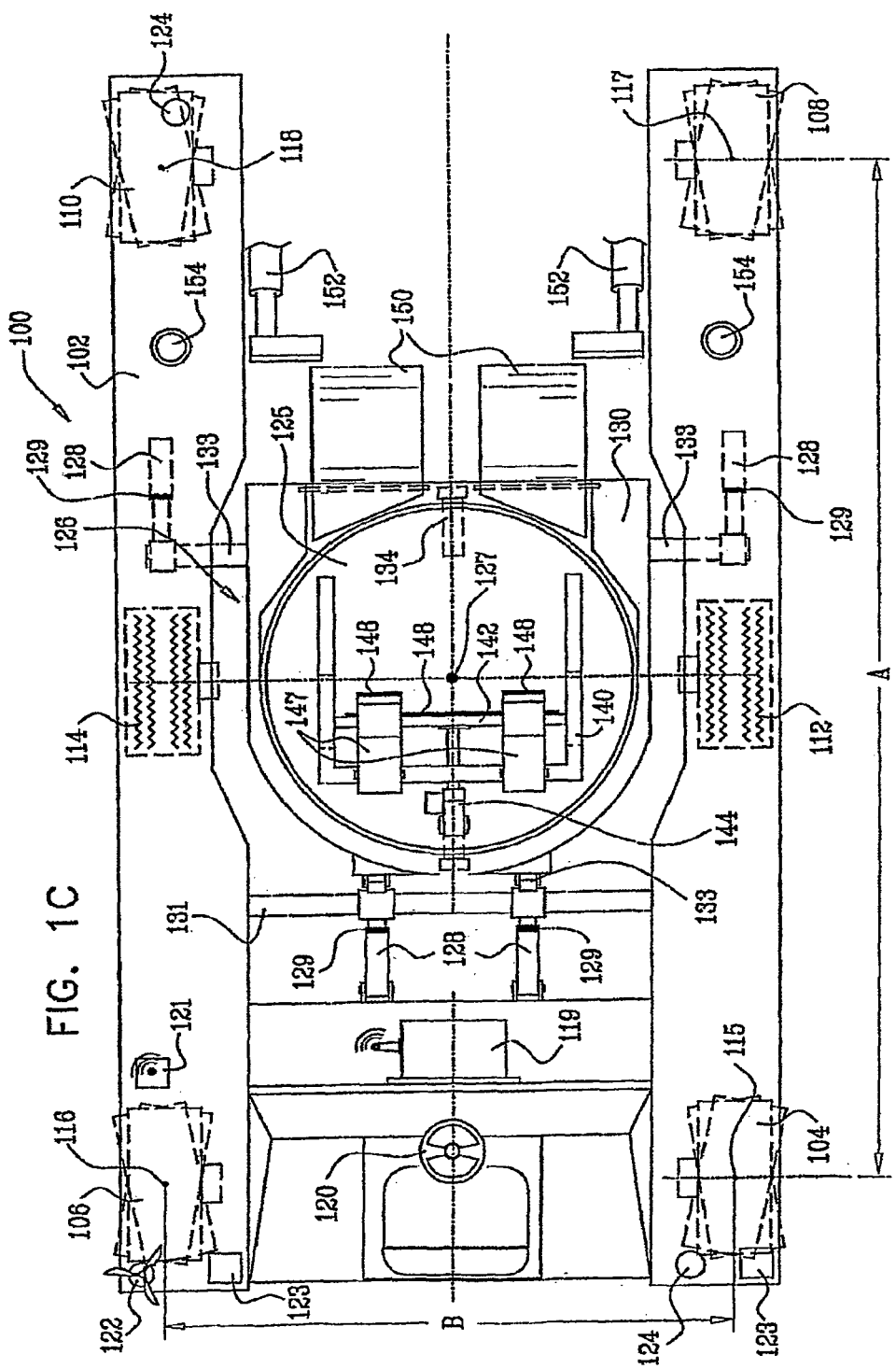

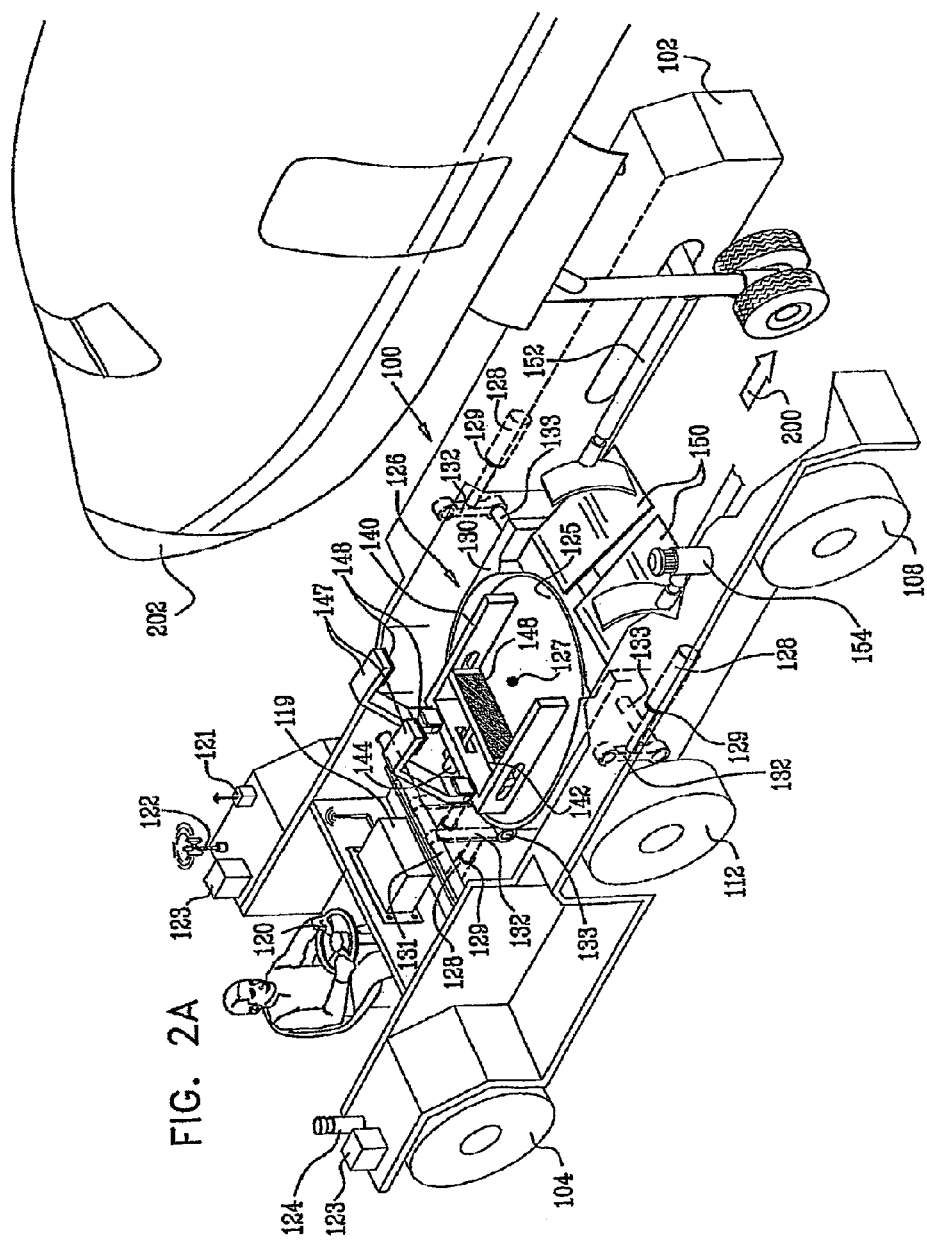

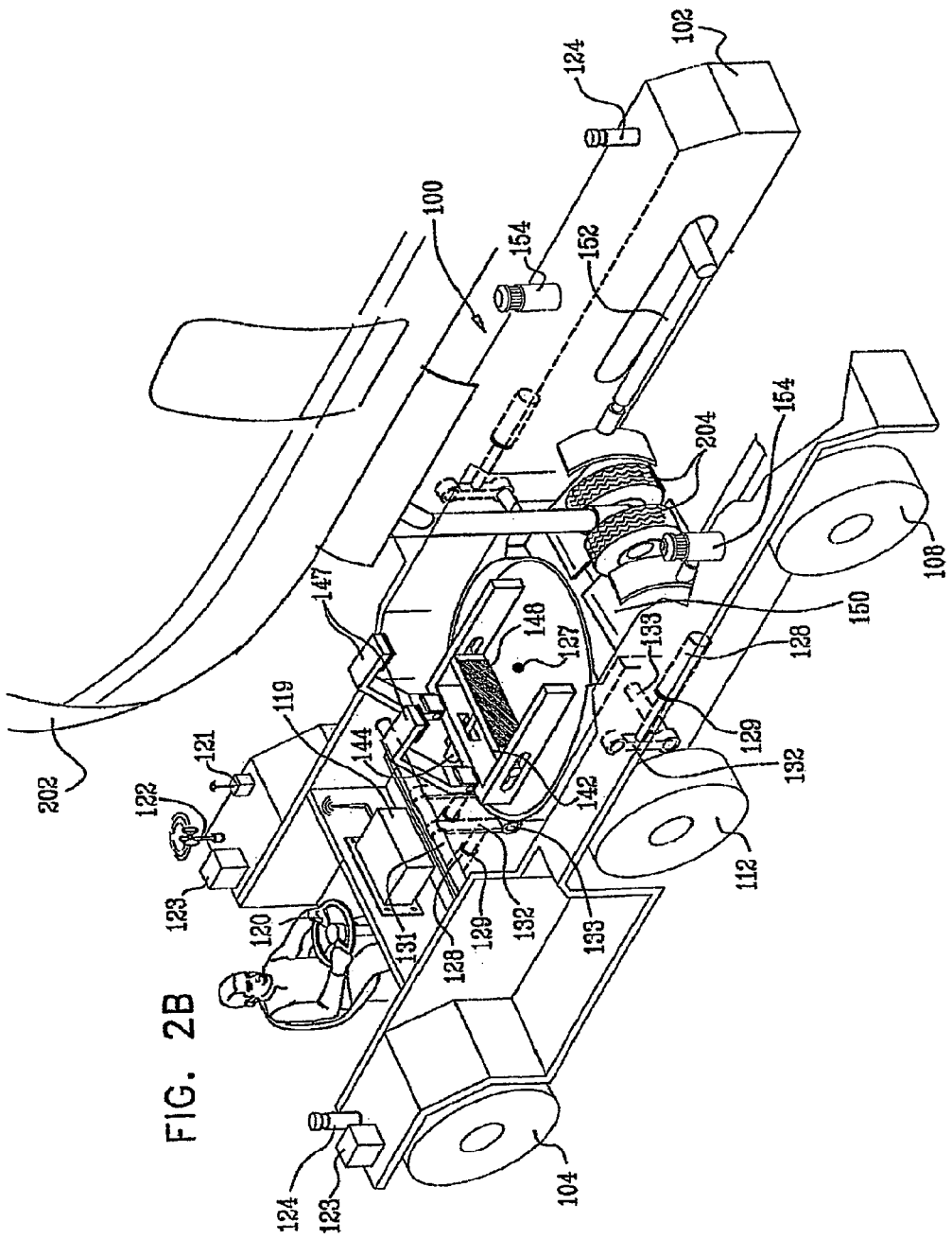

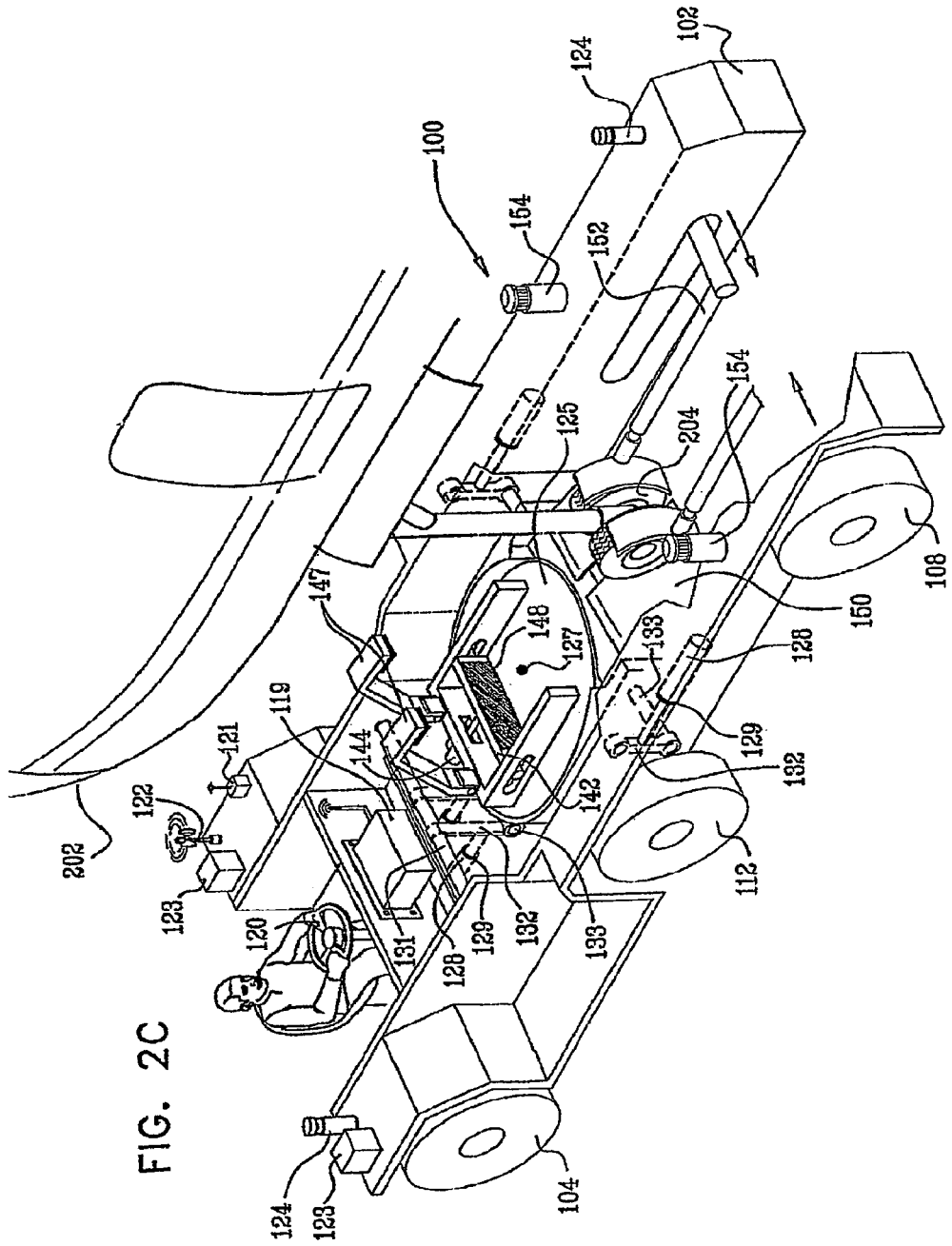

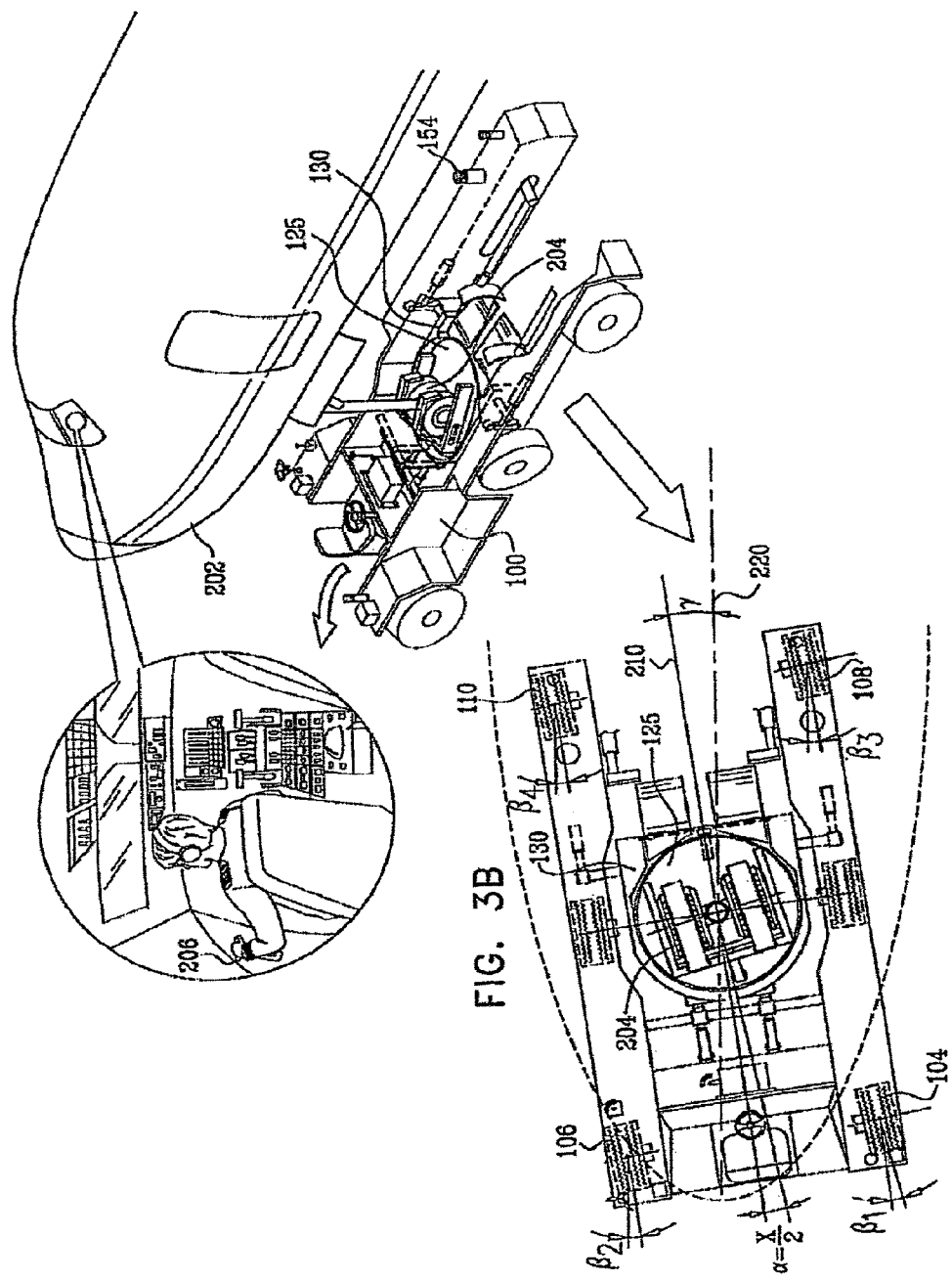

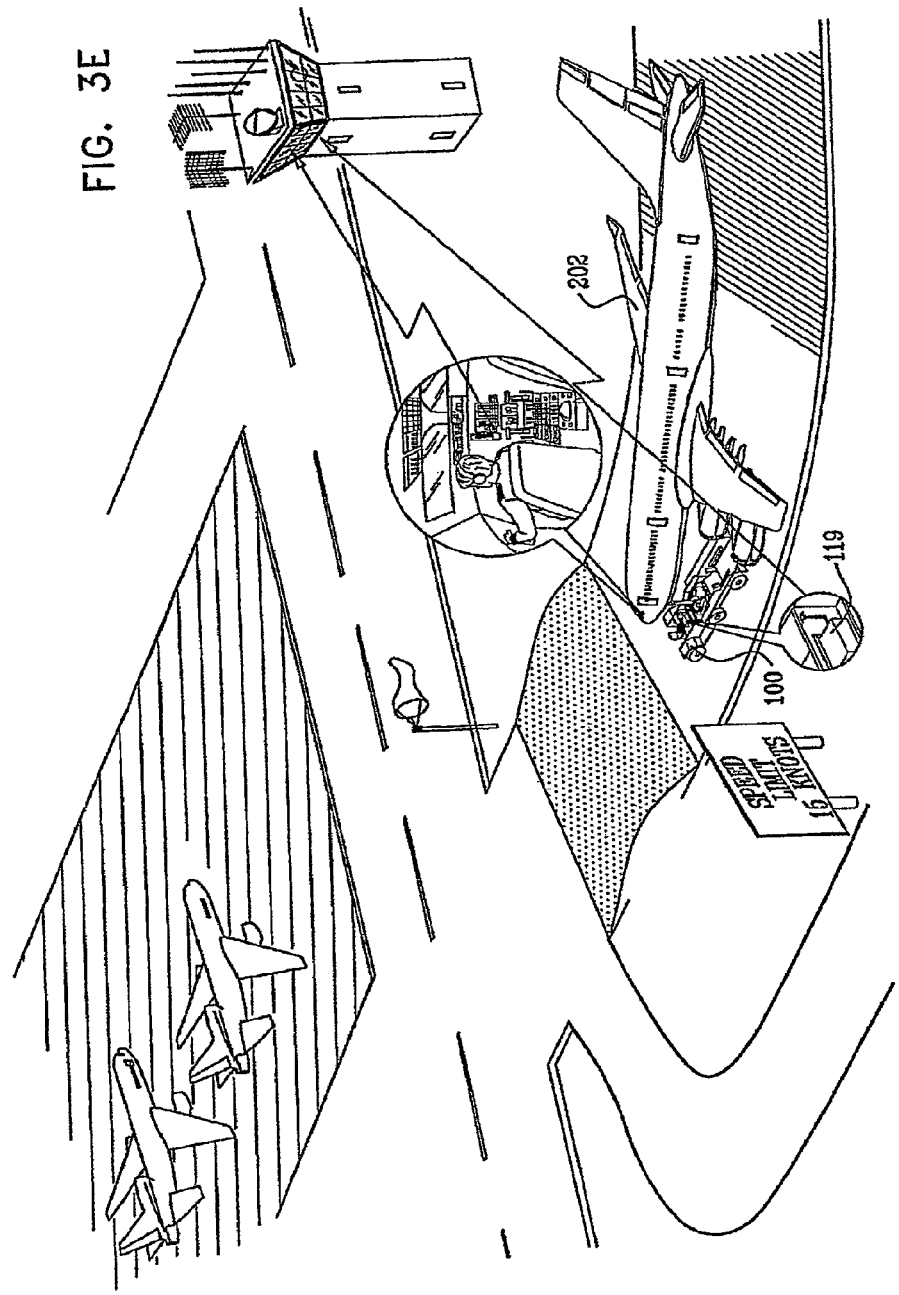

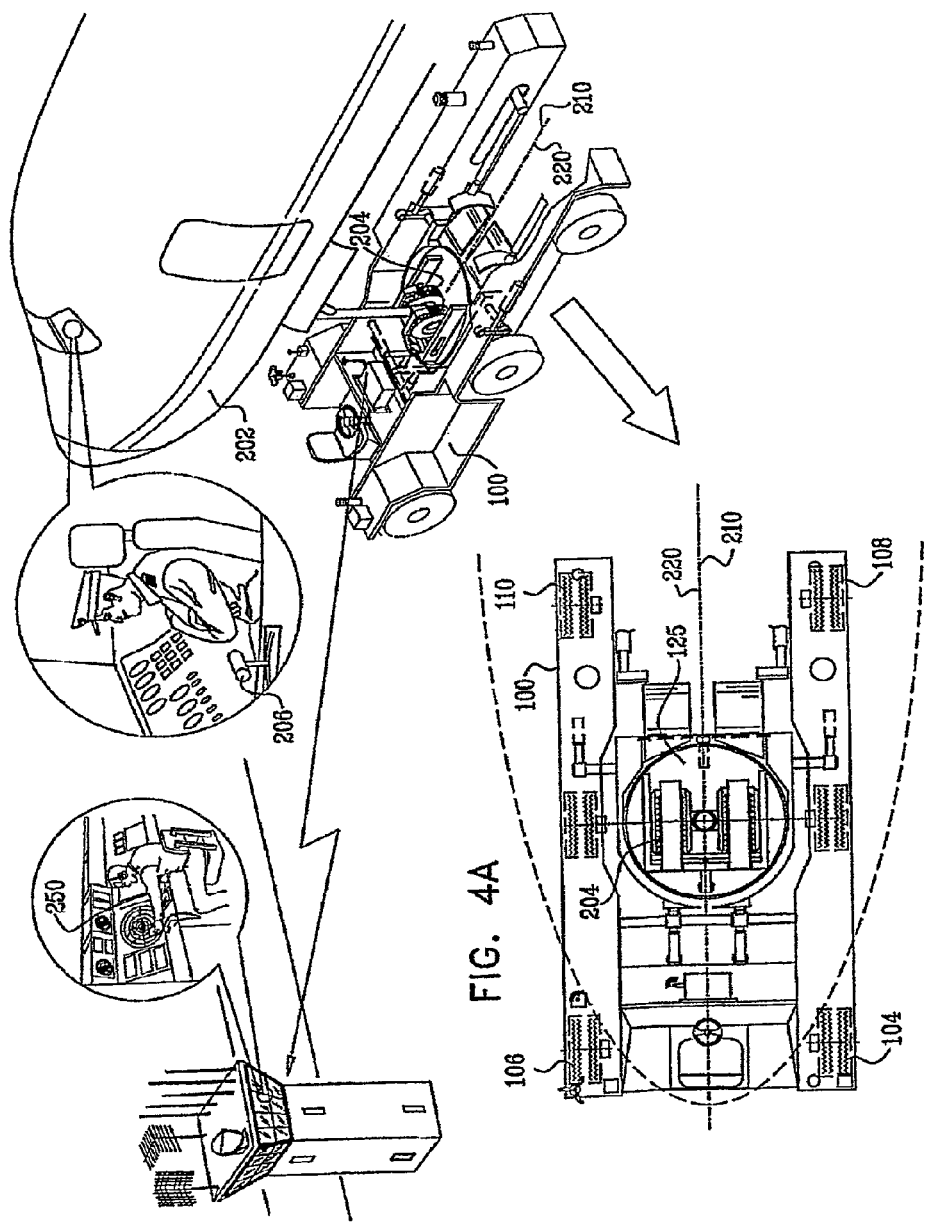

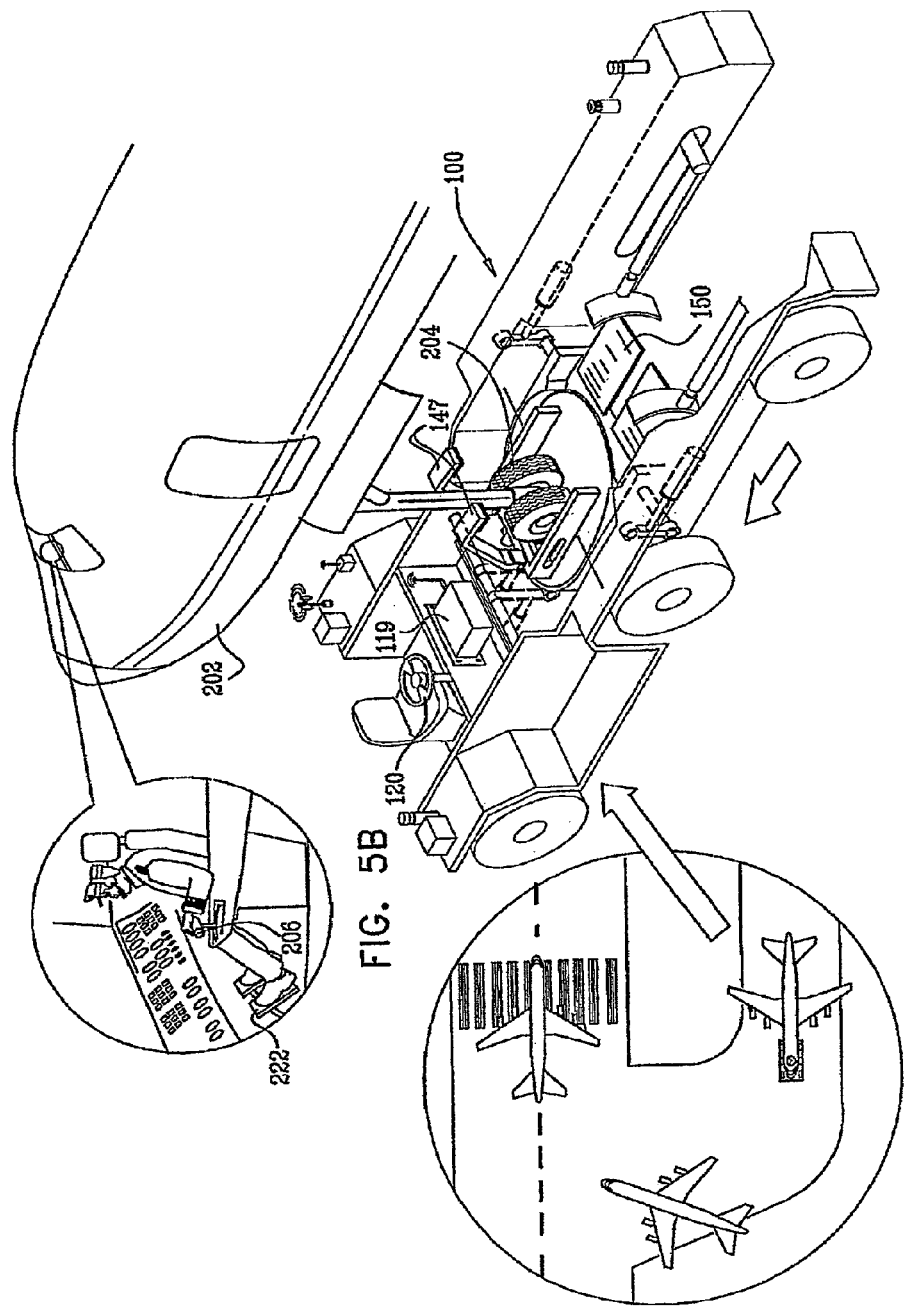

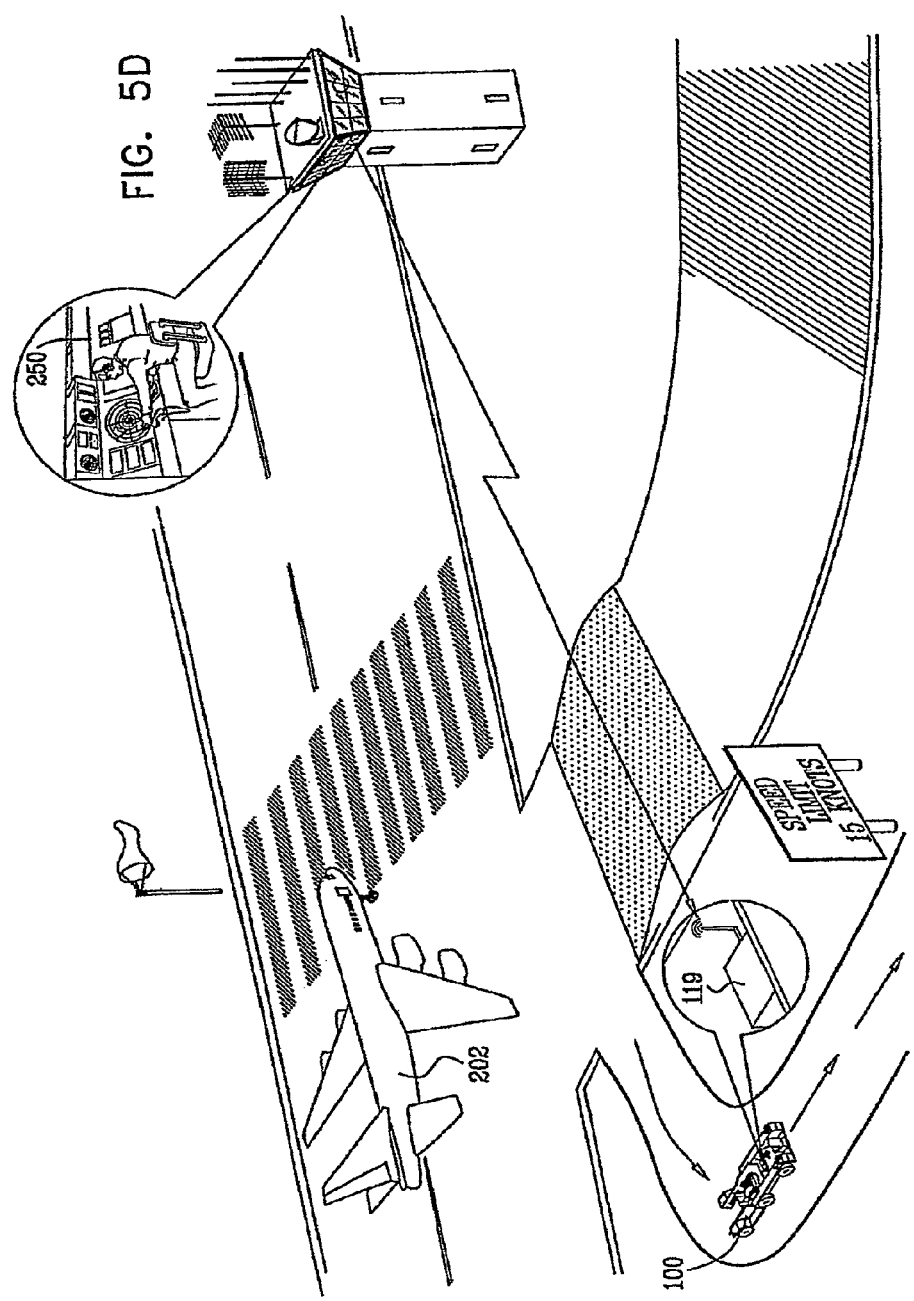

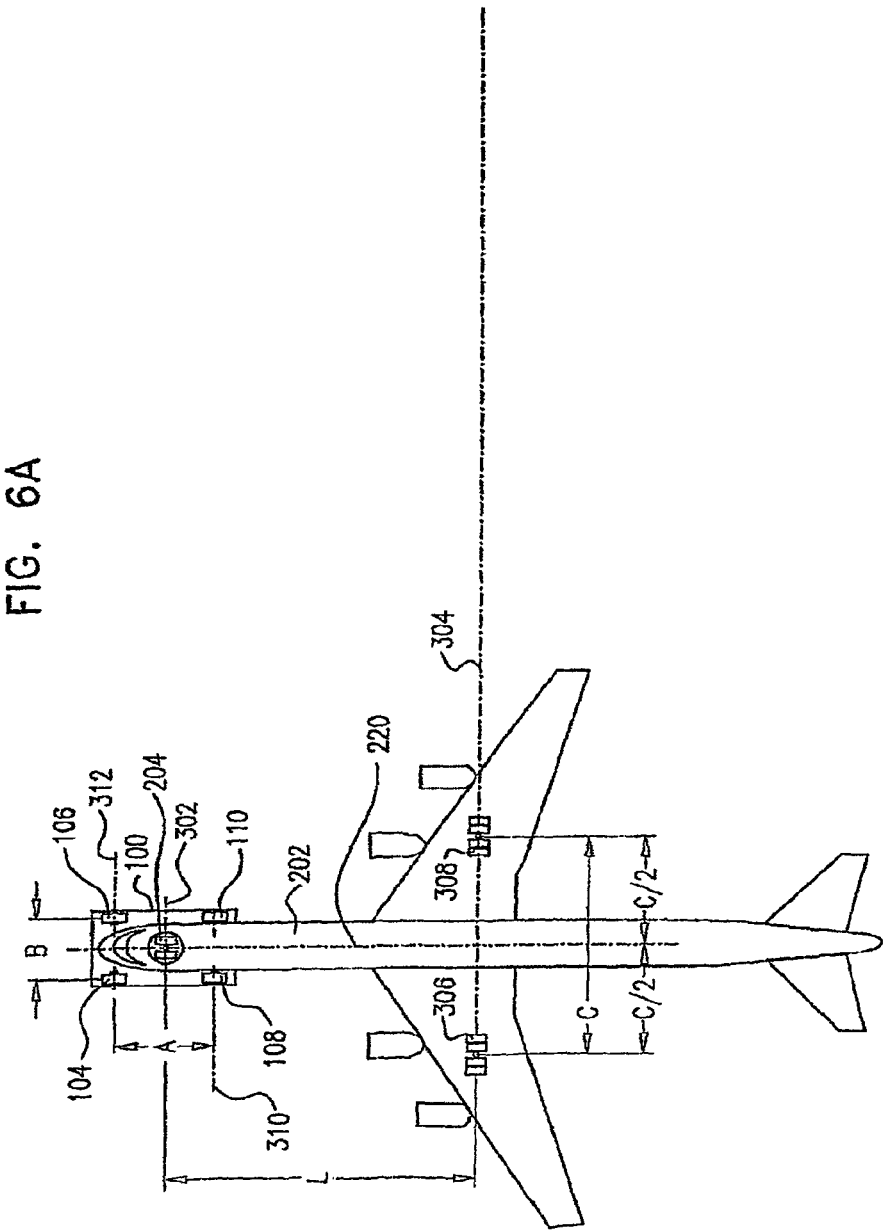

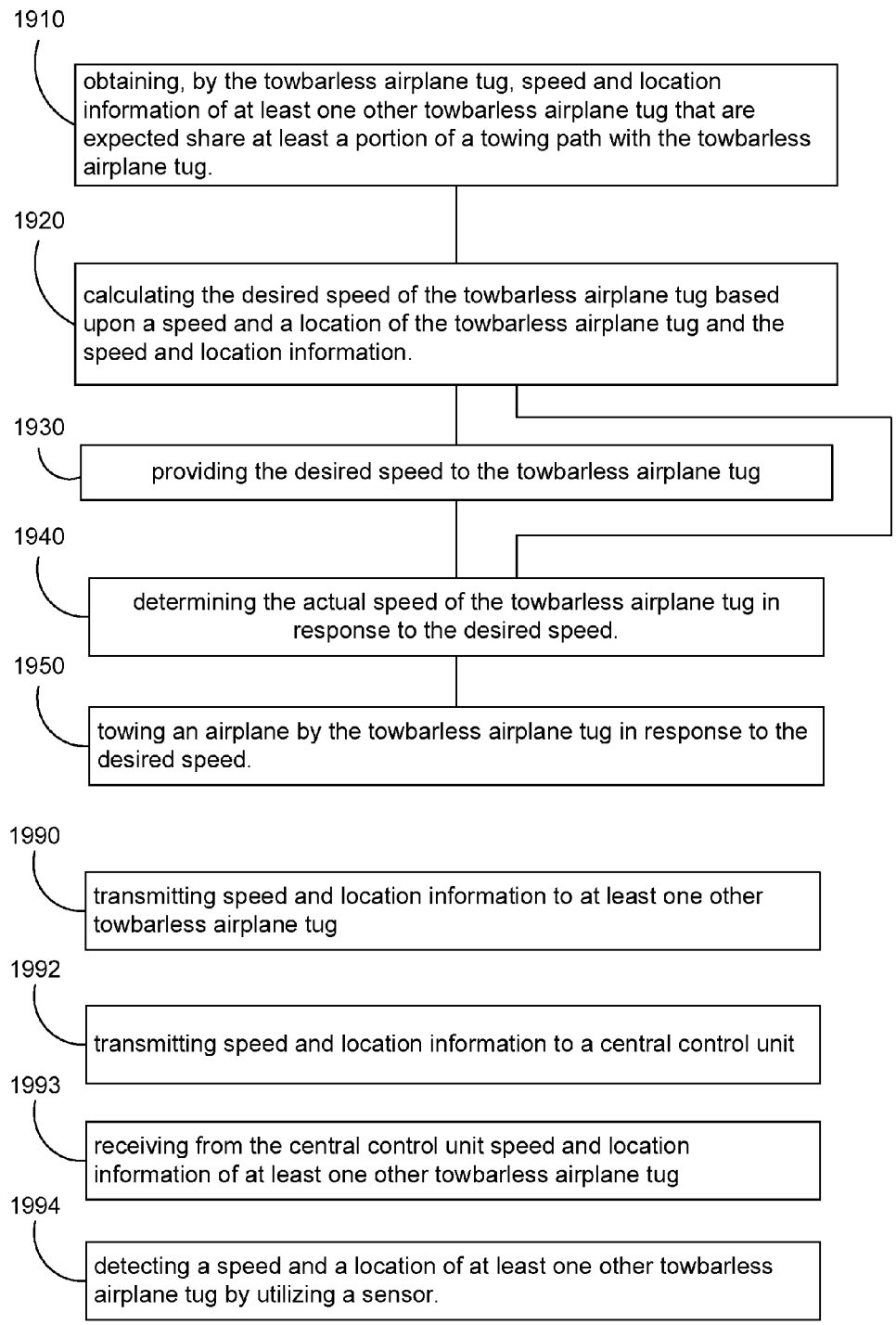
Fig.17      1900

TOWBARLESS AIRPLANE TUG

CROSS-REFERENCE TO RELATED APPLICATIONS

This application is a continuation of U.S. application Ser. No. 13/130,364 filed on 20 May 2011, which is a U.S. Nationalization of PCT International Application No. PCT/IL2009/001110 filed 25 Nov. 2009, which claims priority to Israel Application No. 195505 filed 25 Nov. 2008 and Israel Application No. 198950 filed 25 May 2009, the contents of each of the foregoing applications are incorporated herein, in their entirety, by this reference.

FIELD OF THE INVENTION

The present invention relates generally to systems for airplane ground movement, and more particularly to control methods of ground vehicles of such systems.

BACKGROUND OF THE INVENTION

Airplane tugs are often provided for towing airplanes between ground locations at an airport, thus obviating the need for the airplane to move itself under its own power, saving jet fuel. The tugs may be provided with a towbar, which connects a landing gear with the tug, or towbarless, in which a towbar is not provided, in which, typically, the landing gear sits directly on the chassis of the tug.

SUMMARY OF THE INVENTION

According to one aspect of the present invention, there is provided a towbarless airplane tug configured for receiving a landing gear of an airplane and towing it thereby, the tug comprising:
  a chassis configured for receiving thereon at least a portion of the landing gear;
  a propulsion arrangement configured to move the tug in a direction along a trajectory and comprising a variable angle swash plate hydraulic pump coupled to a variable angle swash plate hydraulic motor and to a controllable bypass path valve, configured such that a hydraulic fluid circulates between the pump and the motor so as to activate the propulsion arrangement to increase at least one of the speed and the traction force of the tug when the bypass path is in a closed state, and at least most of the hydraulic fluid circulates across the motor via the bypass path valve so as to reduce at least one of a rotational speed and traction force of the tug when the bypass path is in a opened state;
  at least one force sensor configured to measure, directly or indirectly, a force exerted by the chassis on the landing gear in at least the direction due to a speed differential between the tug and the airplane; and
  a controller in communication with the force sensor and being configured to alter one or more parameters of movement of the tug such that the force exerted by the chassis on the landing gear is maintained (for example, during movement of the tug) below a predetermined value by regulating at least the power available to the propulsion arrangement, the pump and motor swashplates, and the state of the bypass path valve.

It will be appreciated that the term "towbarless" as used herein the specification and claims relates to a class of airplane tugs without a towbar (i.e., a bar or other connecting device which couples between the chassis of a tug and the landing gear of the airplane). In a towbarless airplane tug, the landing gear typically sits directly on the chassis, or its weight is directed to an area within the chassis.

It will further be appreciated that the term "controller" as used herein the specification and claims is to be understood in its broadest terms, including, but not being limited to, two or more controllers, for example each one performing a specific function.

The towbarless airplane tug may further comprise a hydraulic motor cross valve to allow a free flow of hydraulic fluid across the motor, for free tug movement, when the bypass path is closed.

The bypass path may be associated with a brake period following opening of the bypass path wherein hydraulic fluid is diverted from the swash plate pump, the controller being further configured to control the state of the bypass path, the valve being characterized by a response period that is much smaller than the brake period.

The propulsion driving module may further comprise a valve which controls the state of the bypass path, the valve being characterized by a response period that is much smaller than a resonance period of the swash plates of the hydraulic pump and motor.

The controller may be configured to regulate displacement of the hydraulic motor.

The controller may be configured to regulate a control angle of the swash plate pump. In this way, it may control the speed of the tug and the force applied on the landing gear of the airplane thereby.

The controller may be configured to induce fast changes in the control angle of the swash plate pump. This allows it to prevent a force applied on the landing gear of the airplane from exceeding a force threshold.

The controller may be configured to induce slow changes in the control angle of the swash plate pump. For example, this may be useful to bring the towbarless airplane tug to a desired speed.

The controller may be configured to utilize a feed-forward process (i.e., a form of control in which upsets in inputs to the system can be used to adjust the system devices in anticipation of or simultaneously with the arrival of those upsets) to regulate the control angle of the swash plate pump.

The towbarless airplane tug may further comprise energy absorbers arranged to absorb energy between the landing gear and the chassis.

The altering of the one or more parameters of movement may have an effect so as to and/or be directed to cause the tug to reduce its speed and/or traction force.

The chassis may comprise a support assembly configured for the receiving of the portion of the landing gear and being mounted on the chassis such that it is moveable thereon at least in the direction. In such a case, the force sensor may be configured to measure the force exerted by the support assembly on the chassis in at least the direction.

The parameters of movement may be selected from a group comprising speed, direction, acceleration, and deceleration.

The controller may be configured to calculate a (predicted) resultant force exerted by the chassis on the landing gear at least based on one or more external factors. The external factors may be selected from a group comprising:
  data relating to slopes at various locations along an airplane travel surface to be traversed by the tug;
  data relating to wind forces affecting the airplane and tug;
  data relating to rolling friction forces of the airplane and or tug at various locations along the airplane travel surface; and
  data relating to obstacles.

The data relating to slopes may be provided by an inclination sensing functionality.

The data relating to slopes may be predetermined and stored as slope date in a database, the controller being further configured to determine the position of the tug on the airplane travel surface and to relate the slope data to the position.

The data relating to rolling friction forces may be predetermined and stored as friction date in a database, the controller being further configured to determine the position of the tug on the airplane travel surface and to relate the friction data to the position.

The tug may be configured to detect obstacles along the airplane path.

The controller may be configured to communicate wirelessly with a remote command center, for example via an electronic flight bag.

The towbarless airplane tug may further comprise an electronic flight bag configured to communicate wirelessly with a similar device within the airplane.

According to another aspect of the present invention, there is provided a method for towing an airplane, the method comprising providing a towbarless airplane tug comprising:
 a chassis configured for receiving thereon at least a portion of a landing gear of the airplane; and
 a propulsion arrangement configured to move the tug in a direction along a trajectory and comprising a variable angle swash plate hydraulic pump coupled to a variable angle swash plate hydraulic motor and to a controllable bypass path valve, configured such that a hydraulic fluid circulates between the pump and the motor so as to activate the propulsion arrangement to increase at least one of the speed and the traction force of the tug when the bypass path is in a closed state, and at least most of the hydraulic fluid circulates across the motor via the bypass path valve so as to reduce at least one of a rotational speed and traction force of the tug when the bypass path is in a opened state;
the method further comprising causing the tug to tow the airplane while altering one or more parameters of movement of the tug such that a force exerted by the chassis on the landing gear is maintained below a predetermined value by regulating at least the power available to the propulsion arrangement, the pump and motor swash-plates, and the state of the bypass path valve.

The tug may be provided as described above.

According to a further aspect of the present invention, there is provided a towbarless airplane tug configured for receiving a landing gear of an airplane and towing it thereby, the tug comprising:
 a chassis configured for receiving thereon at least a portion of the landing gear;
 a propulsion arrangement configured to move the tug in a direction along a trajectory; and
 a controller configured to compare between an actual speed of a towbarless airplane tug and a predetermined desired speed thereof, and to direct the propulsion arrangement to maintain the actual speed of the towbarless airplane tug if:
  the actual speed is lower than the desired speed; and
  the actual speed was maintained within a predefined speed range during a predefined period that preceded the comparing.

The controller may be further configured to detect airplane pilot-controlled braking and deceleration of the airplane, and is further configured to direct the propulsion arrangement to maintain the actual speed if:
 the actual speed is higher than the desired speed; and
 at least one of an airplane pilot-controlled braking and deceleration of the airplane is detected.

The controller may be further configured to direct the propulsion arrangement to change the actual speed of the towbarless airplane tug to match the desired speed if an airplane pilot-controlled braking is detected.

The towbarless airplane tug may be further configured to apply a positive traction force at all times during a towing of the airplane.

The towbarless airplane tug may be further configured to protect in real time the landing gear from exceeding its maximum allowed fatigue load.

The controller may be further configured to calculate the desired speed.

The controller may be further configured to calculate a desired traction force corresponding to the desired speed.

The controller may be further configured to calculate the desired speed at least based upon a location of the tug.

The controller may be further configured to calculate the desired speed at least based upon a location of the tug and a location of at least one other tug.

The controller may be further configured to calculate the desired speed at least based upon a location of the tug and a location and a speed of at least one other tug that shares at least one path therewith.

The controller may be further configured to calculate the desired speed at least based upon a location of the tug and a desired time of arrival thereof at an end of towing location.

The controller may be further configured to calculate the desired speed at least based upon a location of the tug, an estimated time of arrival of another tug at an end of towing point, and a desired time of arrival of the tug at the end of towing location.

The towbarless airplane tug may further comprise a transmitter configured to transmit information relating to speed and location of the tug. This information may be transmitted, e.g., to an airplane cockpit, to at least one other tug, or a remote command center.

The towbarless airplane tug may further comprise a receiver configured to receive information relating to speed and location of at least one other tug from a remote command center.

The towbarless airplane tug may further comprise a detector configured to detect a speed and a location of at least one other tug by utilizing a sensor; the controller being configured to calculate the desired speed at least based upon the speed and location of the other tug.

The controller may be further configured to calculate the desired speed based upon a desired time of arrival at an end of towing location and an estimated time of arrival of the other tug at an end of towing point.

According to a still further aspect of the present invention, there is provided a method for controlling a towbarless airplane tug, the method comprising:
 obtaining information relating to speed and location of at least one other tug that is expected to share at least a portion of a towing path with the tug; and
 calculating the desired speed of the tug at least based upon the speed and location thereof and the information.

The method may further comprise calculating the desired speed based upon desired time of arrival of the tug at an end of towing location.

The method may further comprise calculating the desired speed of the towbarless airplane tug based upon an estimated time of arrival of the one other tug at an end of towing point.

The method may further comprise transmitting information relating to speed and location of the tug to the other tug.

The method may further comprise transmitting information relating to speed and location of the tug to a remote command center and receiving there from information relating to speed and location information of the other tug.

The tug may obtain the information relating to speed and location of at least one other tug utilizing a sensor.

According to a still further aspect of the present invention, there is provided a towbarless airplane tug configured for receiving a landing gear of an airplane and towing it thereby, the tug comprising:
- a chassis configured for receiving thereon at least a portion of the landing gear;
- a propulsion arrangement configured to move the tug in a direction along a trajectory; and
- a controller configured to operate as per the above.

BRIEF DESCRIPTION OF THE DRAWINGS

The present invention will be understood and appreciated more fully from the following detailed description, taken in conjunction with the drawings in which:

FIG. 1A is a pictorial illustration of a towbarless airplane tug;

FIG. 1B is a cross-sectional view of the towbarless airplane tug illustrated in FIG. 1A, taken along the lines 1B-1B;

FIG. 1C is a top view of the towbarless airplane tug illustrated in FIG. 1A;

FIGS. 2A through 2J are perspective views of various stages of pre-pushback and pushback operations of the towbarless airplane tug illustrated in FIG. 1A;

FIGS. 3A through 3E illustrate various stages of pilot controlled taxiing operation of the towbarless airplane tug illustrated in FIG. 1A;

FIGS. 4A through 4E illustrate various stages of autonomous taxiing operation of the towbarless airplane tug illustrated in FIG. 1A;

FIGS. 5A through 5E illustrate various stages of the autonomous return operation of the towbarless airplane tug illustrated in FIG. 1A;

FIGS. 6A through 6C diagrammatically illustrate steering functionality of the towbarless airplane tug illustrated in FIG. 1A;

FIG. 17 illustrates a method for controlling a towbarless airplane tug.

DETAILED DESCRIPTION

Figure 2D:
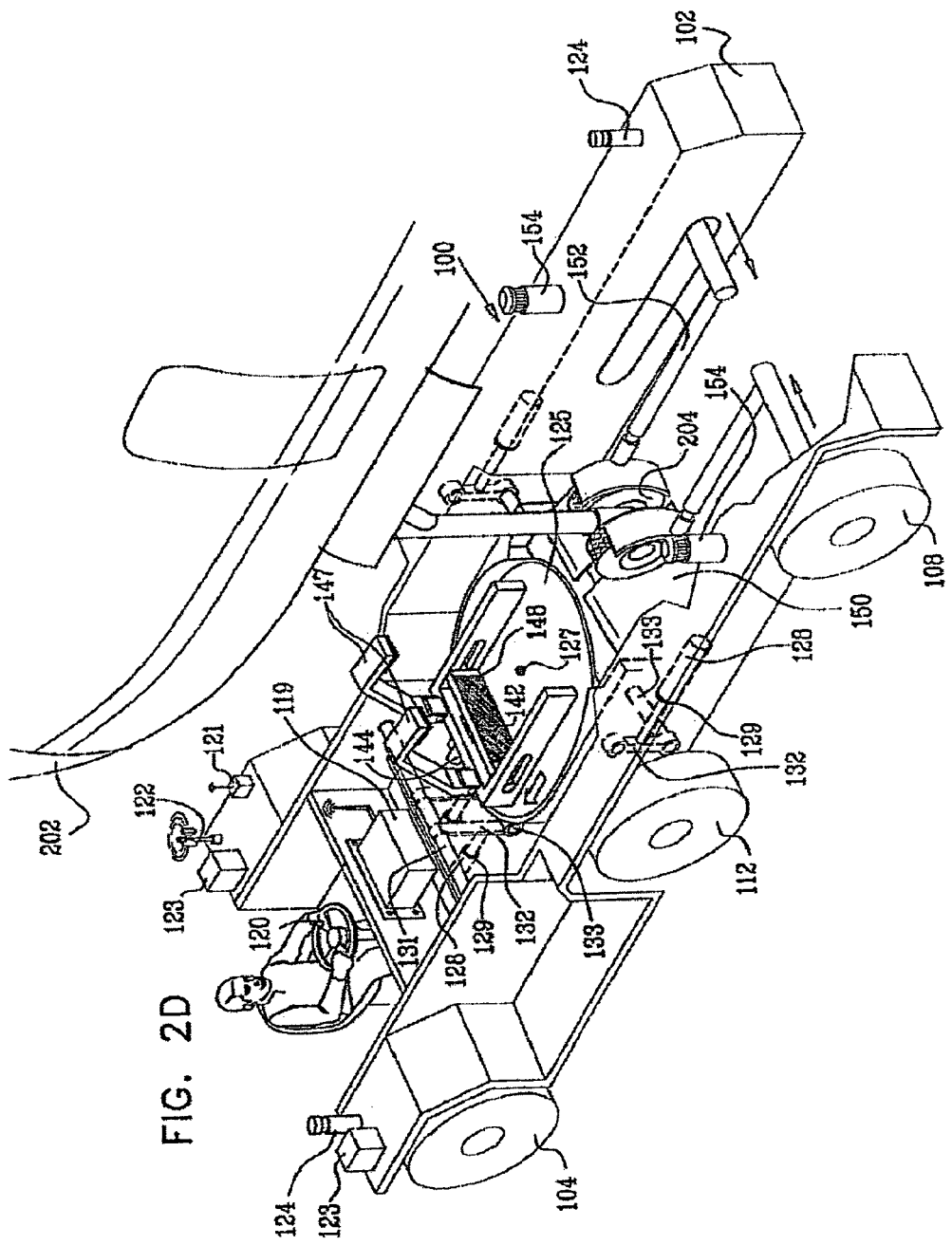

A control system for a robotic or a semi-robotic tug for taxiing airplanes from an airport gate to a take-off runway is provided. The tug is designed for taxiing the airplane without using the airplane's jet engines, in order to save fuel consumption and minimize pollution. The controller thus has a dual function, namely controlling in real time and at all times the tug towing speed (thus replacing the airplane engine), and regulating the tug traction force (thus protecting the airplane's landing gear, e.g., the nose landing gear, or NLG, by not exceeding its static and fatigue load limits, and thus not impacting its life cycle. Accordingly, a multi input, multi output (MIMO) control concept, where some controlling and controlled variables are interconnected and dependent, is provided in order to direct operation of the controller.

The description provided herein relates to robotic or semi-robotic tugs for taxiing airplanes from a gate to a take-off runway without using the aircraft jet engines. The tugs may operate in an airplane pilot-controlled taxi mode, wherein the airplane pilot steers and brakes as if the airplane were moving under its own power, and the tug speed is controlled by its controller. Upon completion of taxiing, the tug may return autonomously to a pre-pushback location at the gate, controlled by an airport command and control system. A tug driver may perform the pushback operation, after which he leaves the tug and the airplane pilot controls the tug during taxi. The tug may operate in an autonomous mode of operation during airplane taxi. The term "autonomous" is used throughout in a broad sense to include operation under the control of an airport command, control and communication system, which may be subject to airplane pilot override.

Reference is now made to FIGS. 1A, 1B, and 1C, which illustrate a towbarless airplane tug 100. International publication WO 2008/139440, which is assigned to the assignee of the present application, teaches many principles which are applicable to the present disclosure, and the full content thereof are hereby incorporated by reference herein where appropriate for appropriate teachings of additional or alternative details, features and/or technical background. As seen in FIGS. 1A, 1B, and 1C, the towbarless airplane tug 100 comprises a chassis 102 supported on six wheels, including forward steerable wheels 104 and 106, rearward steerable wheels 108 and 110 and intermediate non-steerable wheels 112 and 114. It is appreciated that wheels 112 and 114 may alternatively be steerable as well. The centers of rotation of steerable wheels 104, 106, 108, and 110, respectively indicated by reference numerals 115, 116, 117. and 118, may define vertices of a rectangle, whose length A is defined by the separation between the centers of rotation of respective forward and rearward wheels on the same side of the tug 100, and whose width B is defined by the separation between the centers of rotation 115 and 116 of respective forward wheels 104 and 106 and between the centers of rotation 117 and 118 of respective rearward wheels 108 and 110.

Each of wheels 104, 106, 108, 110, 112, and 114 may be controllably driven by a corresponding hydraulic motor (not shown) powered by a corresponding hydraulic pump (not shown) driven by a vehicle diesel motor (not shown) in response to speed and torque control signals from a controller 119. Each of the steerable wheels 104, 106, 108, and 110 may be steerable by one or more steering pistons (not shown) in response to steering control signals from controller 119. The wheels, hydraulic pump, and diesel motor constitute portions of a propulsion arrangement which is configured to move the tug in a direction along a trajectory.

A driver control interface assembly, which may include a steering wheel 120, brakes (not shown), and optionally other controls as necessary, may interface with controller 119 to enable a driver to govern the operation of the towbarless airplane tug 100 prior to and during pushback, and/or in the event of an emergency or a tug control system malfunction. The towbarless airplane tug 100 may operate in an "airplane pilot-in-control" (PIC) mode, via controller 119 to taxi to or near a take-off point. Near the take-off point, the controller 119 automatically or manually (by the safety driver) disengages the tug 100 from the airplane, in response to a command received from an airport Command and Control Center or from a tug location sensor 121, such as a GPS sensor or any other suitable tug location sensor, and the tug 100 operates under control of controller 119, to return autonomously or manually driven by a safety driver from the take-off point to a desired pre-push back location. Tug 100 may also be equipped with a wind sensor 122, one or more obstacle detection sensors 123, such as radar and/or laser sensors, for example as sold under the name HDL-64E by Velodyne®, which output to controller 119, and one or more driving cameras 124, which enable remote driving of tug 100, such as by a remote command and control center. Driving cameras 124 may be rotatable to have selectable pan and tilt so as to enable an operator to view various locations on or near the tug 100.

A rotatable airplane landing gear wheel support assembly 125 is pivotably and rotatably mounted on a horizontal base assembly 126. The steady state center of rotation of the support assembly 125, designated by reference numeral 127, may be at the geometrical center of the rectangle defined by the centers of rotation 115, 116, 117, and 118 of respective steerable wheels 104, 106, 108, and 110.

Horizontal base assembly 126 is connected to the chassis 102 in a manner which allows a limited amount of freedom of movement thereof relative to the chassis, and is engaged by an energy absorber assembly which may comprise a plurality of energy absorbing pistons 128, each of which is pivotably coupled to the chassis 102 and to horizontal base assembly 126. Force sensors 129, which may be load cells, may be associated with each of energy absorbing pistons 128, which output to controller 119, and are used thereby in controlling vehicle acceleration and deceleration.

Horizontal base assembly 126 preferably comprises a circumferential base element 130, which is pivotably mounted onto chassis 102 by being suspended from a transversely extending support rod 131 on a pair of forward hanging supports 132, and suspended on a pair of rearward hanging supports 132' which are pivotably mounted onto chassis 102. Rearward hanging supports 132' are engaged by pivotably mounted energy absorbing pistons 128. Mounting of circumferential base element 130 onto rearward hanging supports 132' is preferably by means of pivotable axles 133, which may or may not be integrally formed with circumferential base element 130.

The support assembly 125 may be pivotably and rotatably mounted onto base 126 by a pair of pivot rods 134 extending outwardly therefrom into engagement with high load capacity bearings 135, which in turn, engage a 360° circumferential bearing race 136 formed in base 126. This arrangement provides both relatively low friction rotatability and tiltability of the support assembly 125 relative to the base element 130, the horizontal base assembly 126, and the chassis 102.

An upstanding frame 140 is fixedly mounted onto the support assembly 125 for aligning the airplane landing gear wheel on the support assembly. An airplane landing gear wheel stop bar 142 may be selectably positioned with respect to upstanding frame 140 by a stop bar positioning piston 144, anchored on the support assembly 125, for adapting the support assembly to different sizes of airplane landing gear wheels. The rotational orientation of the support assembly 125 may be sensed by a rotation sensor 145, such as a potentiometer, which provides a support assembly rotational orientation input to controller 119. Rotational orientation of the support assembly 125 may be governed by a support assembly rotation motor 146.

A selectably positionable clamp assembly 147 may be mounted on the support assembly 125 and connected to upstanding frame 140. The clamp assembly 147 is operative to selectably clamp airplane landing gear wheels onto the support assembly 125 such that the center of rotation of the airplane landing gear wheels lies, insofar as possible, exactly at the center of rotation 127 of the support assembly, which, as noted above, lies at the geometrical center of the rectangle defined by the centers of rotation of steerable wheels 104, 106, 108, and 110.

Force sensors 148, such as load cells, are mounted onto a forward facing surface of the clamp assembly 147 and onto a rearward facing surface of stop bar 142, so as to engage the airplane landing gear wheels to sense forces in the horizontal plane which are applied to airplane landing gear wheels and thus to the airplane landing gear, such as due to differences in acceleration, deceleration, and/or speed of the tug 100 relative to acceleration, deceleration, and/or speed of an airplane being towed thereby.

An inclined airplane landing gear wheel ramp 150 may be mounted onto base element 130. A pair of airplane landing gear wheel engaging piston assemblies 152 may be provided for pushing and lifting the airplane landing gear and positioning the airplane landing gear wheels onto the support assembly 125.

The force sensors 148 may be operative to sense forces applied to the landing gear in at least one generally horizontal direction along a trajectory of movement of the tug. This force may be the result of airplane pilot-controlled braking of the airplane, which produces tug deceleration, or of tug acceleration. The controller 119 is operative at least partially in response to an output of a force sensor indicating, inter alia, airplane pilot-controlled braking, resulting in deceleration of the airplane to provide speed and torque control signals to the hydraulic motors which drive the wheels of the tug 100. The control is such as to reduce and limit the force applied to the landing gear of the airplane, to a maximum allowed force which will not damage the landing gear of the airplane as a result of airplane pilot-controlled braking resulting in tug deceleration and/or acceleration.

The rotation sensor 145 may be operative to sense rotation of the support assembly 125 relative to base assembly 126, which is produced by airplane pilot steering via the landing gear of the airplane, and the controller 119 is operative to control steering of steerable wheels 104, 106, 108, and 110 based on the output of rotation sensor 145 and thus in response to airplane pilot steering commands.

The force sensors 129 and 148 may be operative to sense forces applied to the landing gear in at least one generally horizontal direction resulting such that the controller 119 is operative to control acceleration and deceleration of the tug by employing at least one force feedback loop utilizing an output of at least one force sensor, sensing pilot-controlled braking and at least one of the following inputs:

an indication of force induced by known slopes at various locations along an airplane travel surface traversed by the tug 100, the locations being identified to the controller by location sensing functionality;

an indication of wind forces applied to the airplane, information regarding the wind forces being supplied to the controller from airport and/or tug mounted wind sensors; and an indication of known tug and airplane rolling friction forces at various locations along the airplane travel surface traversed by the tug, the locations being identified to the controller by location sensing functionality.

The controller 119 may further be operative to control the speed of the tug 100 by employing at least one speed feedback loop based on known speed limits along a travel path traversed by the tug and the airplane, for example by utilizing a suitable airport map embedded in the controller 119, and an output of a tug location sensor, indicating the position of the tug 100 along the travel path of the tug 100 and the airplane.

A single or pair of laser range finders 154 may be mounted on the chassis 102 of the tug 100 for ascertaining the angular relationship between the longitudinal axis of the airplane and the longitudinal axis of the tug 100. The angular relationship between the longitudinal axis of the airplane and the longitudinal axis of the tug 100 may be employed in an autonomous taxiing mode of operation such as that described herein below in FIGS. 4A through 4E.

Figure 2E:
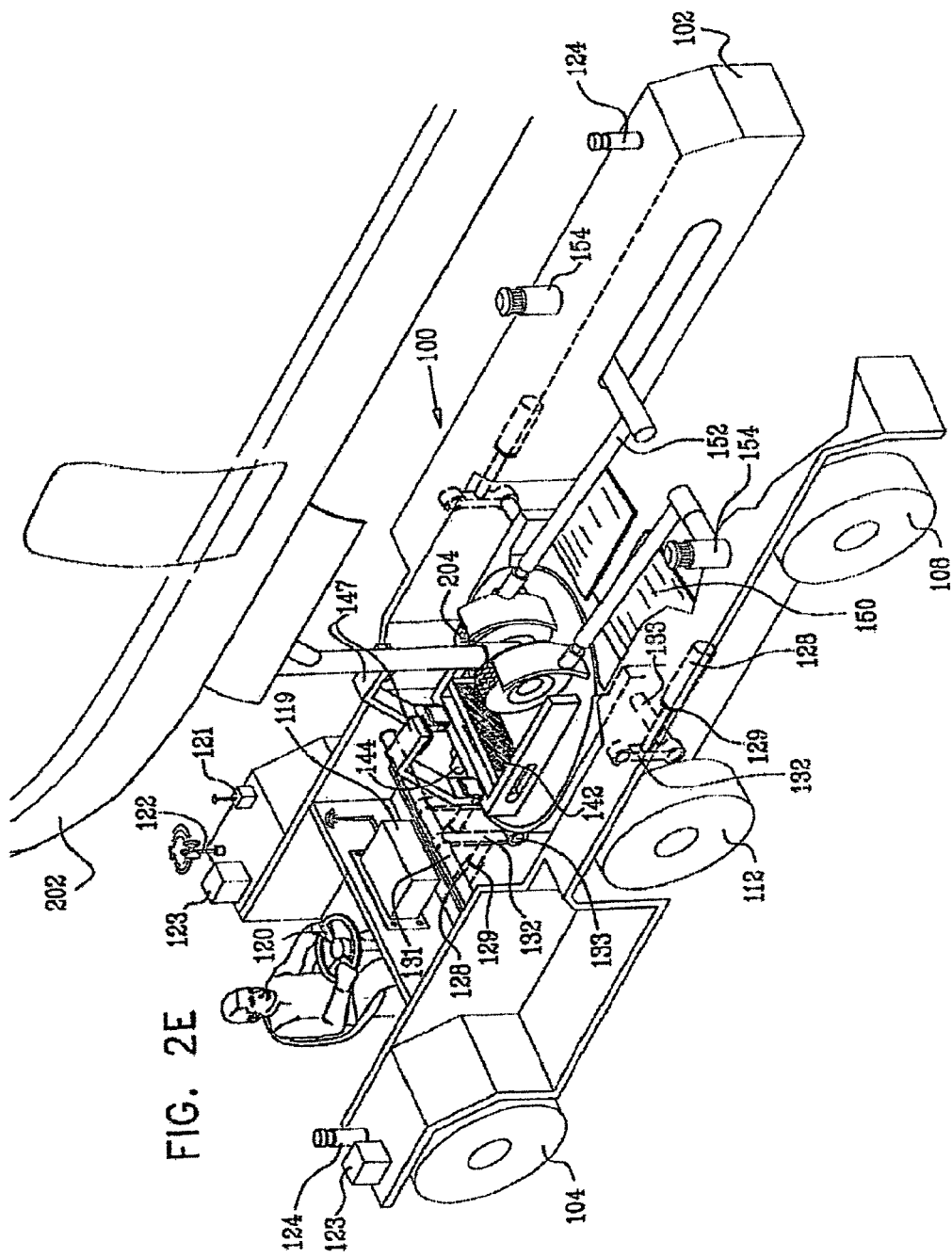

As seen in FIG. 2A, the tug 100 is moved, under the control of a tug driver, in a direction indicated by an arrow 200, towards an airplane 202 awaiting pushback. FIG. 2B illustrates the landing gear wheels 204 located on ramp 150. FIG. 2C illustrates landing gear wheel engaging piston assemblies 152 positioned in engagement with landing gear wheels 204 for pushing and lifting the airplane landing gear and positioning the airplane landing gear wheels onto the support assembly 125. FIG. 2D illustrates suitable positioning of airplane landing gear wheel stop bar 142 with respect to upstanding frame 140 by a stop bar positioning piston 144 to accommodate the specific airplane landing gear wheels 204 of the specific airplane 202. FIG. 2E illustrates landing gear wheels 204 being pushed onto the support assembly 125.

Figure 2F:
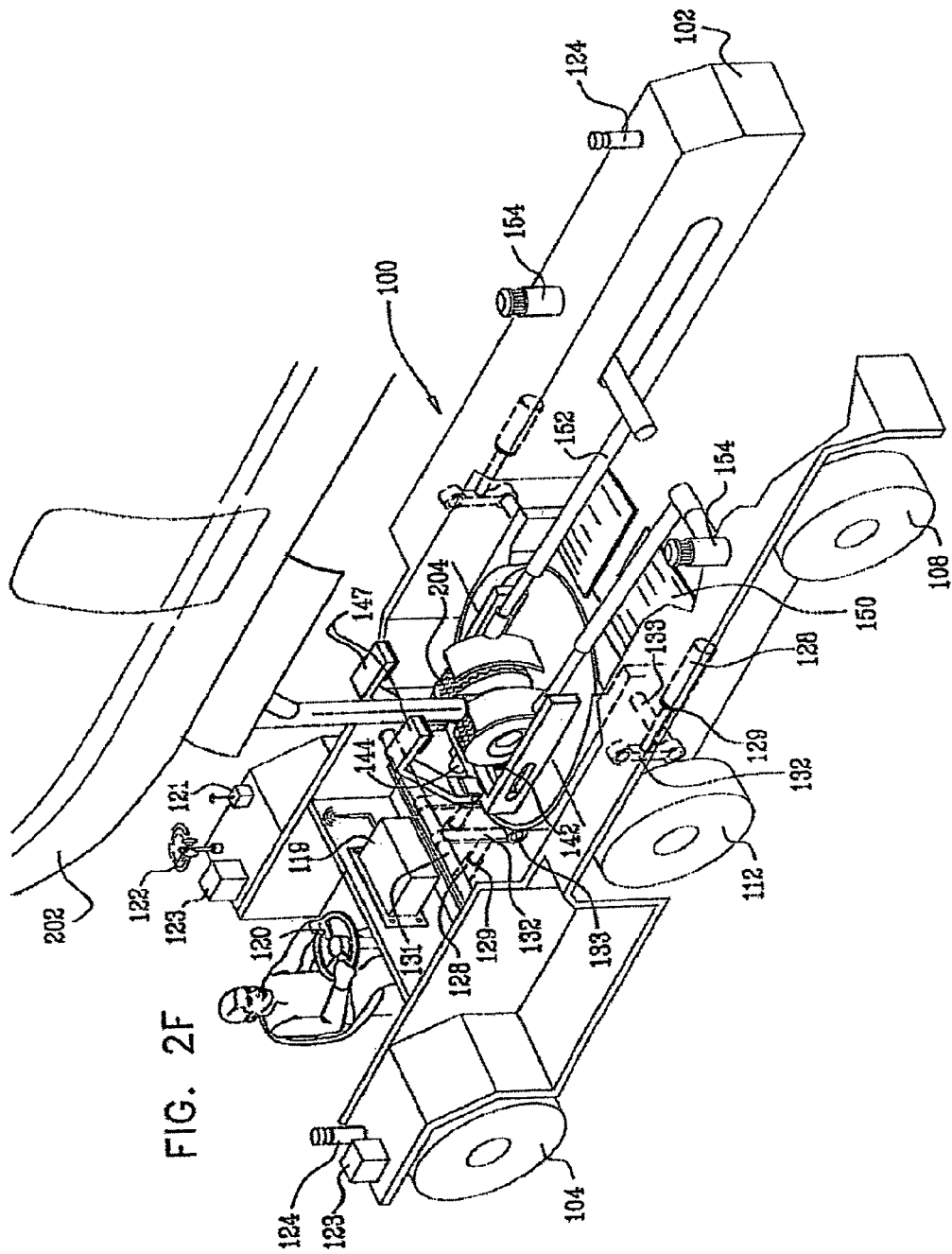

FIG. 2F illustrates the airplane landing gear wheels 204 pushed by piston assemblies 152 against suitably positioned stop bar 142, such that the axis of rotation of the airplane landing gear wheels 204 may lie insofar as possible exactly at the center of rotation 127 of the support assembly 125, which, as noted above, lies at or close to the geometrical center of the rectangle defined by the centers of rotation of steerable wheels 104, 106, 108, and 110.

Figure 2G:
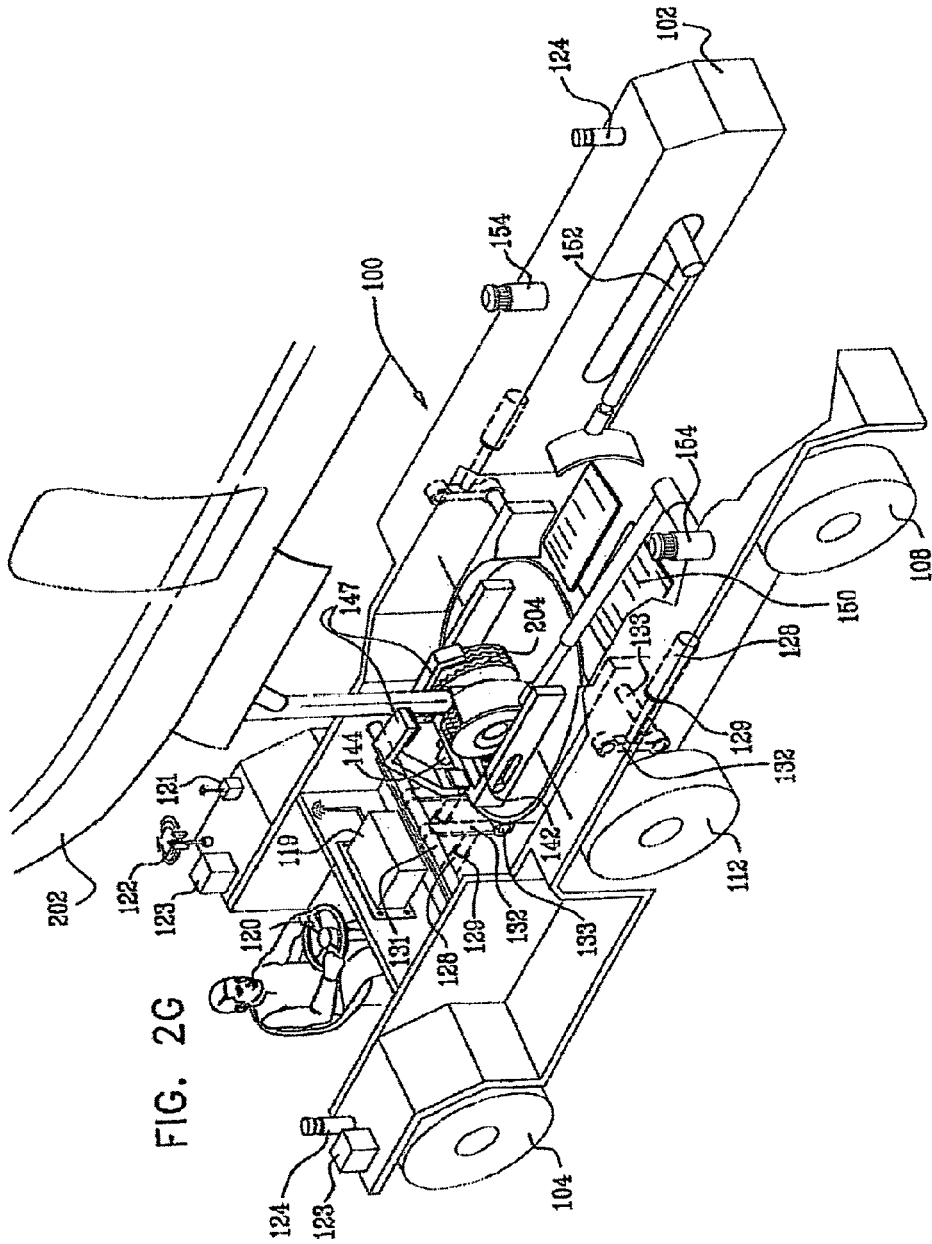
Figure 2H:
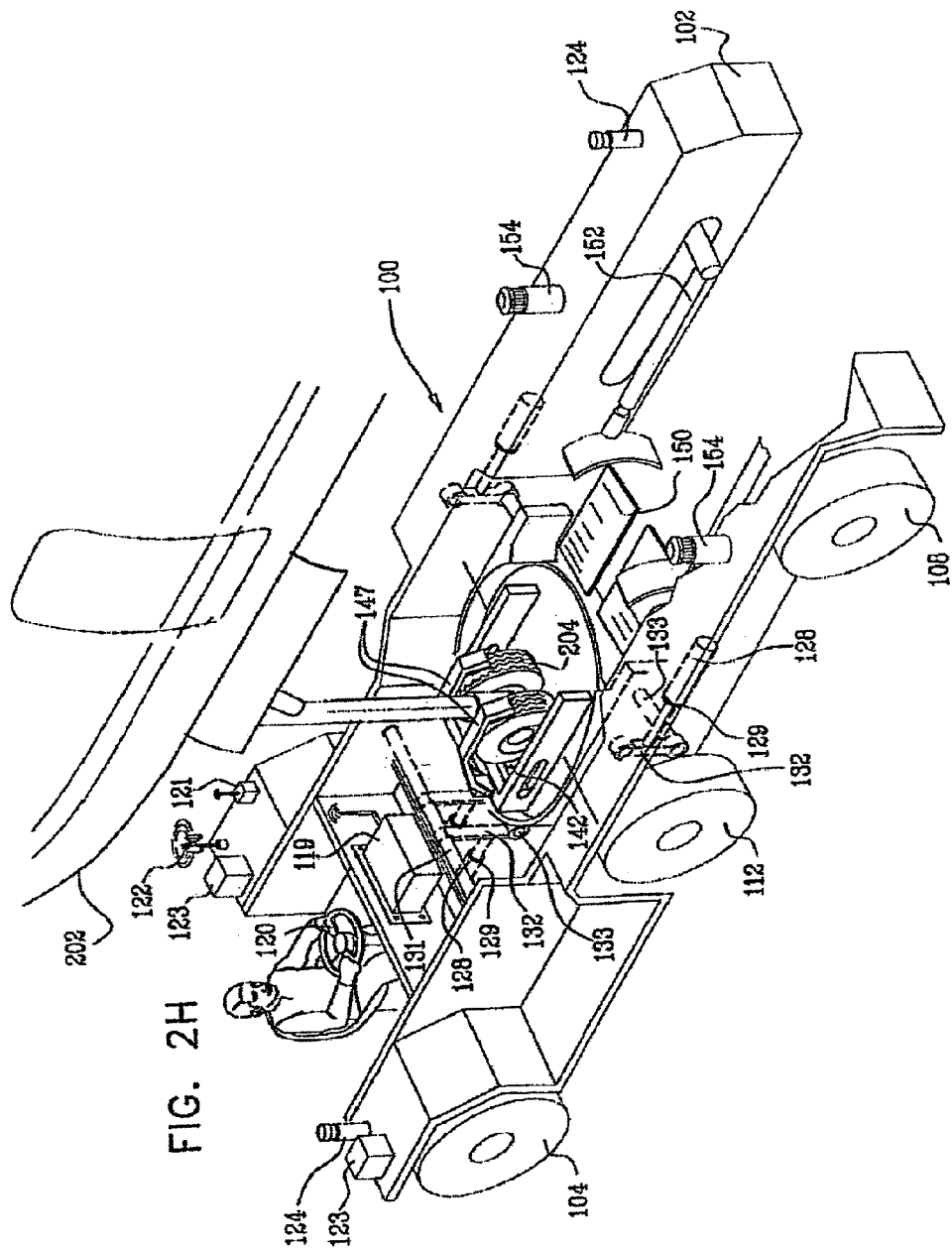
Figure 21:
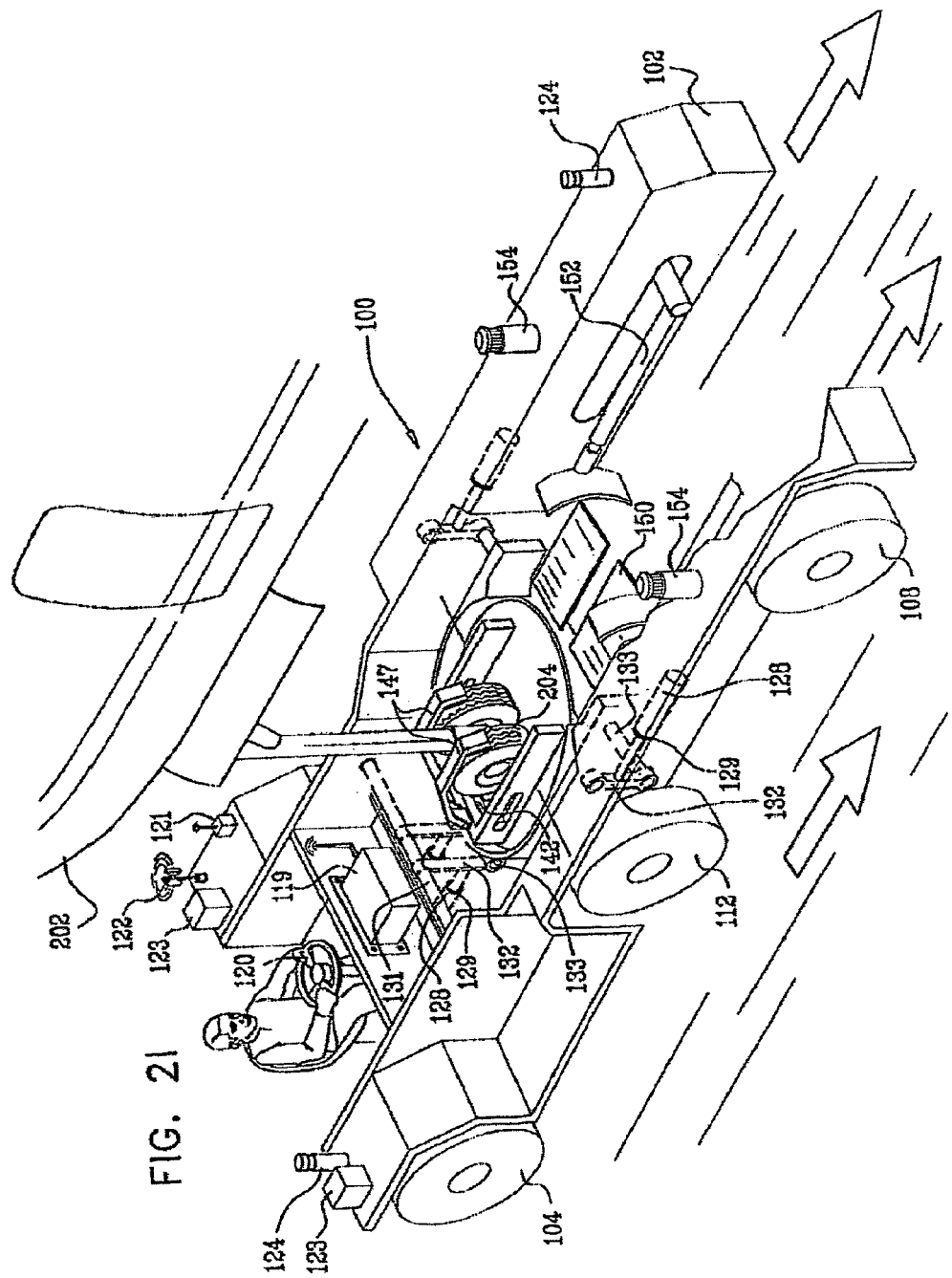
Figure 2J:
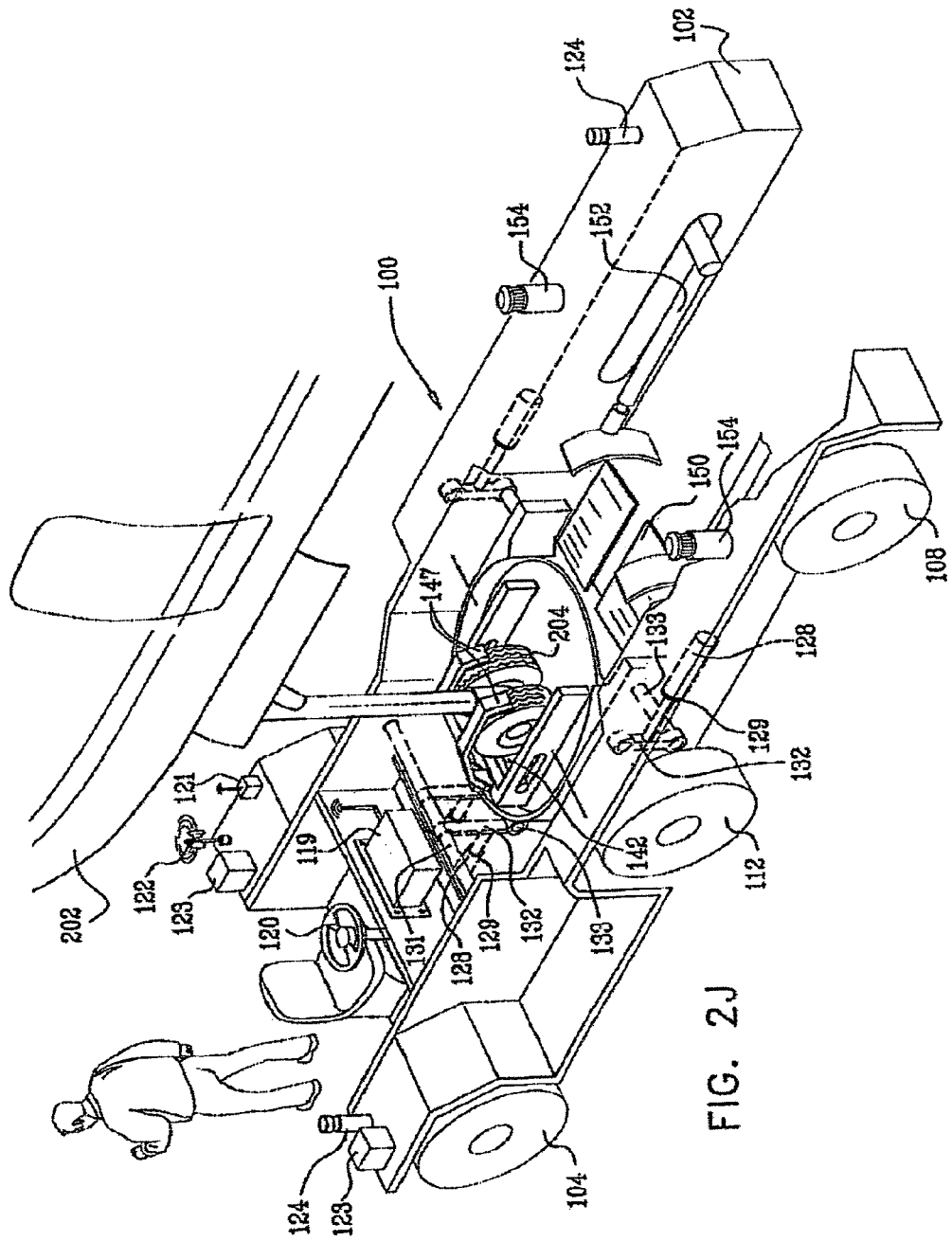

FIGS. 2G and 2H illustrate a sequence of retraction of individual piston assemblies 152 out of engagement with airplane landing gear wheels 204 and engagement of individual clamps of the clamp assembly 147 with airplane landing gear wheels 204 to clamp airplane landing gear wheels onto the support assembly 125 such that the center of rotation of the airplane landing gear wheels lies insofar as possible exactly at the center of rotation 127 of the support assembly 125. FIG. 2I illustrates pushback of the airplane 202 by tug 100 under control of the driver of the tug. FIG. 2J illustrates the tug driver leaving the tug 100 following completion of pushback. The driver may remain on the tug 100 during all or part of taxiing, and may participate in disengagement of the tug from the airplane following engine start up.

Figure 3A:
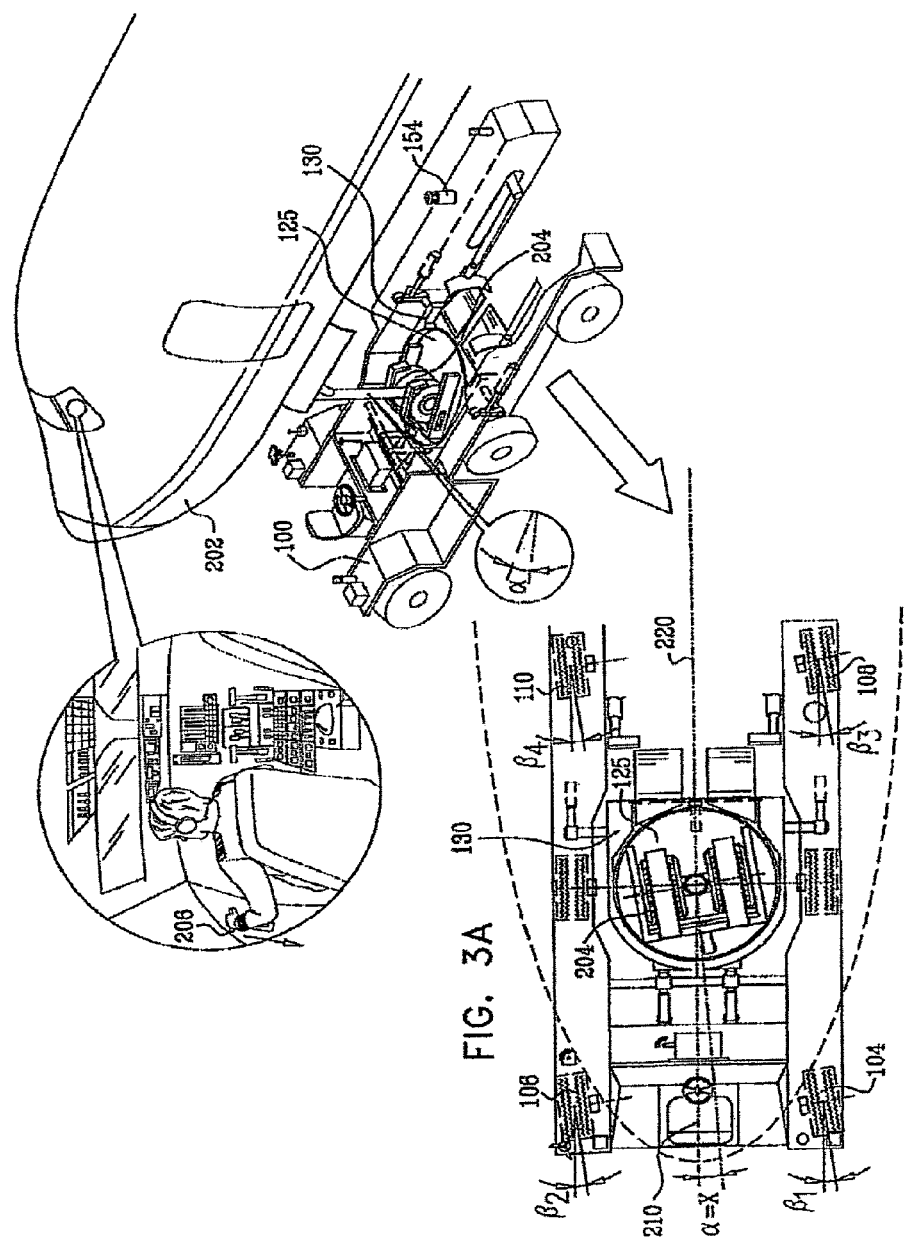

FIG. 3A illustrates rotation of the airplane landing gear wheels 204 by the airplane pilot using the conventional airplane steering tiller 206 or pedals (not shown), producing corresponding rotation of the support assembly 125 relative to base element 130. Rotation of the support assembly 125 is immediately sensed by rotation sensor 145 which provides an output to controller 119 resulting in immediate rotation of steerable wheels 104, 106, 108, and 110 of tug 100, as described hereinbelow in greater detail with reference to FIGS. 6A through 6B.

Controller 119 may perform steering of tug 100 in accordance with a feedback control loop which receives an input from rotation sensor 145 indicating an angle $\alpha$ between the direction of the wheels 204 of the landing gear as steered by the airplane pilot, and thus of the support assembly 125, with the longitudinal axis of the tug 100, here designated by reference numeral 210. The controller 119 rotates tug steerable wheels 104, 106, 108, and 110 at respective angles $\beta_1$, $\beta_2$, $\beta_3$ and $\beta_4$, as described hereinbelow with reference to FIGS. 6A through 6C, and drives tug 100 such that angle $\alpha$ goes to zero.

FIG. 3B illustrates an intermediate stage during movement of the tug 100 during which is it oriented such that the airplane 202 is pulled thereby in the direction indicated by the airplane pilot. At this stage the angle $\alpha$ between the support assembly 125 and the longitudinal axis 210 of the tug 100 is shown to be one-half of that shown in FIG. 3A. An angle $\gamma$ is indicated between the longitudinal axis 210 of the tug 100 and the longitudinal axis of the airplane 202 being towed thereby, here designated by reference numeral 220, due to turning of the tug 100 relative to the airplane 202.

Figure 3C:
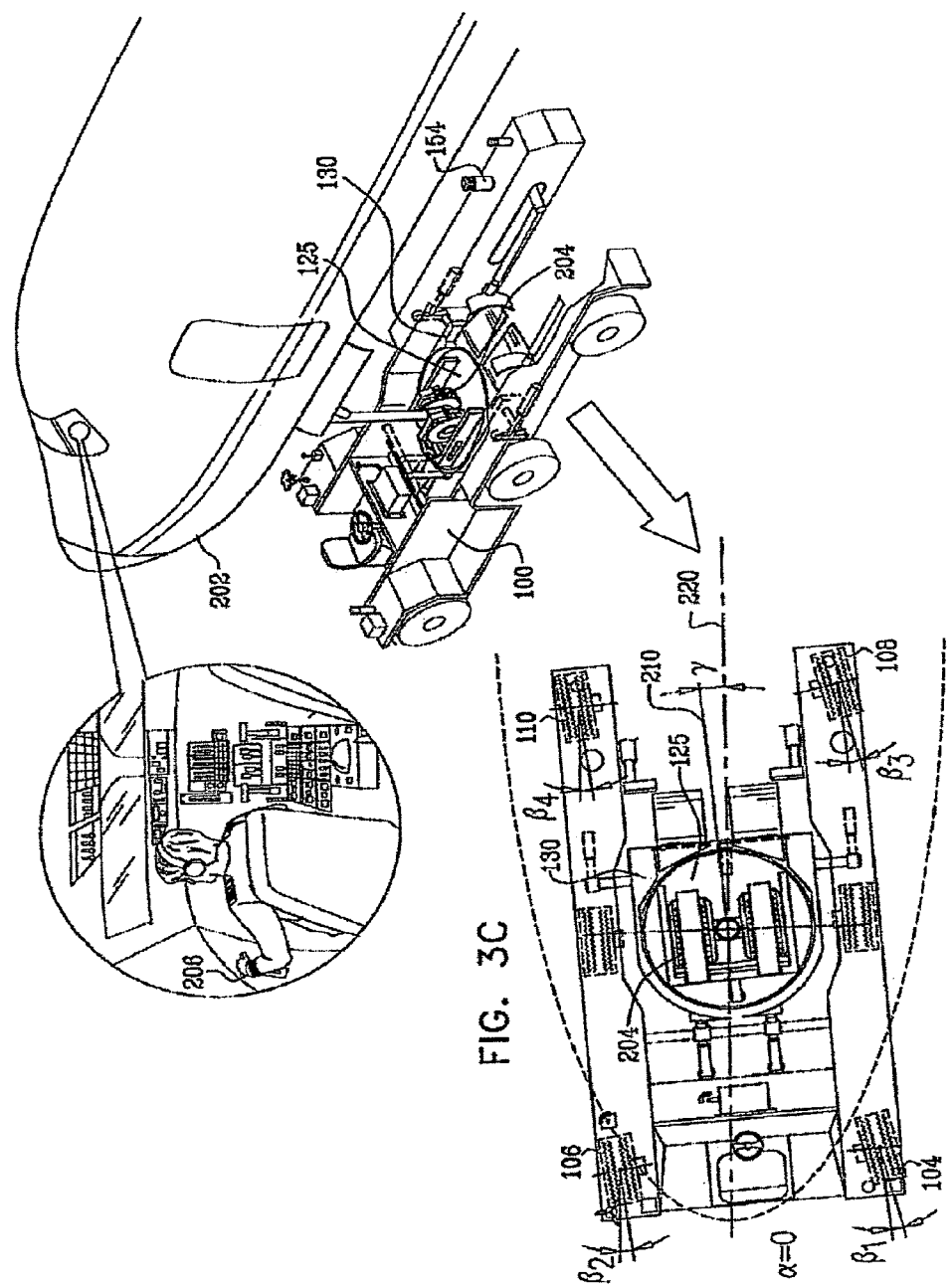

FIG. 3C illustrates the tug 100 oriented with respect to the wheels 204 of the landing gear of the airplane 202 such that $\alpha$ is zero. It is noted that the angles $\beta_1$, $\beta_2$, $\beta_3$ and $\beta_4$ of the tug steerable wheels 104, 106, 108, and 110, respectively, are typically not zero. At this stage the angle $\gamma$ between the longitudinal axis 210 of the tug 100 and the longitudinal axis 220 of the airplane 202 being towed by tug 100 is less than $\gamma$ in FIG. 3B, inasmuch as the airplane 202 has begun to turn.

Figure 3D:
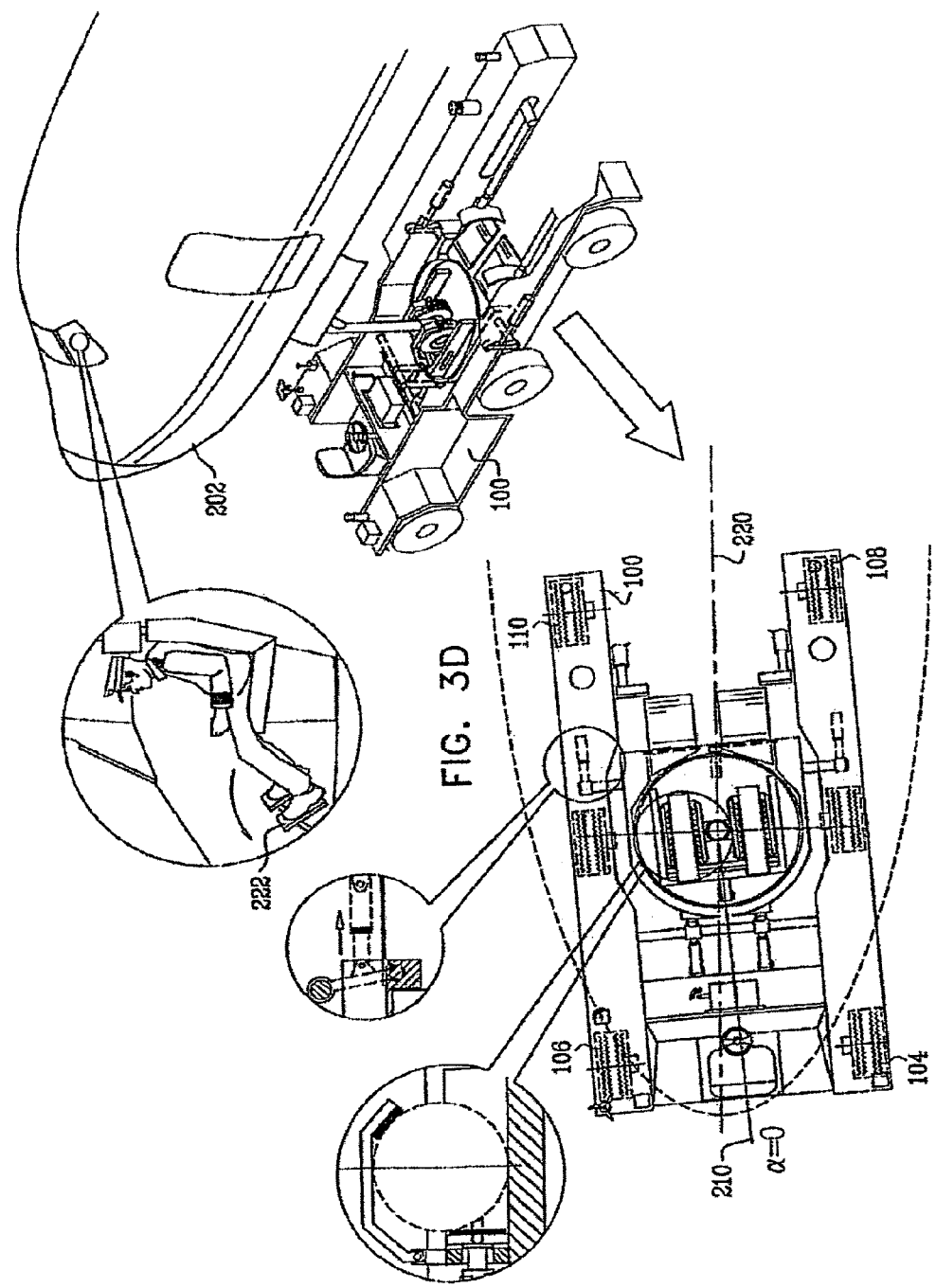

FIG. 3D illustrates braking of the airplane 202, by the airplane pilot pressing on pedals 222. Braking of the airplane 202 is performed by brakes on the main landing gear (not shown) of the airplane 202, causing the airplane to decelerate and thus immediately causing the application of a force sensed by the force sensors 148 on clamps 147, the output of which is received by controller 119, which immediately decelerates the tug 100 accordingly. Inasmuch as there is a time lag between braking of the airplane 202 and corresponding deceleration of the tug 100, forces are applied to rearward energy absorbing pistons 128 which are immediately sensed by force sensors 129. Rearward energy absorbing pistons 128 absorb the energy produced by braking of the airplane 202 relative to the tug 100. At this stage force sensors 129 serve as a back up to force sensors 148.

FIG. 3E illustrates controlled acceleration of the tug 100 governed by controller 119 in response, inter alia, to inputs received from force sensors 148 and 129, to provide airplane taxi velocity which is within predetermined speed limits at predetermined locations along an airplane travel path and to ensure that forces applied to the landing gear do not exceed predetermined limits, taking into account one or more of the following factors:

force induced by known slopes at various locations along an airplane travel surface traversed by the tug 100, the locations being identified to the controller 119 by location sensing functionality, such as GPS functionality, here provided by a tug mounted tug location sensor 121;

wind forces applied to the airplane 202, information regarding the wind forces being supplied to the controller 119 from airport or tug-mounted wind sensors, such as tug mounted wind sensor 122, and optionally also via airport command and control functionality; and tug 100 and airplane 202 rolling friction forces at various locations along the airplane travel surface traversed by the tug 100, the locations being identified to the controller 119 by the location sensing functionality provided by tug location sensor 121, and optionally also via airport command and control functionality.

The controller 119 may also decelerate of the tug 100 responsive not only to airplane pilot braking of the airplane 202, but also to detection of an obstacle sensed by an obstacle sensor 123. The tug deceleration is governed by controller 119 in response, inter alia, to inputs received from force sensors 148 and 129, to ensure a coordinated deceleration ratio between the airplane and the tug, thereby to limit the forces applied to landing gear of the airplane 202 to within predetermined force limits.

In order to distinguish between normal traction forces on the landing gear and forces applied by the pilot braking, the controller 119 may take into account one or more of the factors described above, which are indicated by data from the various sensors, such as sensors 120, 121, 122, and 123 and cameras 124.

Controller 119 may be operative to govern acceleration and deceleration of tug 100 so as to maintain a desired tug speed by employing a speed control feedback loop. The controller 119 may be provided with, or given access to, an embedded map of the airport indicating relevant tug speed limits at various regions of the tug travel path. This speed limit information is coordinated with information indicating instantaneous location of the tug 100, which may be provided by tug location sensor 121. The controller 119 may further include a navigation system which indicates the instantaneous speed of the tug 100. The feedback loop operates to cause the actual speed to be as close as possible to and not to exceed the speed limit for the instantaneous location of the tug 100.

Controller 119 may also be operative to govern acceleration and deceleration of tug 100 so as to limit the horizontal forces applied to the landing gear of the airplane 202 to an acceptable limit, for example 4% of the airplane gross weight, for example by employing a force control feedback loop. Controller 119 receives inputs from force sensors 148 and 129, which indicate the sum of the forces applied to the landing gear of the airplane 202, resulting from, inter alia, wind, slopes, rolling friction, and acceleration or deceleration of the airplane 202 and/or the tug 100. The force feedback loop is operative to accelerate or decelerate the tug 100 such as to maintain the forces sensed by force sensors 148 and 129 below the acceptable limit, optionally leaving a margin for unexpected accelerations or decelerations of either the airplane 202 or the tug 100.

Reference is now made to FIGS. 4A, 4B, 4C, 4D, and 4E, illustrate various stages in autonomous taxiing operation of the towbarless airplane tug 100. The autonomous taxiing operation may be initiated by a driver of the tug 100 or automatically in response to a command from the airport command and control center following completion of pushback.

In autonomous taxiing operation, a function of the support assembly 125 is to reduce the forces which are applied to the landing gear in the horizontal plane, specifically torque, to zero, by maintaining the position of the landing gear wheels 204 in the position last selected by the airplane pilot, typically parallel to the longitudinal axis 220 of the airplane. As a result the landing gear remains in that position while the tug 100 changes its heading along its travel path. This means that in most of the steering maneuvers of the tug 100 the support assembly will be turned in a direction opposite to that of the tug 100.

Autonomous tug control may be overridden immediately by the airplane pilot by operating the airplane brakes on the main landing gear, which is immediately sensed by force sensors 148 and 129.

Autonomous taxiing may employ enhanced C4 (Command, Control, Communications, and Computers) functionality of an airport command and control center which coordinates and optimizes the taxi travel path and speed of all of the taxiing airplane in the airport, for example utilizing some or all of the following inputs:

Positions of all the airplanes taxiing in the airport;
Calculation of all airplane taxi clearances and taxi travel pathways; and
Airfield meteorological conditions and taxiway ground travel conditions.

This enhanced C4 functionality may provide some or all of the following functions:

avoidance of runway incursions;
calculating optimal taxiing speeds for all the airplanes to insure minimal starts and stops during taxiing;
minimizing traffic jams on the taxiways; and
enabling immediate pilot control in the event of a malfunction or emergency.

FIG. 4A illustrates an initial orientation of the tug 100 and the airplane 202 at the beginning of autonomous taxiing operation. The airplane landing gear wheels 204 lie parallel to the longitudinal axis 210 of the tug 100 and to the longitudinal axis 220 of the airplane. The steerable wheels 104, 106, 108, and 110 of the tug 100 also lie parallel to axes 210 and 220.

Figure 4B:
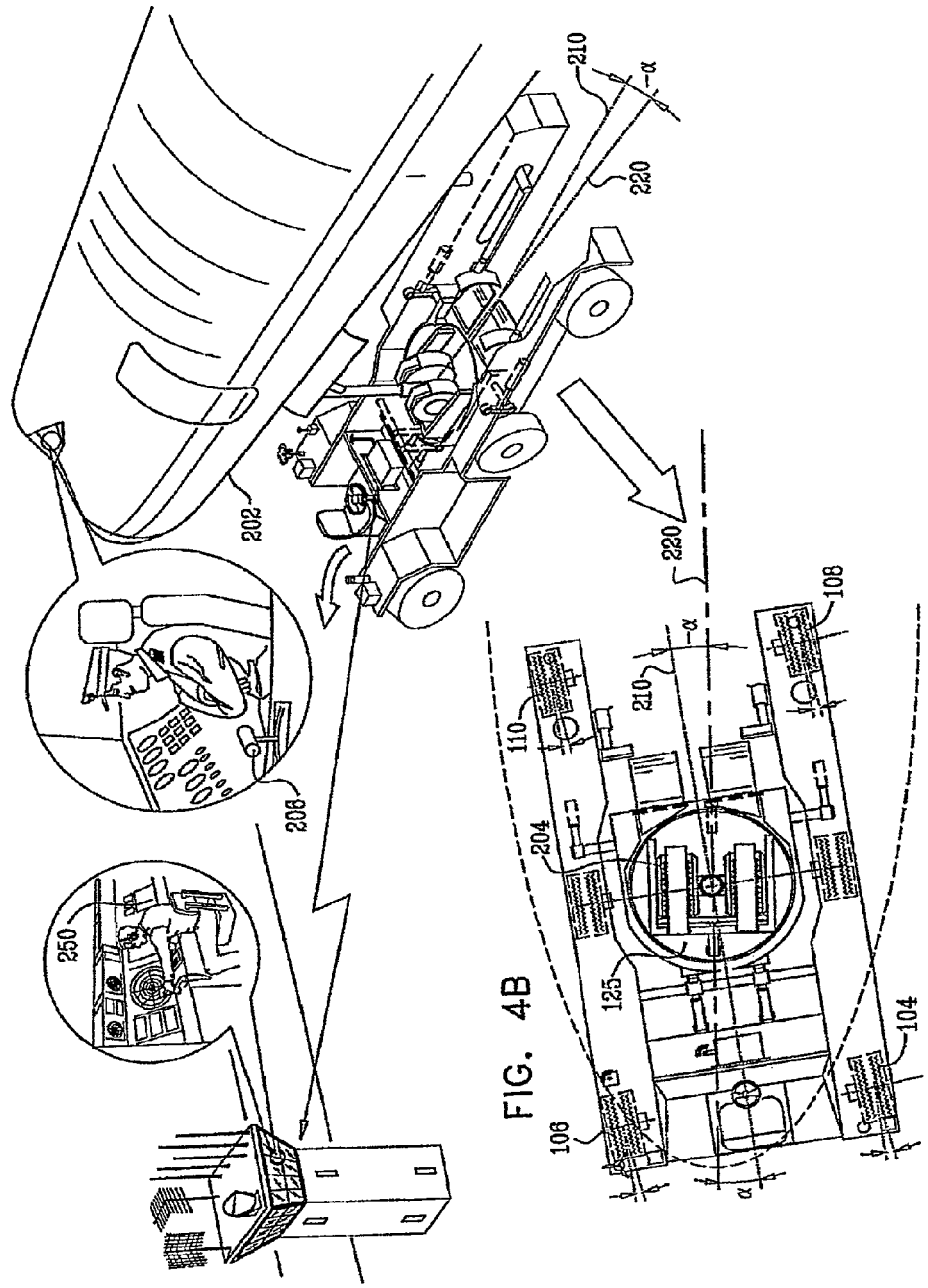

FIG. 4B illustrates initial turning of the tug 100 under control of controller 119, for example responsive to traffic control instructions received from an airport command and control system 250 based on a C4 system. As seen in FIG. 4B, the airplane pilot does not use conventional airplane steering tiller 206 or pedals (not shown), except for emergency braking. Desired steering of the tug 100 is produced in response to suitable instructions from controller 119 by rotation of steerable wheels 104, 106, 108, and 110 of tug 100. In order to avoid application of torque to the landing gear of the airplane 202, the support assembly 125 is rotated by a support assembly rotation motor 146 by an angle $-\alpha$, which is equal is magnitude and opposite in direction to the angle $\alpha$ between the longitudinal axis 210 of the tug and the longitudinal axis 220 of the airplane. Rotation of the support assembly 125 is sensed by rotation sensor 145 which provides a feedback output to controller 119.

Controller 119 may steer the tug 100 by steering steerable wheels 104, 106, 108, and 110 and rotating the support assembly 125 by support assembly rotation motor 146 in accordance with two feedback control loops. One feedback loop ensures that the heading of the tug 100 follows a predetermined travel path established by the airport command and control system 250. The second feedback loop employs laser range finders 154 to ensure that the landing gear wheels 204 are aligned parallel to the longitudinal axis 220 of the airplane. The laser range finders 154 ascertain the angle $\alpha$ between the longitudinal axis 210 of the tug 100 and the longitudinal axis 220 of the airplane 202. Controller 119 ensures that the support assembly 125 is rotated relative to the longitudinal axis 210 by an angle $-\alpha$, so as to ensure that the landing gear wheels 204 remain aligned with the longitudinal axis 220 of the airplane at all times.

Figure 4C:
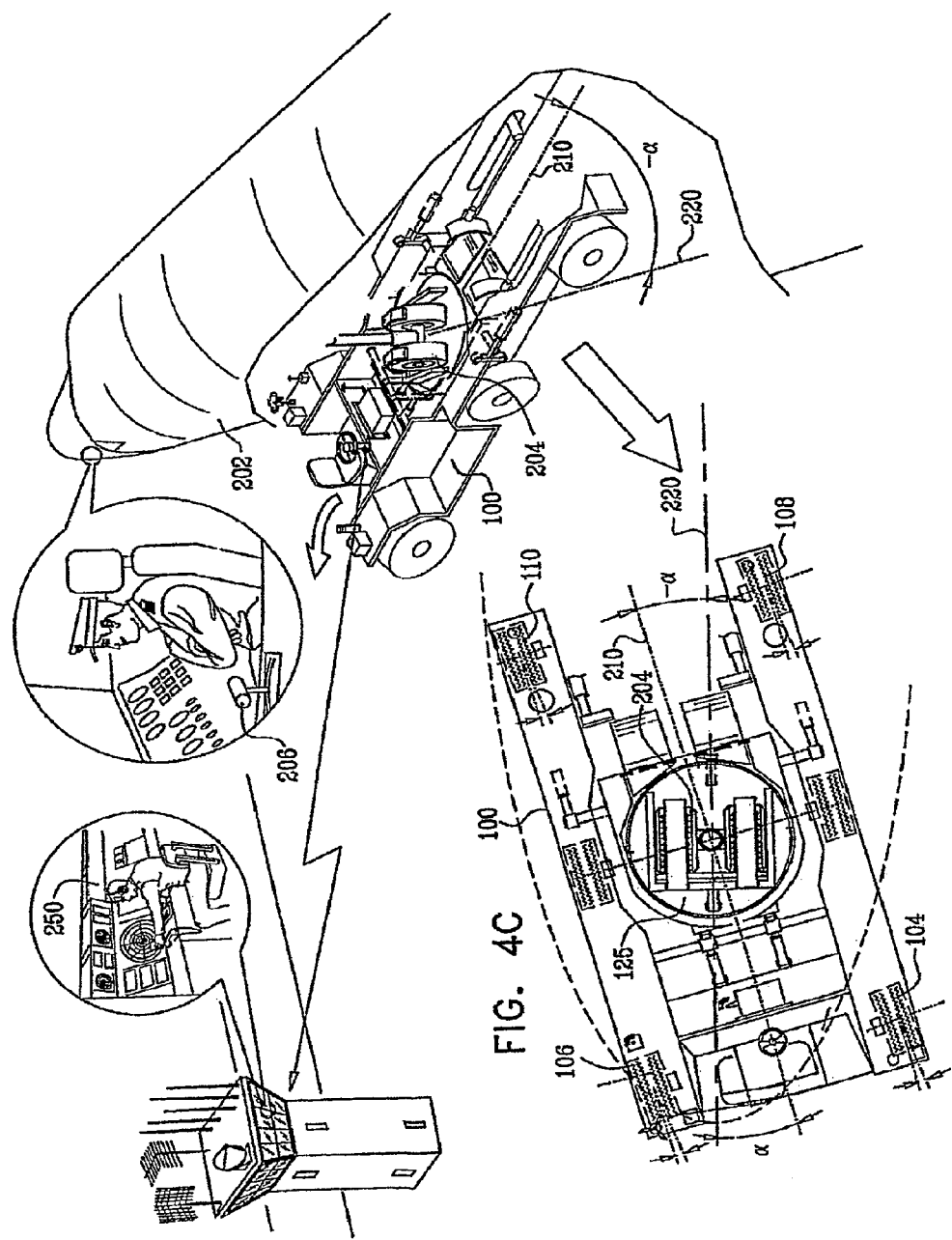

FIG. 4C illustrates a further stage of rotation of the tug 100 At this stage the angle $\alpha$ between the longitudinal axis 210 of the tug 100 and the longitudinal axis 220 of the airplane 202 and the angle -α between the support assembly 125 and the longitudinal axis 210 of tug 100 are shown to be twice the angles shown in FIG. 4B.

Figure 4D:
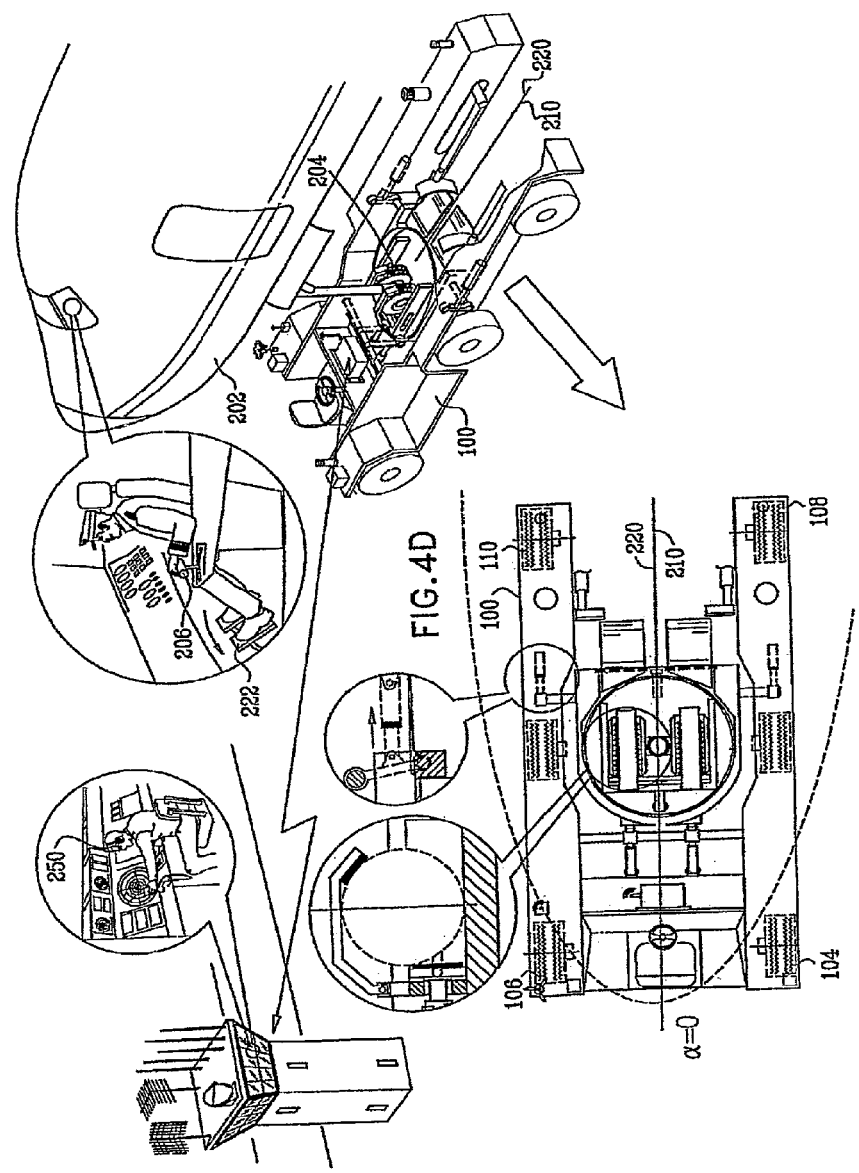

FIG. 4D illustrates an overriding of the autonomous mode of operation by the airplane pilot, for example by the airplane pilot pressing on braking pedals 222. This overriding may be, e.g., for emergency braking and/or to enable the airplane pilot to control steering of the tug 100, as described above with reference to FIGS. 3A through 3E. Braking of the airplane 202 is performed by brakes on the main landing gear (not shown) of the airplane 202, causing the airplane to decelerate and thus immediately causing the application of a force sensed by the force sensors 148 on clamps 147, the output of which is received by controller 119, which immediately decelerates the tug 100.

Controller 119 terminates the pushback operation mode of the tug 100 and transfers the tug mode to airplane pilot control operation, as described above with reference to FIGS. 3A through 3E.

Inasmuch as there is a time lag between braking of the airplane 202 and corresponding deceleration of the tug 100, forces are applied to rearward energy absorbing pistons 128 which are immediately sensed by the force sensors 129. Rearward energy absorbing pistons 128 absorb the energy produced by braking of the airplane 202 relative to the tug 100. At this stage the force sensors 129 serve as a back up to force sensors 148.

A return to autonomous mode operation typically requires an input from the airport command and control system 250 or a pilot command transmitted via an Electronic Flight Bag (EFB), such as commercially available from Astronautics Ltd. of Israel.

Figure 4E:
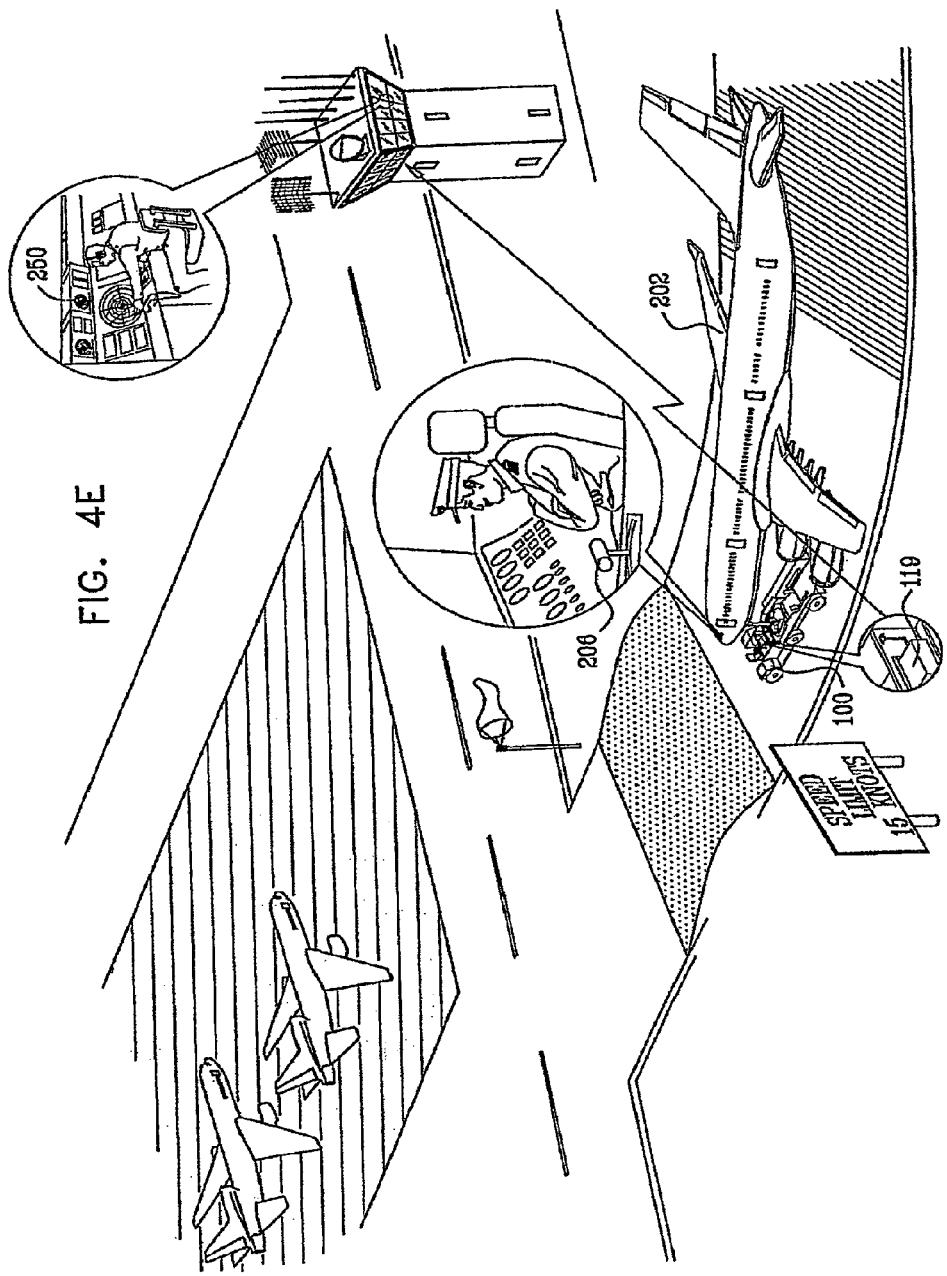

FIG. 4E illustrates a controlled acceleration of the tug 100 in the autonomous mode of operation, governed by controller 119 in response, inter alia, to inputs received from airport command and control center 250 and from force sensors 148 and 129, to provide airplane taxi velocity which is within predetermined speed limits at predetermined locations along an airplane travel path, and to ensure that forces applied to the landing gear do not exceed predetermined limits, taking into account one or more of the following factors:

force induced by known slopes at various locations along an airplane travel surface traversed by the tug 100, the locations being identified to the controller 119 by location sensing functionality, such as GPS functionality, here provided by a tug mounted tug location sensor 121;

wind forces applied to the airplane 202, information regarding the wind forces being supplied to the controller 119 from airport or tug-mounted wind sensors, such as tug mounted wind sensor 122, and via airport command and control functionality; and tug and airplane rolling friction forces at various locations along the airplane travel surface traversed by the tug 100, the locations being identified to the controller 119 by the location sensing functionality provided by tug location sensor 121, and via airport command and control functionality.

The controller 119 may decelerate the tug 100 responsive not only to airplane pilot braking of the airplane 202, but also to detection of an obstacle sensed by an obstacle sensor 123 or one of driving cameras 124 or to control instructions received from airport command and control center 250. The tug deceleration is governed by controller 119 in response, inter alia, to inputs received from force sensors 148 and 129, to ensure a coordinated deceleration ratio between the airplane and the tug, thereby to limit the forces applied to landing gear of the airplane 202 to within predetermined force limits.

In order to distinguish between normal traction forces on the landing gear and forces applied by the pilot braking, the controller 119 takes into account one or more of the factors described above, which are indicated by data from the various sensors, such as sensors 120, 121, 122, and 123.

Controller 119 may be operative to govern acceleration and deceleration of tug 100 so as to maintain a desired tug speed by employing a speed control feedback loop. The controller 119 may be provided with, or given access to, an embedded map of the airport indicating relevant tug speed limits at various regions of the tug travel path. This speed limit information is coordinated with information indicating instantaneous location of the tug 100, which may be provided by tug location sensor 121. The controller 119 may further include a navigation system which indicates the instantaneous speed of the tug 100. The feedback loop operates to cause the actual speed to be as close as possible to and not to exceed the speed limit for the instantaneous location of the tug.

Controller 119 may also be operative to govern acceleration and deceleration of tug 100 to as to limit the horizontal forces applied to the landing gear of the airplane 202 to an acceptable limit, for example 4% of the airplane gross weight, for example by employing a force control feedback loop. Controller 119 receives inputs from force sensors 148 and 129, which indicate the sum of the forces applied to the landing gear of the airplane, resulting from, inter alia, wind, slopes, rolling friction and acceleration or deceleration of the airplane 202 and/or the tug 100. The force feedback loop is operative to accelerate or decelerate the tug 100 such as to maintain the forces sensed by force sensors 148 and 129 sufficiently below the acceptable landing gear force limit, optionally leaving a margin for unexpected accelerations or decelerations of either the airplane 202 or the tug 100.

When the tug 100 is operative in the autonomous taxiing mode of operation illustrated in FIGS. 4A through 4E, where the taxi speeds of tug 100 and the towed airplane 202 are typically those of the airplane pilot controlled taxiing mode of operation, the airplane pilot may be able to override the autonomous system to switch to an airplane pilot-controlled mode of operation by applying the airplane brakes and resuming tug steering by the airplane tiller 206. The airplane pilot may also apply the airplane brakes in emergency situations.

Efficient taxiing operation is provided in the autonomous taxiing mode of operation due to the fact that the ground movements of all airplanes in the airport are managed by the command and control system 250 in an integrated manner, thus avoiding lines of airplanes waiting to take off. As seen in FIG. 4E, the command and control system 250 integrates the movement of all airplanes such that airplanes maintain desired spacing between them during taxiing and avoid start and stop movements, insofar as possible.

Reference is now made to FIGS. 5A, 5B, 5C, 5D and 5E, which are respective pictorial illustrations of various stages in the autonomous mode of operation of the towbarless airplane tug 100 under the control of a command and control system in the airport tower, via controller 119 for tug taxiing movement and for return of the tug 100 from the take-off area to a pre-pushback location.

Figure 5A:
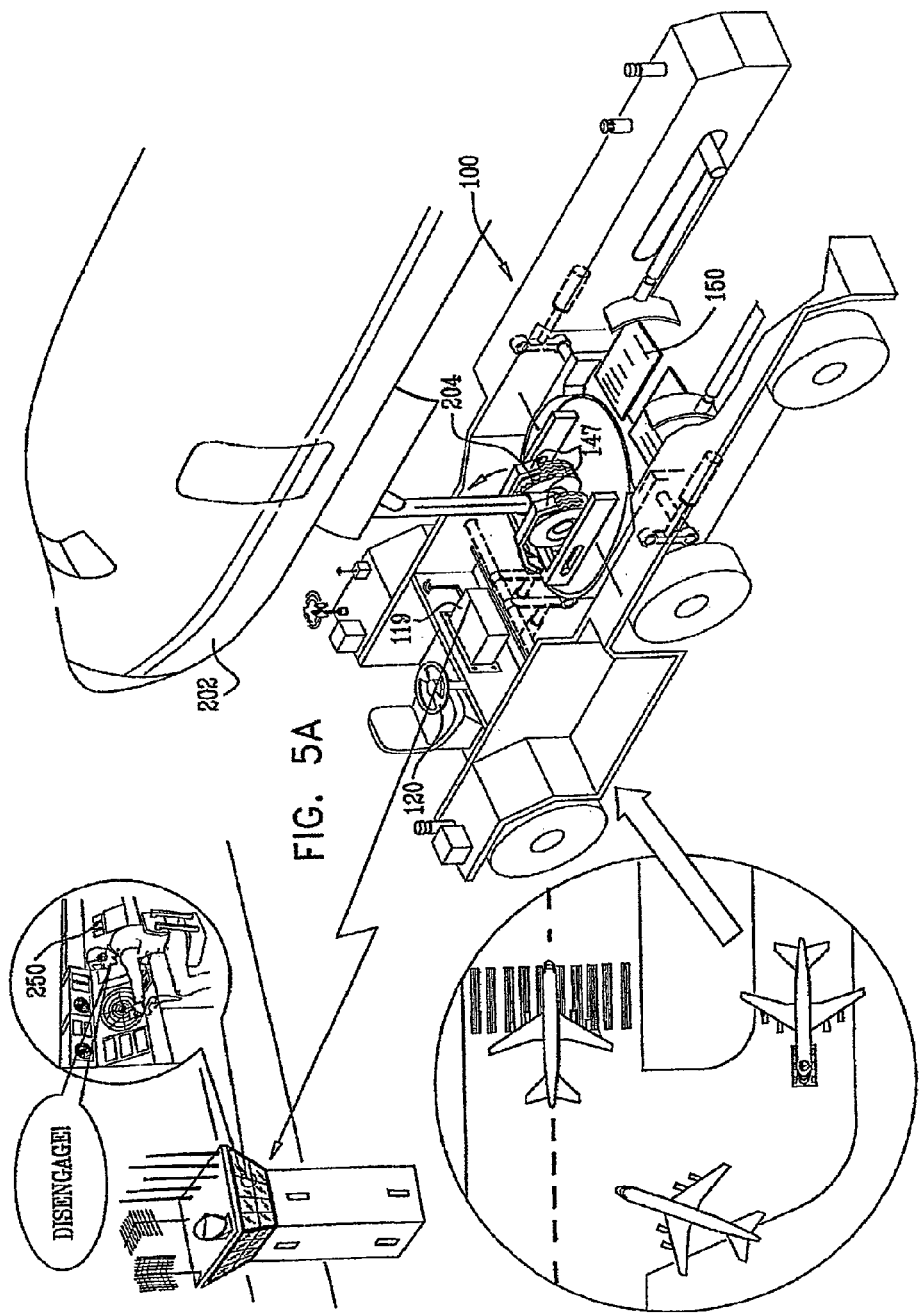
Figure 5C:
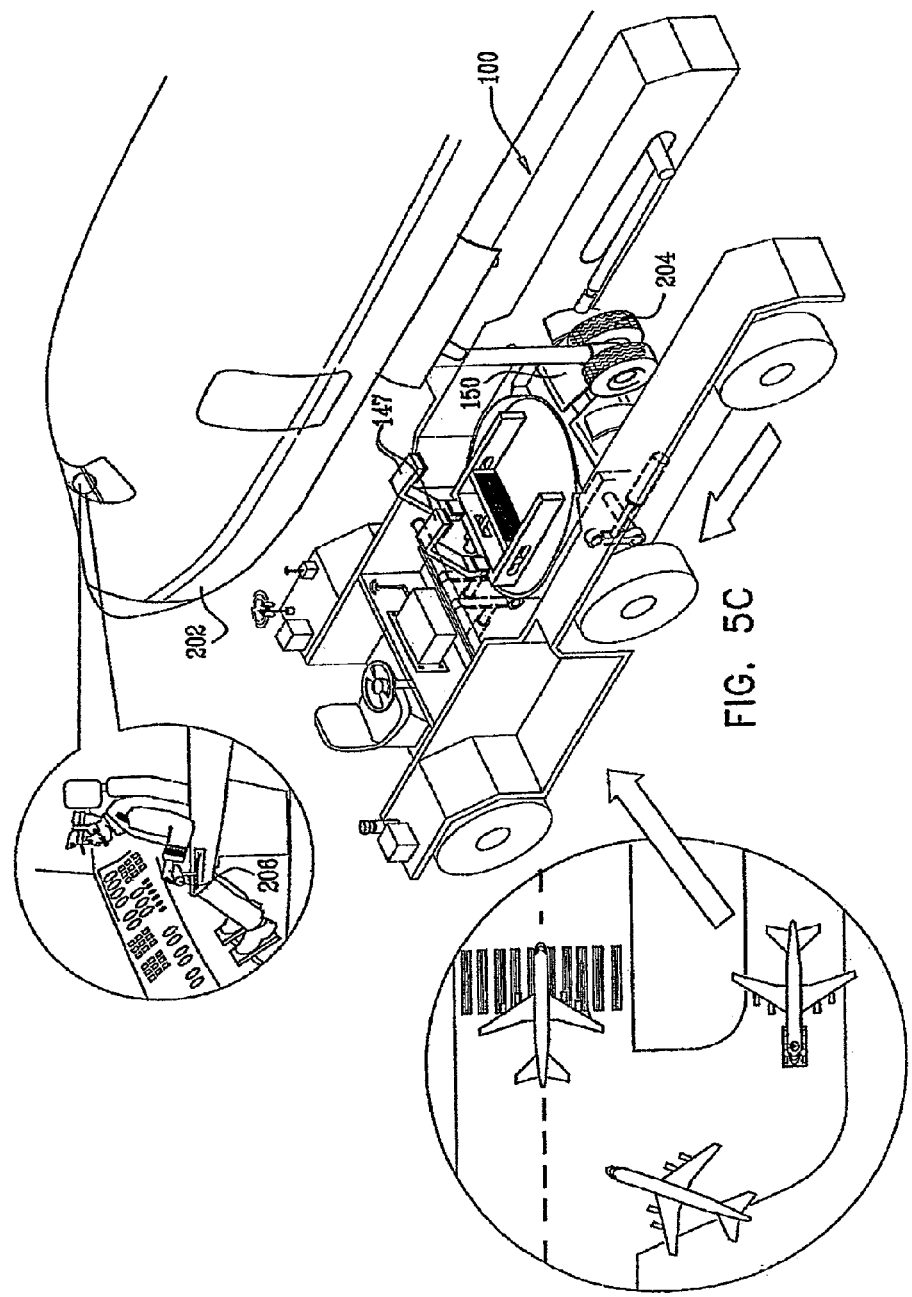

FIGS. 5A, 5B and 5C illustrate disengagement of the tug 100 from the airplane landing gear wheels 204. It is appreciated that disengagement of the tug 100 from the airplane is typically carried out after the engines of the airplane have been started by the airplane pilot. The command and control system 250 may command the tug 100 to perform disengagement. Alternatively, disengagement by the tug may be automatically actuated by the sensed location of the tug at a predetermined disengagement location adjacent the take off point. The disengagement instructions may be communicated wirelessly to the controller 119. In response to an instruction to disengage the tug, the clamp assembly 147 is disengaged from clamping engagement with the airplane landing gear wheels 204 and tug 100 is moved forward, while the airplane pilot brakes the airplane 202 and controls the airplane tiller 206, allowing the airplane landing gear wheels to roll down the ramp 150 and keeping the landing gear parallel to the longitudinal axis of the airplane 220, as the ramp 150 is moved forward relative thereto.

A safety driver may be present on the tug 100, in which case the disengagement can be carried out by the safety driver in a conventional manner and is usually accompanied by disconnection of a voice communications cord, by the safety driver.

FIG. 5D illustrates a controlled acceleration and steering of the tug governed by controller 119 to provide tug travel speed which is within predetermined speed limits at predetermined locations along a predetermined tug autonomous travel path from the take off area to a pre-pushback location, taking into account one or more of the following factors:
- instantaneous location of the tug 100 as indicated by tug location sensor 121;
- obstacle detection information received from sensors 123 or cameras 124;
- real time information on the locations of other vehicles along the tug travel path which is provided by the airport command and control system 250; and
- information indicating one or more predetermined travel paths of the tug 100 from the take-off location to the pre-pushback location; this information may be stored in controller 119 or provided in real time by the airport command and control system 250.

Figure 5E:
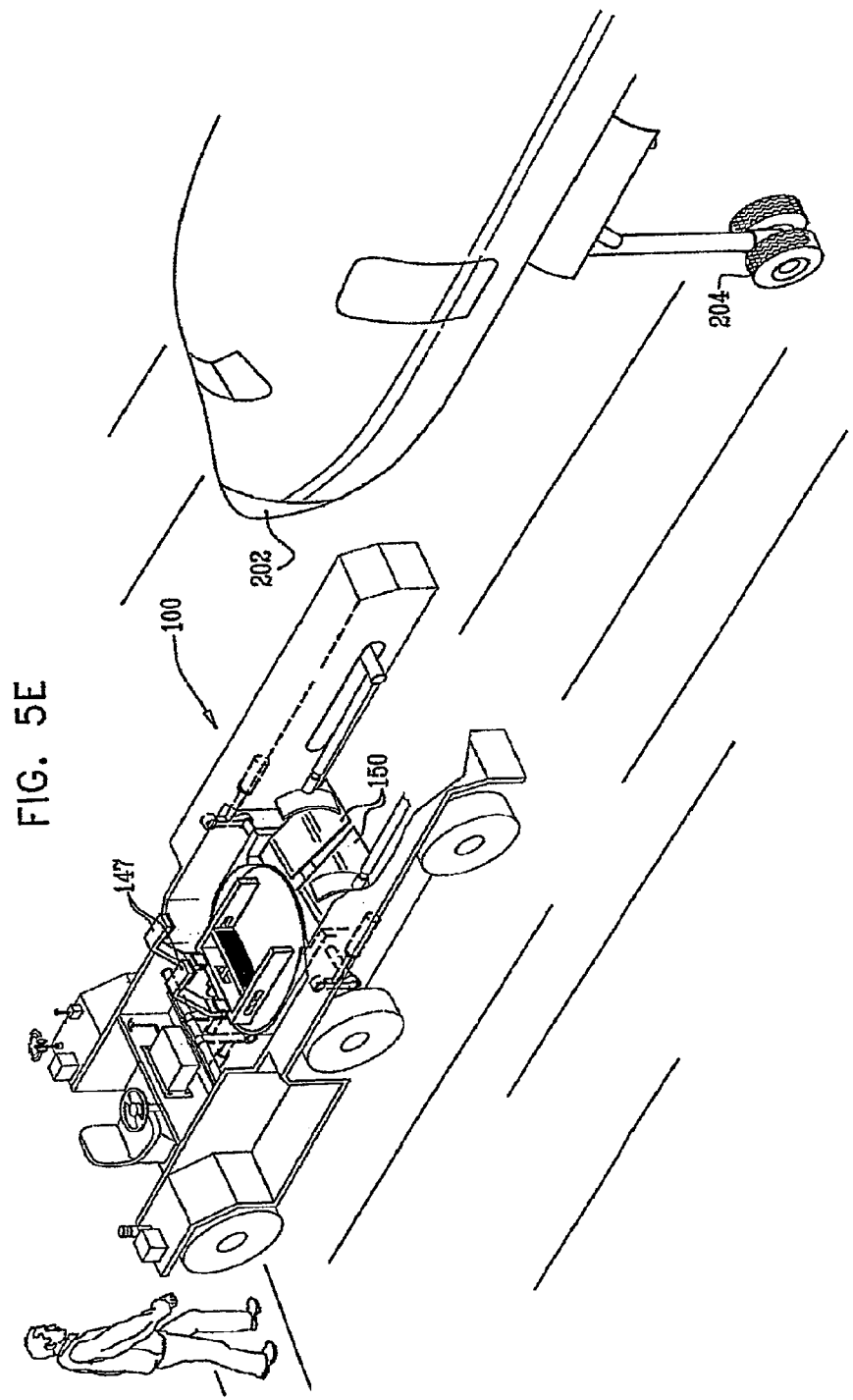

FIG. 5E illustrates controlled deceleration and parking of the tug governed by controller 119 at a pre-pushback location.

Figure 6B:
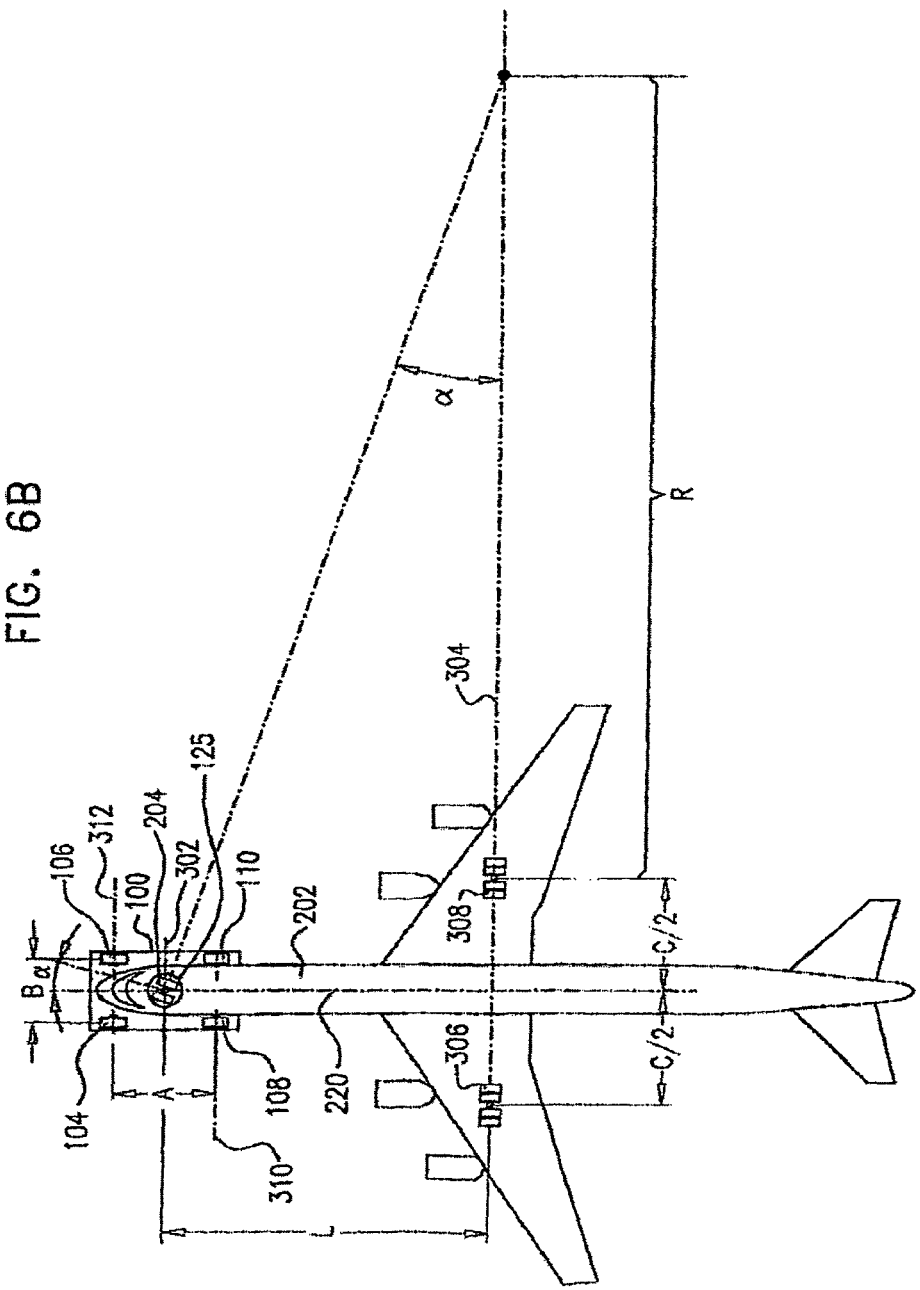
Figure 6C:
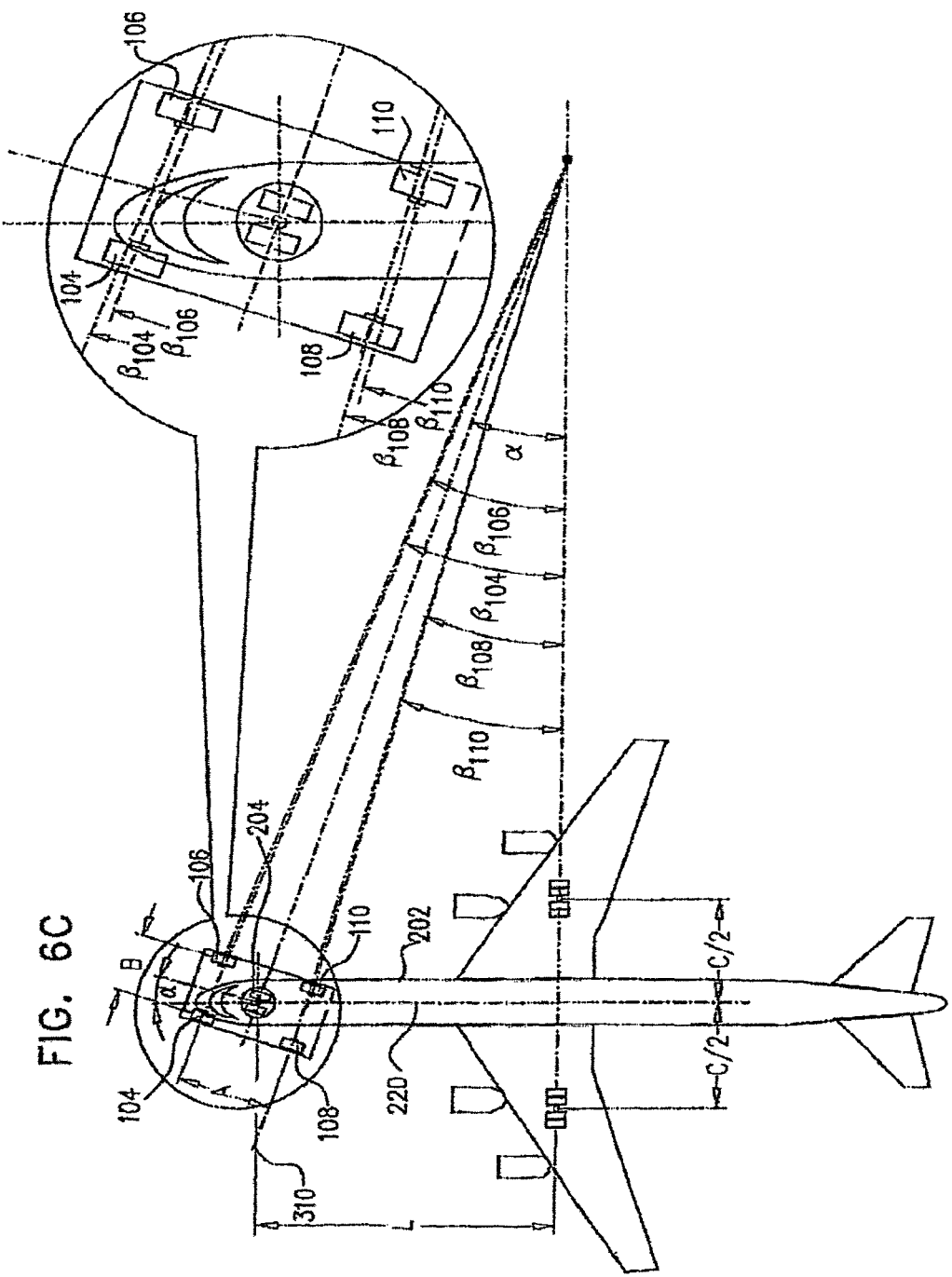

Reference is now made to FIGS. 6A, 6B and 6C, which are respective diagrammatical illustrations of steering functionality of the towbarless airplane tug 100, which provides Ackerman steering of the airplane 202.

Turning to FIG. 6A, which illustrates the airplane 202 with its landing gear wheels 204 steered straight ahead along the longitudinal axis 220 of the airplane 202, the following designations of parameters are noted:
- L=distance along the longitudinal axis 220 of the airplane 202 between the axis of rotation 302 of the landing gear wheels 204, and a line 304 joining the main landing gear, here designated by reference numerals 306 and 308;
- A=Longitudinal distance between a line 310 connecting the centers of back steerable wheels 108 and 110 and a line 312 connecting the centers of front steerable wheels 104 and 106 of the tug 100;
- B=Transverse distance between centers of wheels 108 and 110 and between centers of wheels 104 and 106 of the tug 100; and
- C=Distance between main landing gear 306 and 308 along line 304.

FIG. 6B illustrates airplane 202 with its landing gear wheels 204 turned by an angle $\alpha$, in response to airplane pilot steering using tiller 206 producing corresponding rotation of the support assembly 125 relative to the chassis 102 of tug 100. Controller 119 causes rotation of tug steerable wheels 104, 106, 108 and 110 in order to cause reorientation of the tug 100 such that a goes to zero, as described hereinabove with reference to FIGS. 3A through 3E. Controller 119 also controls the motion of the tug 100 such that Ackerman steering of the airplane 202 is produced, as illustrated in FIG. 6B, in accordance with the following parameters:
- R+C/2=instantaneous radius of rotation of airplane 202;
- $\alpha$=angle of rotation of the landing gear wheels 204 relative to the longitudinal axis 220 of the airplane 202; and
- $\beta_i$=Steering angle of the wheels of tug 100 (i=104, 106, 108, and 110).

The calculation of $\beta i$ as a function of $\alpha$ may be as follows:

$L/[R+C/2] = \tan \alpha >> R = L/\tan \alpha - C/2$ $\tan(\beta_{108}) = [L-A/2 \cos \alpha - B/2 \sin \alpha]/[L/\tan \alpha + A/2 - B/2 \sin \alpha]$ $\tan(\beta_{110}) = [L-A/2 \cos \alpha + (A/2 \tan \alpha + B/2) \sin \alpha]/[L/\tan \alpha + (A/2 \tan \alpha + B/2)\cos \alpha]$ $\tan(\beta_{104}) = [L-A/2 \cos \alpha + B/2 \sin \alpha]/[L/\tan \alpha - A/2 + B/2 \sin \alpha]$ $\tan(\beta_{106}) = [L-A/2 \cos \alpha - (A/2 \tan \alpha + B/2)\sin \alpha]/[L/\tan \alpha - (A/2 \tan \alpha + B/2)\cos \alpha]$ FIG. 6C illustrates the operation of tug 100 in accordance with a tug steering algorithm whereby the tug 100 is reoriented relative to the airplane 202 such that $\alpha$ is zero. As noted above with reference to FIGS. 3A through 3E, controller 119 reorients the tug 100 by rotating steerable tug wheels 104, 106, 108, and 110 as described hereinabove so as to reduce the angle $\alpha$, sensed by rotation sensor 145, to zero. Controller 119 may be operative to cause orientation of the tug 100 such that the instantaneous radius of rotation, R+C/2, of the tug-towed airplane 202 is identical to the instantaneous radius of rotation R+C/2 of the airplane 202, itself, such that in the example illustrated in FIGS. 3A through 3E, the pilot of the airplane steers the airplane in the same way whether or not it is pulled by the tug 100 or proceeds under its own power.

Figure 7A:
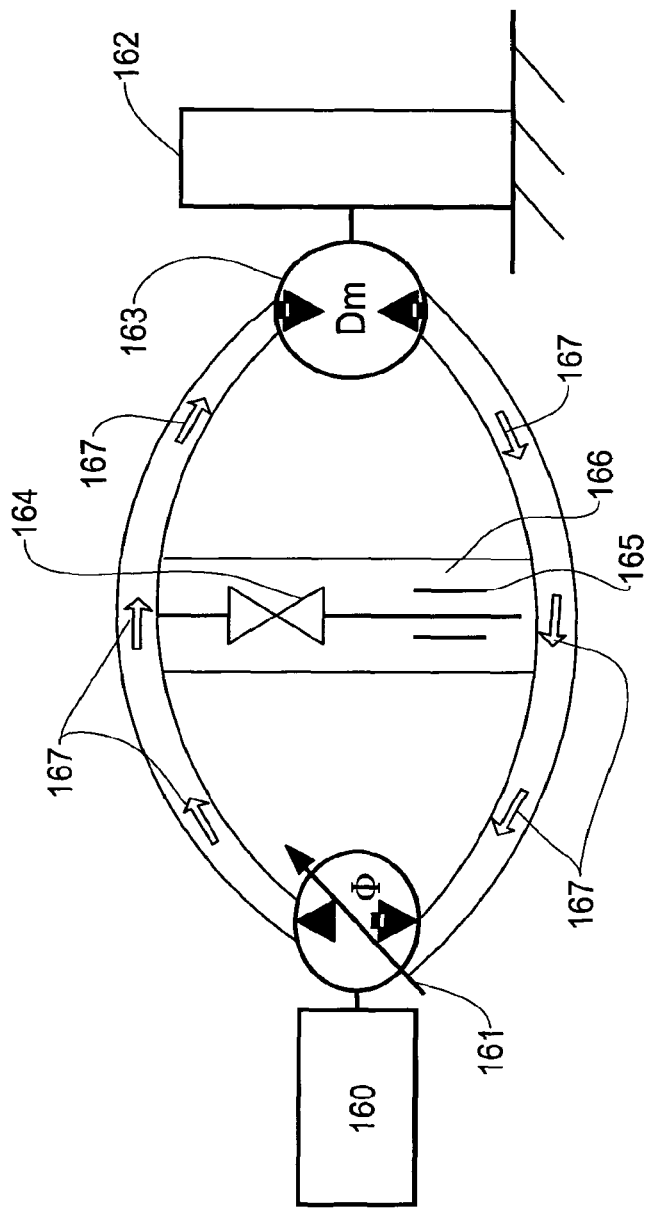
FIGS. 7A through 7D illustrate an energy absorption system that reacts to pilot-controlled braking of the airplane in order to control the load on the landing gear.
Figure 7B:
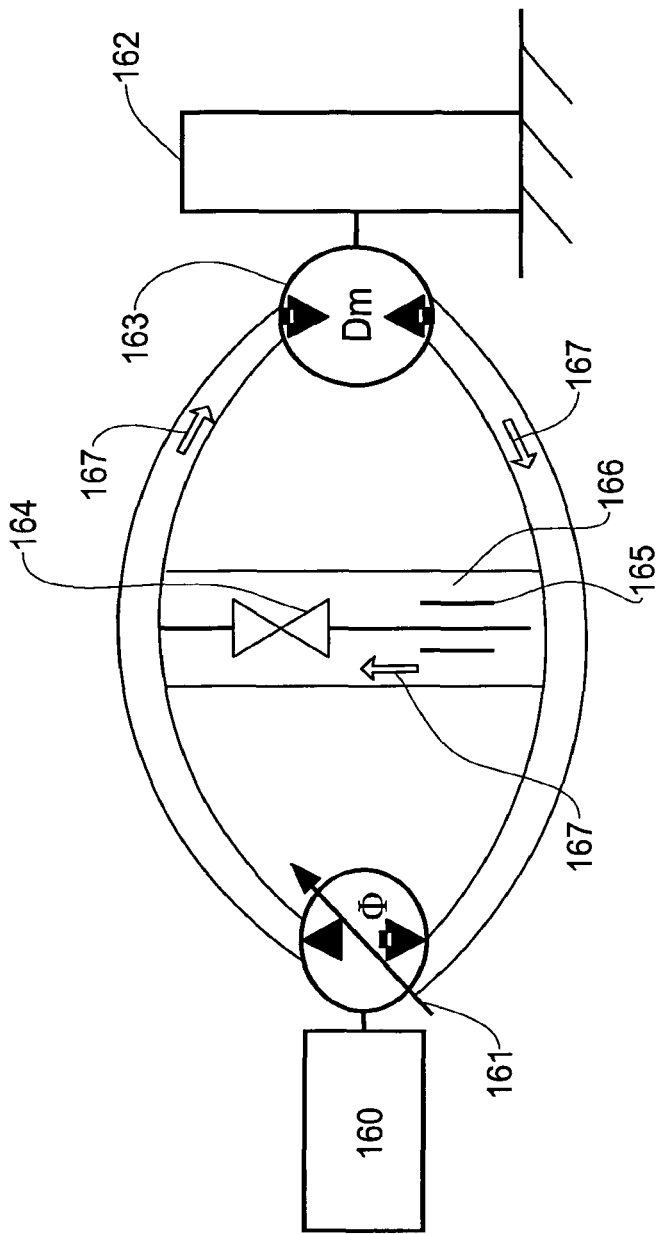
Figure 7C:
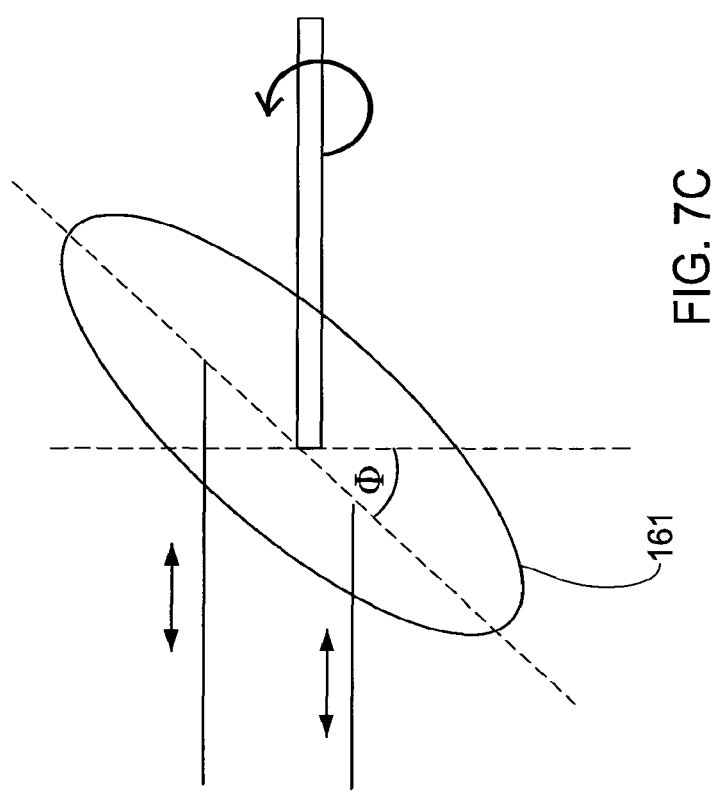

Reference is now made to FIGS. 7A and 7B, which illustrate a portion of the towbarless airplane tug, while FIG. 7C illustrates a portion of the variable angle swash plate motor. A hydrostatic drive system pressure ($P_S$) provides the traction force and will be used to control the load on the landing gear of the airplane during acceleration, deceleration and stopping, through a force control loop. Traction force target will be derived from the speed control loop, and the force control loop will define the acceleration required to reach desired speed. Speed and Force control loops output are the RPM of diesel motor 160 and the desired control angle $\Phi$ of variable angle swash plate pump 161. Speed control input (feedback) is wheels odometer signal ($\theta'$), force control input (feedback) is the force sensor signal ($\Sigma F$) and hydraulic system pressure ($P_S$), motor torque—vehicle traction force. System pressure will be limited so that the landing gear load limits will not be exceeded, at all times and in real time.

Diesel motor 160 controls hydrostatic variable displacement pumps flow rate, and motor torque controls pump pressure. The motor has a dynamic response, roughly modeled as a first order system $N_d/(\tau_d S+1)$ with time constant $\tau_d$. The revolution speed of the hydraulic motor 162 is denoted $N_d$. Hydraulic pump constant is $K_p$, the control angle of variable angle swash plate pump variable angle swash plate pump 161 is $\Phi$ and can be controlled by a valve (not shown). Hydraulic motor 162 constant is $D_m$ providing the traction torque—force $F_r$. Hydraulic system damping viscous friction is $B_h$, and vehicle mass $M_2$ that can be translated into an equivalent inertia $J_2$ as seen by the motor. There is no spring effect in the system (continuous rotation).

In order to increase bandwidth (improve speed of response) of the speed and force control loops, servo-valve 164 is installed in the hydraulic system, between motor high and low pressure lines. Servo-valve 164, a fast response valve, controls the speed and the amount of energy dissipated (absorbed). Controlled opening of the servo-valve 164 is practically "causing to leakage" through a narrowed pass 165 that slows down the vehicle, up to a complete stop (no flow through the motor—all flow dumped through the servo-valve 164). During a fast pilot braking (deceleration 0.4 g-0.5 g), the energy absorption system may bottom-up and then the vehicle impact (40 ton) is taken by the landing gear. However, even the highest possible deceleration 0.5 g will cause to F=40,000×0.5 g=20 ton on the landing gear (maximum allowed 0.15 W=60 ton for B747 for example).

FIG. 7A illustrates the flow of hydraulic fluid 167 during a non-brake period. For example it can occur when the airplane is accelerated or moves at a substantially constant speed. In this situation, the servo-valve 164 (controlling bypass path 166) is closed, so that all hydraulic fluid 167 flows between the variable angle swash plate pump 161 and the hydraulic motor 162, thus rotating the tug wheel.

FIG. 7B illustrates the flow of hydraulic fluid 167 during a brake period. Once the airplane pilot brakes the airplane, servo-valve 164 is opened, causing a leakage of hydraulic fluid 167 through a bypass path 166 entering a narrowed pass 165 that slows down the vehicle.

FIG. 7C illustrates the angle of variable angle swash plate that controls the vehicle speed. The diesel motor controls variable angle swash plate pump 161. A smaller angle will lower the pressure of the hydraulic pump, thus lowering the liquid flow and slows down the wheel.

Figure 7D:
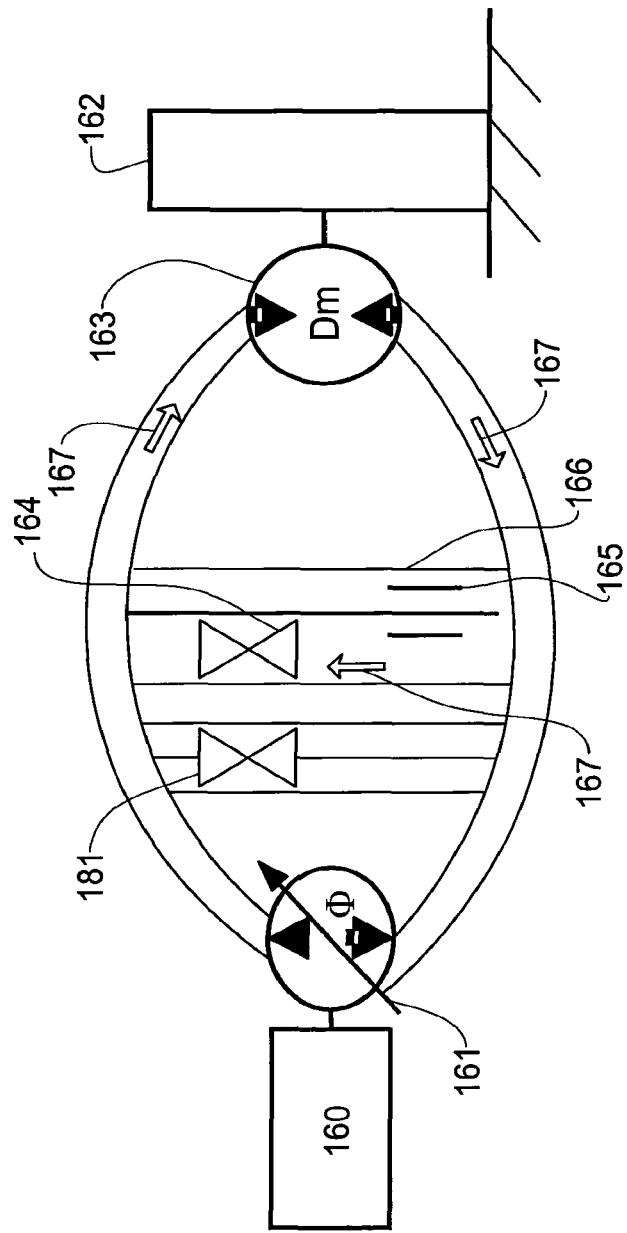

FIG. 7D illustrates that an additional bypass path 181 can be connected in parallel to the variable angle swash plate pump 161. The additional bypass path includes a servo-valve 181 and can be opened in response to either a higher than desired hydraulic fluid pressure, or in response to an output of at least one force sensor indicating airplane pilot-controlled braking of the airplane. It can be controlled by controller 119 and/or by hydraulic pressure sensing elements (not shown).

It is noted that both bypass paths can be opened when sensing a braking of the airplane, that they can be opened in parallel or in a serial manner. One of the bypass paths can be opened when sensing braking forces that exceed a first threshold, while the other is opened when sensing braking forces that exceed another threshold.

For example, both may be opened when sensing braking forces of about 0.5 g or more while only the additional bypass path may be opened when sensing braking forces that do not exceed 0.2 g.

Figure 8A:
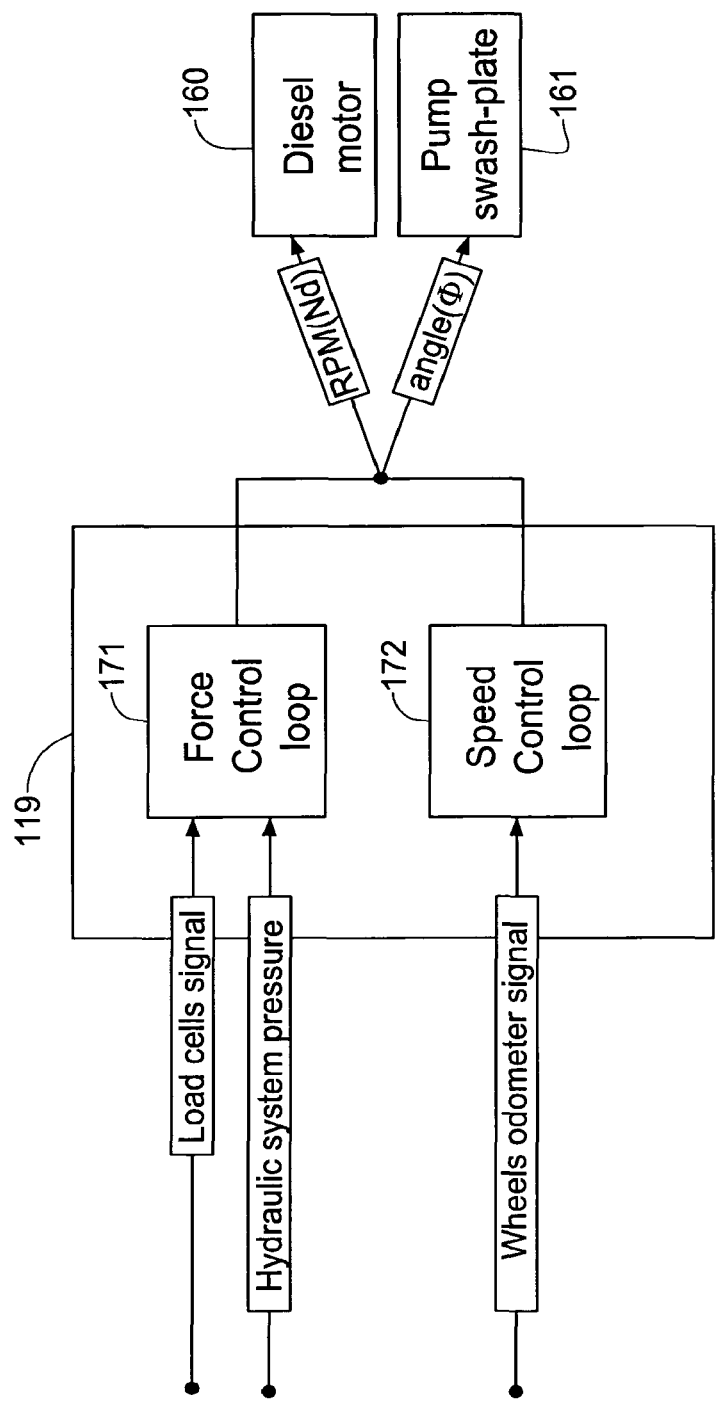
FIG. 8A is a block diagram of inputs and outputs of a force control loop and speed control loop which are part of a controller of the tug illustrated in FIG. 1.

FIG. 8A is a block diagram of the inputs and outputs of force control loop 171 speed control loop 172 which are part of controller 119. The force control loop and the speed control loop outputs are the RPM (denoted $N_d$) of diesel motor 160 and control-angle ($\Phi$) of variable angle swash plate pump 161. The input (feedback) to force control loop 171 can be a force sensor signal and hydraulic system pressure (P). Speed control loop 172 input (feedback) may be the wheels odometer signal.

Figure 8B:
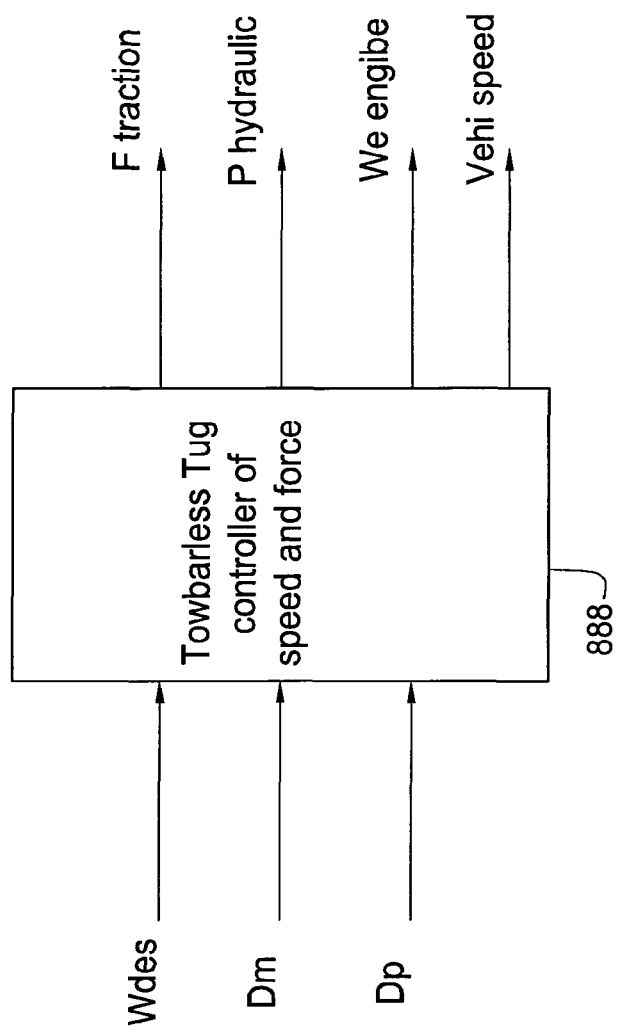
FIG. 8B is a block diagram of a Multi Input/Multi Output (MIMO) force control loop and speed control loop which are part of the controller.

FIG. 8B illustrates an example of a Multi Input/Multi Output (MIMO) controller. The controller controls the speed and force applied by the towbarless tug. It receives multiple inputs variables such as:
  $W_{des}$—towbarless tug desired speed $V_{des}$ by diesel motor speed (RPM);
  $D_p$—hydrostatic pump displacement (torque/flow $T_p=D_p \times P$, $Q_p=D_p w_e$); and
  $D_m$—hydrostatic motor displacement (torque/flow $T_m=D_m \times P$, $Q_m=D_m w_m$);
as well as outputs multiple control variables such as:
  $V_{eh}$—Vehicle Speed (which is controlled by hydraulic motor speed $W_m$);
  $F_{traction}$—Vehicle Traction Force (which is controlled by hydraulic motor pressure P); and
  $W_{e\,Motor}$—diesel motor speed.

Figure 9:
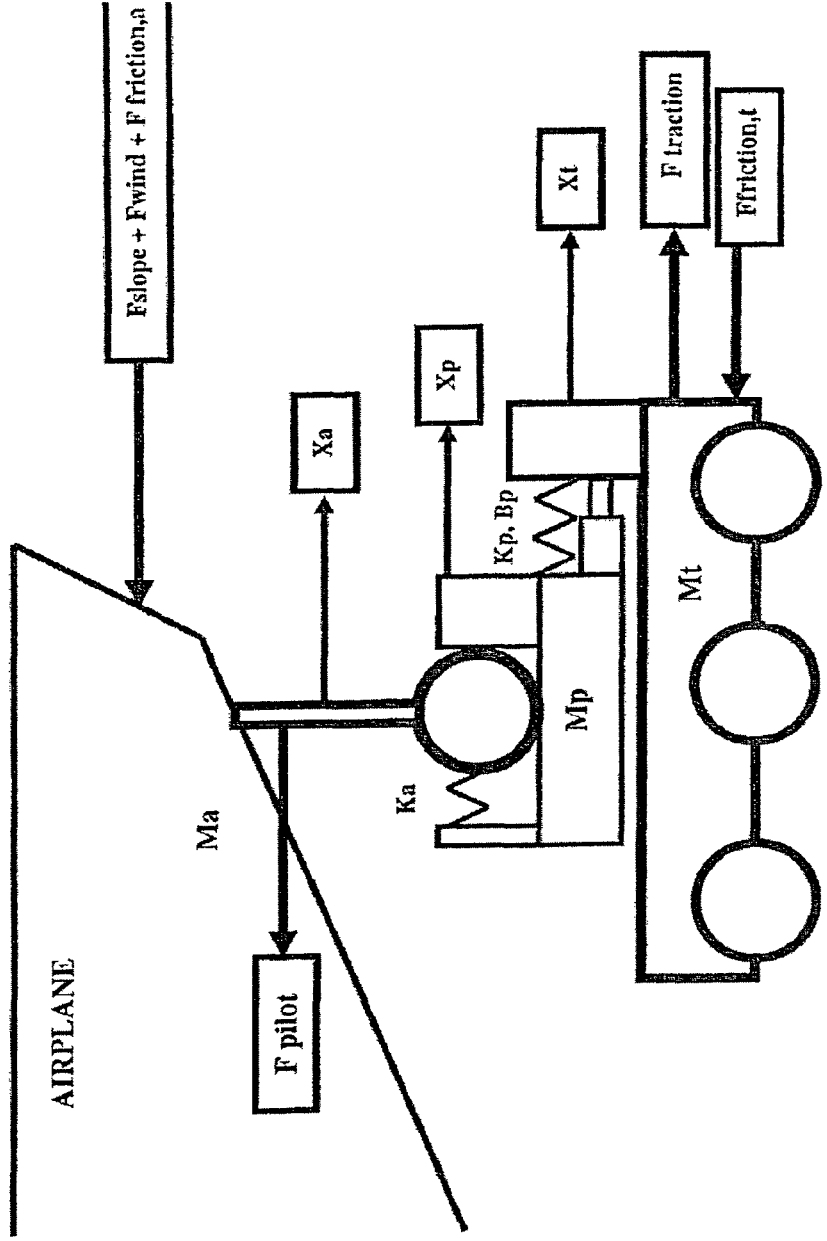
FIG. 9 illustrates a dynamic model of the towbarless tug and the airplane and forces applied on the plane and on the towbarless airplane tug illustrated in FIG. 1A.

FIG. 9 illustrates various forces applied on the plane and on the towbarless tug.

Figure 10:
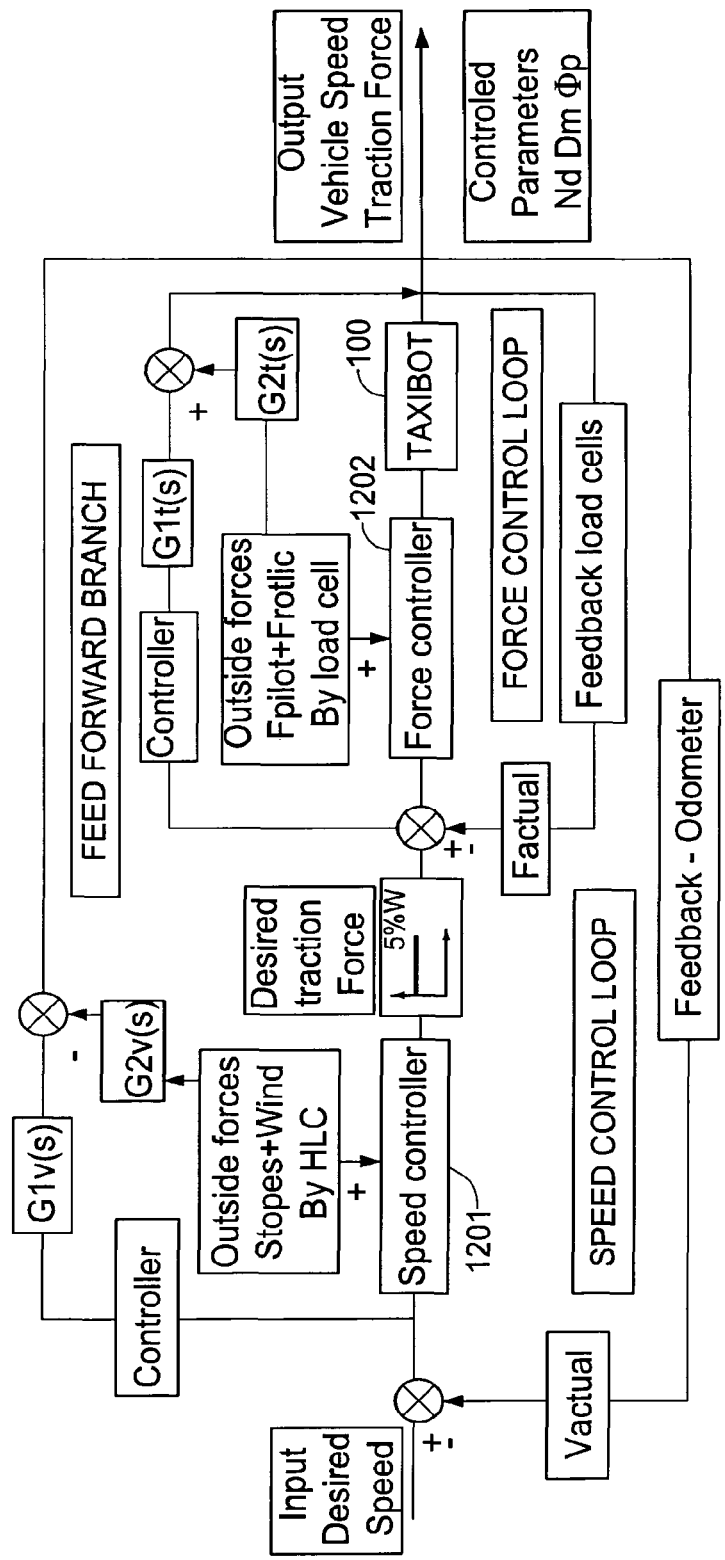
FIG. 10 illustrates various control loops.

FIG. 10 illustrates various control loops that are implemented by a controller of the towbarless airplane tug.

Figure 11:
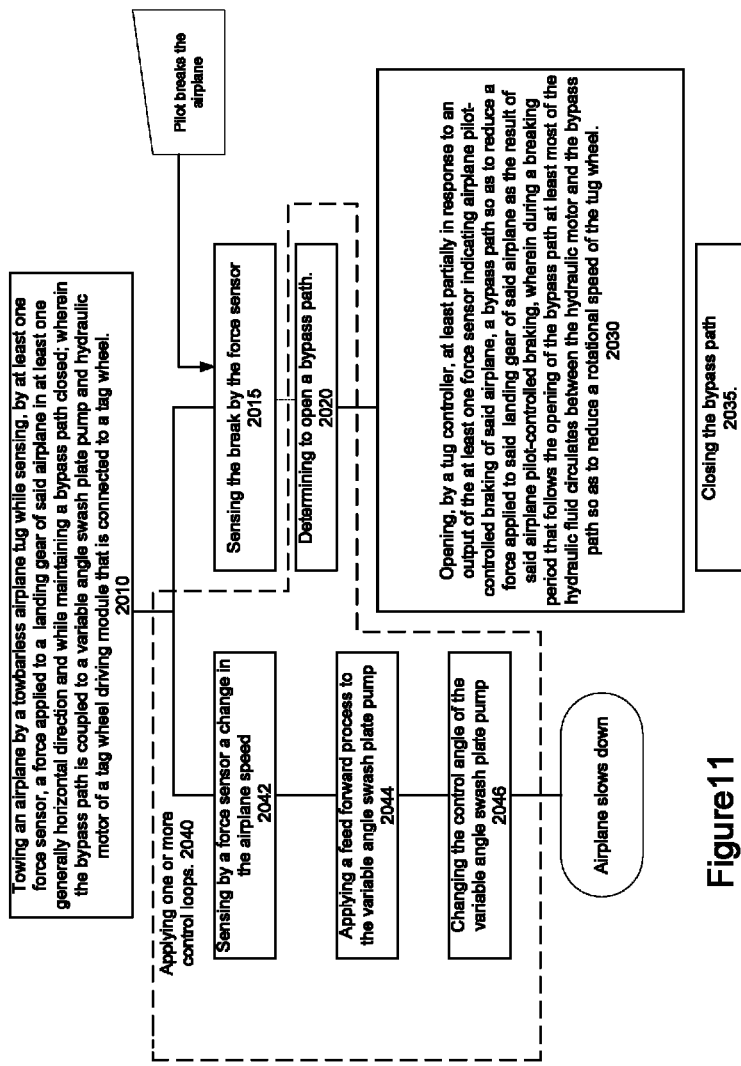
FIG. 11 illustrates a method for towing an airplane.

FIG. 11 is a flow chart of method 2000 for towing an airplane.

Method 2000 starts by stage 2010 of towing an airplane by a towbarless airplane tug while sensing, by at least one force sensor, a force applied to a landing gear of the airplane in at least one generally horizontal direction and while maintaining a bypass path closed; wherein the bypass path is coupled to a variable angle swash plate pump and hydraulic motor of a tug wheel driving module that is connected to a tug wheel.

Stage 2010 can be implemented by any of the towbarless airplane tug activities mentioned above.

Stage 2010 is followed by stage 2015 of sensing a pilot-controlled braking of the airplane. Stage 2010 is triggered by one of the force sensors.

Stage 2015 is followed by stage 2020 of determining to open a bypass path.

Stage 2020 is followed by stage 2030 of opening, by a tug controller, at least partially in response to an output of the at least one force sensor indicating airplane pilot-controlled braking of the airplane, a bypass path so as to reduce a force applied to the landing gear of the airplane as the result of the airplane pilot-controlled braking, wherein during a braking period that follows the opening of the bypass path at least most of the hydraulic fluid circulates between the hydraulic motor and the bypass path so as to reduce a rotational speed of the tug wheel.

Stage 2030 can include either one of the following or a combination thereof:
  opening a bypass path that is sized to reduce a flow of hydraulic fluid through the bypass path in relation to a flow of hydraulic fluid when the bypass path is closed;
  opening the bypass path, using a valve, within a time period that is much smaller than the brake period; and
  opening the bypass, using a valve, within a time period that is much smaller than a resonance period of the hydraulic motor.

Stage 2030 is followed by closing the bypass path. The bypass path can be closed when the force applied on the landing gear is below a threshold or when a predefined braking period ended or a combination thereof. The braking period can stop when the plane completely stops or travels at a speed that is below a predefined speed threshold.

Method 2000 can include stage 2040 of applying one or more control loops. Stage 2040 can be executed in parallel to either one of stages 2010, 2015, 2020, 2030 and 2035. Stage 2040 can include applying a speed control loop, a force control loop, a feedback and/or a feed forward loop, and the like.

Stage 2040 can include determining, by the tug controller a control angle of the variable angle swash plate pump. Conveniently, stage 2020 of determining opening the bypass path includes applying a control loop that can be triggered by an outcome of such a control loop.

Stage 2040 can include at least one of the following or a combination thereof:
  controlling the speed of the towbarless airplane tug and applying a force on the landing gear of the airplane by determining a control angle of the variable angle swash plate pump;
  introducing fast changes in the control angle of the variable angle swash plate pump to prevent a force applied on the landing gear of the airplane to exceed a force threshold;
  inducing slow changes in the control angle of the variable angle swash plate pump in response to a desired speed of the towbarless airplane tug; and applying a feed-forward process to determine the control angle of the variable angle swash plate pump.

Stage 2040 includes sub-stages of sensing a speed change of the airplane (2042), applying a feed-forward process to the variable angle swash plate pump (2044), that results changing the control angle of the variable angle swash plate pump (2046) that causes the airplane to slow down.

Figure 12:
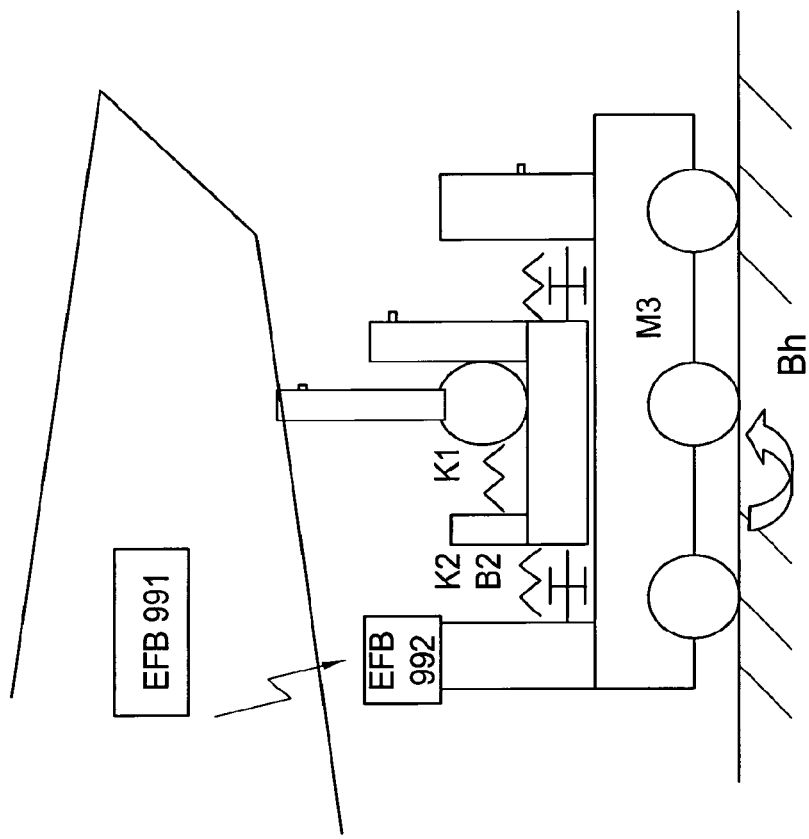
FIG. 12 illustrates towbarless tug and airplane cockpit Electronic Flight Bag (EFB) units according.

FIG. 12 illustrates the airplane as including an electronic flight bag (EFB) 991 that communicated (in a wireless manner) with an EFB 992 of the towbarless airplane tug. Both EFBs may be equipped with displays. Theses EFBs can allow a pilot to remotely control the towbarless airplane tug.

EFB 992 can communicate in a wireless manner with a remote command center such as an airport tower. The wireless communication can allow a provision of information to the airport tower and send commands to the towbarless airplane tug. Various communication protocols such as Wi-Fi, Wi-Max, Bluetooth, and the like can be used.

Figure 13:
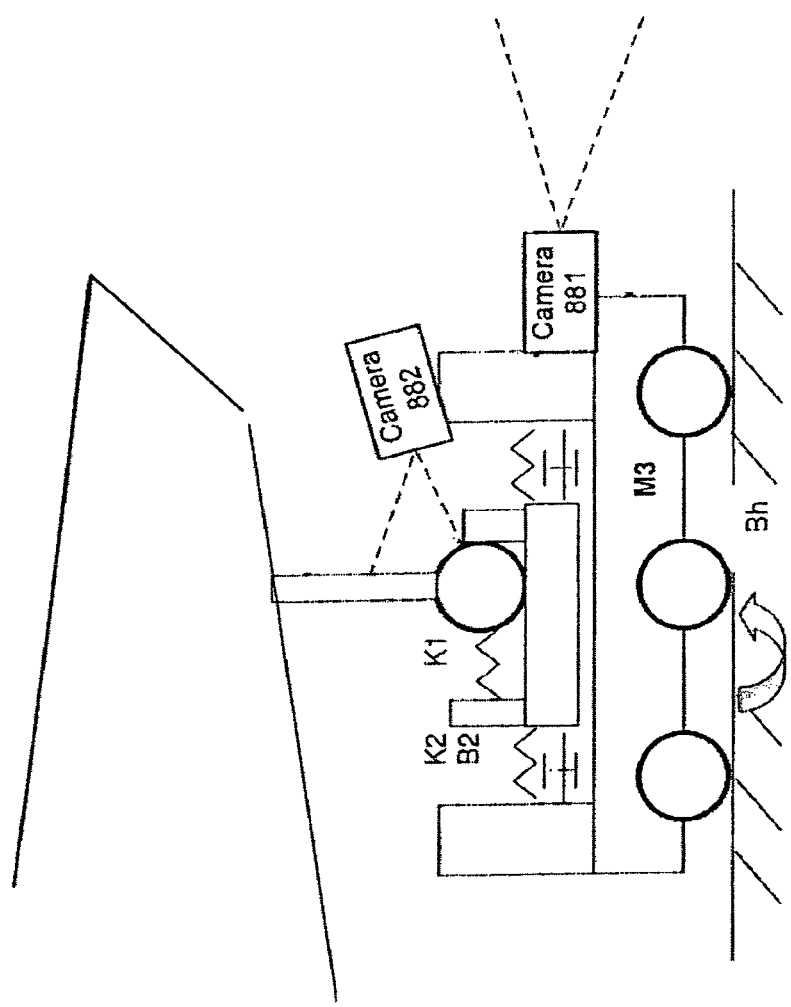
FIG. 13 illustrates towbarless airplane tugs having two cameras.

FIG. 13 illustrates the towbarless airplane tug as including a first camera 881 that is directed to the front of the towbarless airplane tug and can assist in detecting obstacles, and a second camera 882 that views support assembly 125 and can assist in monitoring the manner in which the wheel is supported by the towbarless airplane tug.

The movement of the towbarless airplane tug may be responsive to the location and movements of one or more other towbarless airplane tugs. If multiple towbarless airplane tugs share the same path (or if their paths overlap) the towing of one towbarless airplane tug should be responsive to the towing process of the other towbarless airplane tug.

Assuming that two towbarless airplane tugs are expected to tow their airplanes to the same takeoff runway—that the towing process should end at substantially the same location (which is usually the beginning of the takeoff runway), and assuming that there is a predefined timing difference between adjacent takeoffs. If, for example a first plane is expected to arrive (by towing) to the beginning of the takeoff runway at a first point in time then the second airplane should not arrive (to the beginning of the takeoff runway) until after the predefined timing difference lapsed. Typically, instead of defining a single timing difference a range of desired timing differences is defined. The timing differences are usually dependent upon the throughput of the airfield and the current air traffic load. Typical timing differences can range between one and three minutes, although this is not necessarily so.

In many cases these timing differences can be obtained by reducing the towing speed in a manner than the actual towing speed is lower than the maximum allowable towing speed. The maximum allowable towing speed is usually defined per area and is responsive to various variable such as the slope of the road, weather conditions (for example, snow, rain, strong winds), curvature of the road, and other factors which would affect the maximum allowable towing speed.

A reduction of speed can reduce air pollution and can also reduce braking attempts of the pilot.

The required speed can be calculated by the towbarless airplane tug, by a central control entity and the like. For example, one towbarless airplane tug can calculate the desired speed of one or more other towbarless airplane tugs.

Information relating to the location and additionally or alternatively the speed of towbarless airplane tugs can be transmitted from one towbarless airplane tug to another, to a central control entity, and the like. One towbarless airplane tug can relay information related to one or more other towbarless airplane tugs to each other and, additionally or alternatively, to a central control entity.

Figure 14:
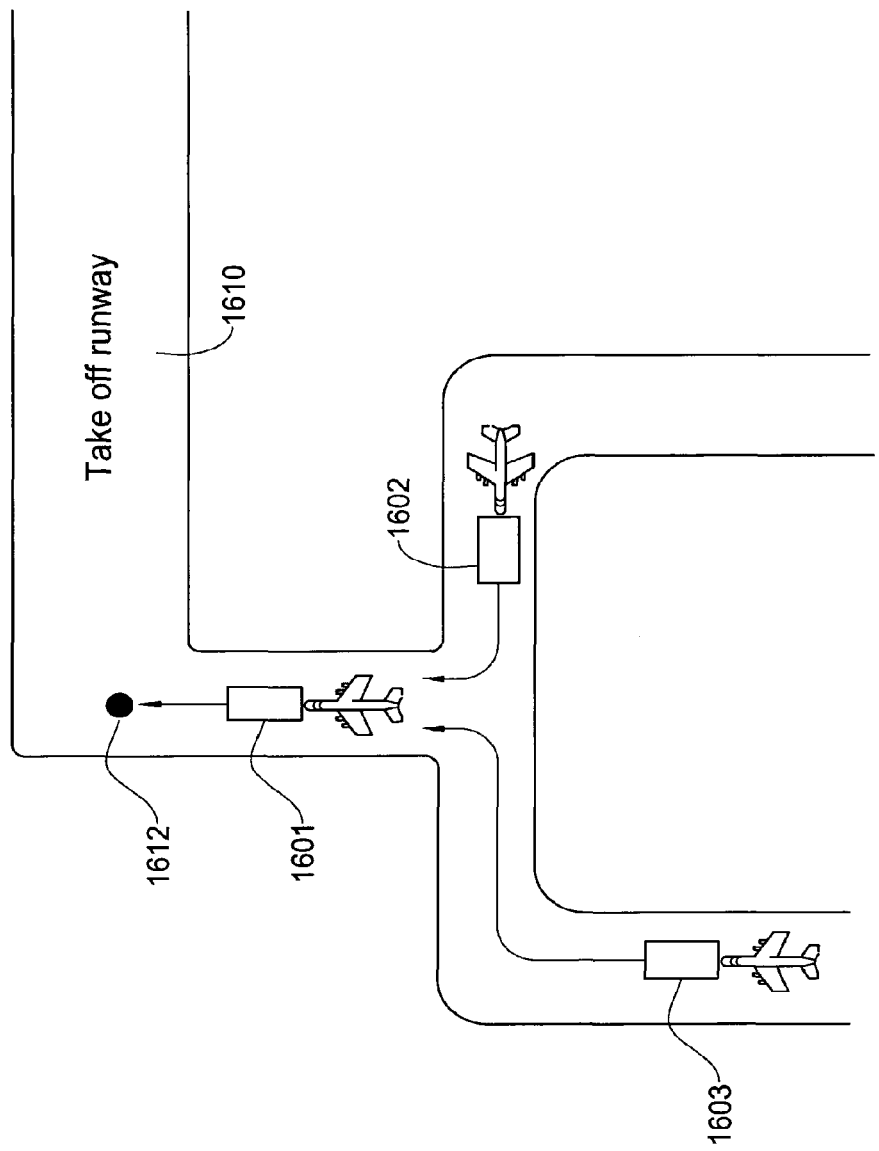
FIG. 14 illustrates the movement of several towbarless tugs in an airport.

FIG. 14 illustrates three towbarless airplane tugs 1601, 1602, and 1603. It is assumed that all three towbarless airplane tugs are expected to tow their airplanes to the same takeoff runway 1610, and that the towing should end at substantially the same location, i.e., runway area 1612. Towbarless airplane tugs 1601, 1602, and 1603 can exchange information relating to their speed and location and, additionally or alternatively, this information can be provided by a central entity such as a control system of the airport tower, such as the control system illustrated in FIG. 4E.

The three towbarless airplane tugs 1601, 1602, and 1603 may use radars or other detectors to detect the speed and/or location of each other.

It is assumed that towbarless airplane tug 1601 precedes towbarless airplane tug 1602 and that towbarless airplane tug 1603 follows towbarless airplane tug 1602. It is also assumed that an allowed timing difference range is defined, for example ranging between $\Delta t_1$ and $\Delta t_2$.

Towbarless airplane tug 1602 is expected to arrive to location 1612 at a first point in time $t_1$. This expected time of arrival can be calculated or measured (if towbarless airplane tug 1602 already arrived to runway area 1612) by either one of towbarless airplane tugs 1601, 1602, and 1603 or by another entity and can be sent to towbarless airplane tugs 1602 and 1603.

The towing scheme of towbarless airplane tug 1602 can be designed so that it will arrive to runway area 1612 at a second point of time $t_2$, wherein $t_2$ ranges between $(t_1+\Delta t_1)$ and $(t_1+\Delta t_2)$. The towing scheme includes the desired speed along the path that leads to location 1612. In any case the desired speed should not exceed the allowable speed as dictated by road and air conditions. The towing scheme can be calculated by a central control entity or towbarless airplane tug 1602 but it can also be calculated by another towbarless airplane tug.

The towing scheme of towbarless airplane tug 1603 can be designed so that it will arrive to runway area 1612 at a third point of time $t_3$. $t_3$ ranges between $(t_2+\Delta t_1)$ and $(t_2+\Delta t_2)$. The towing scheme includes the desired speed along the path that leads to location 1612. In any case the desired speed should not exceed the allowable speed as dictated by road and air conditions. The towing scheme may be calculated by a central control entity, by towbarless airplane tug 1603, or by another towbarless airplane tug.

A cruise control scheme may be applied by the towbarless airplane tug.

The cruise control scheme allows a pilot to dictate the actual speed of the towbarless airplane tug by maintaining the speed of the airplane within a predefined speed range during a predefined period, for example in cases where the actual speed of the towbarless airplane tug is lower than a desired speed of the towbarless airplane tug.

The cruise control scheme allows a pilot to dictate the actual speed of the towbarless airplane tug by performing a pilot controlled braking or deceleration—in case that the actual speed of a towbarless airplane tug is higher than the desired speed of the towbarless airplane tug.

The pilot can exit the cruise control, and thus allow the towbarless airplane tug to attempt to match its actual speed to a desired speed, by pushing the brakes and disconnecting the cruise control mechanism.

Figure 15:
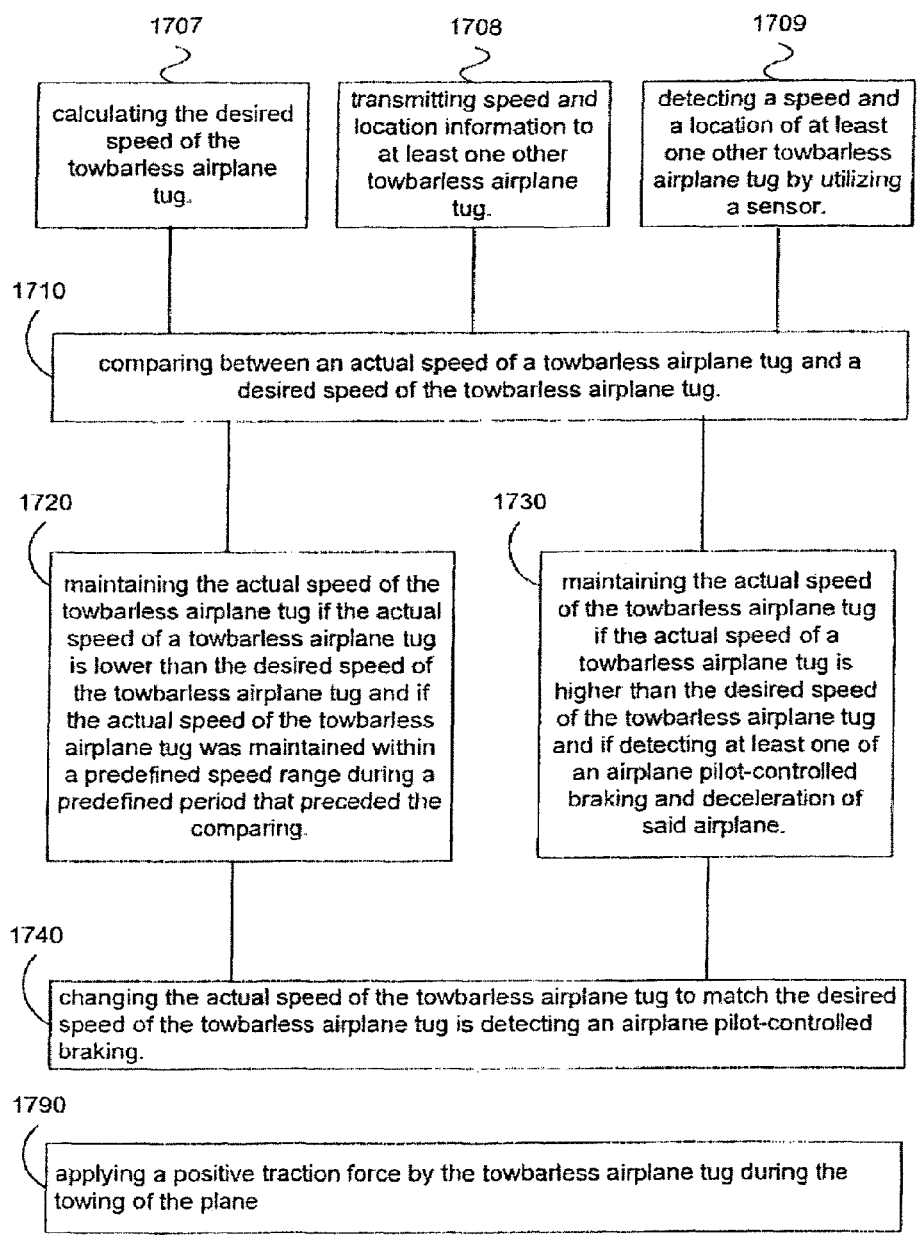
FIG. 15 illustrates a method for towing an airplane.

FIG. 15 illustrates method 1700 for towing an airplane.

Method 1700 starts by any one of stages 1707, 1708, and 1709.

Stage 1707 includes calculating the desired speed of the towbarless airplane tug. Stage 1707 can include at least one of the following:

calculating the desired speed of the towbarless airplane tug based upon its location;

calculating the desired speed of the towbarless airplane tug based upon its location and a location of at least one other towbarless airplane tug;

calculating the desired speed of the towbarless airplane tug based upon its location and a location and a speed of at least one other towbarless airplane tug that shares at least one path with the towbarless airplane tug;

calculating the desired speed of the towbarless airplane tug based upon its location and a desired time of arrival of the towbarless airplane tug to an end of towing location; and calculating the desired speed of the towbarless airplane tug based upon its location, an estimated time of arrival of another towbarless airplane tug to an end of towing point, and a desired time of arrival of the towbarless airplane tug to the end of towing location.

Stage 1708 includes transmitting speed and location information to at least one other towbarless airplane tug. Stage 1708 can include transmitting speed and location information to a remote command center and receiving from the remote command center speed and location information of at least one other towbarless airplane tug.

Stage 1709 includes detecting a speed and a location of at least one other towbarless airplane tug by utilizing a sensor such as a radar or laser sensor or alike.

Stages 1707, 1708, and 1709 are followed by stage 1710 of comparing between an actual speed of a towbarless airplane tug and a desired speed of the towbarless airplane tug. The actual speed can be measured and the desired speed can be received by the towbarless airplane tug or can be calculated by the towbarless airplane tug.

Stage 1710 is followed by stage 1720 of maintaining the actual speed of the towbarless airplane tug if the actual speed of a towbarless airplane tug is lower than the desired speed of the towbarless airplane tug, and if the actual speed of the towbarless airplane tug was maintained within a predefined speed range during a predefined period that preceded the comparing. The predefined speed range can be a relatively narrow range.

Stage 1710 can also be followed by stage 1730 of maintaining the actual speed of the towbarless airplane tug if the actual speed of a towbarless airplane tug is higher than the desired speed of the towbarless airplane tug and if detecting at least one of an airplane pilot-controlled braking and deceleration of the airplane.

Stages 1720 and 1730 can be followed by stage 1740 of changing the actual speed of the towbarless airplane tug to match the desired speed of the towbarless airplane tug is detecting an airplane pilot-controlled braking.

Method 1700 can also include stage 1790 of applying a positive traction force by the towbarless airplane tug during the towing of the plane. By applying only can be extended or not affected by the additional forces applied by the tug.

Figure 16:
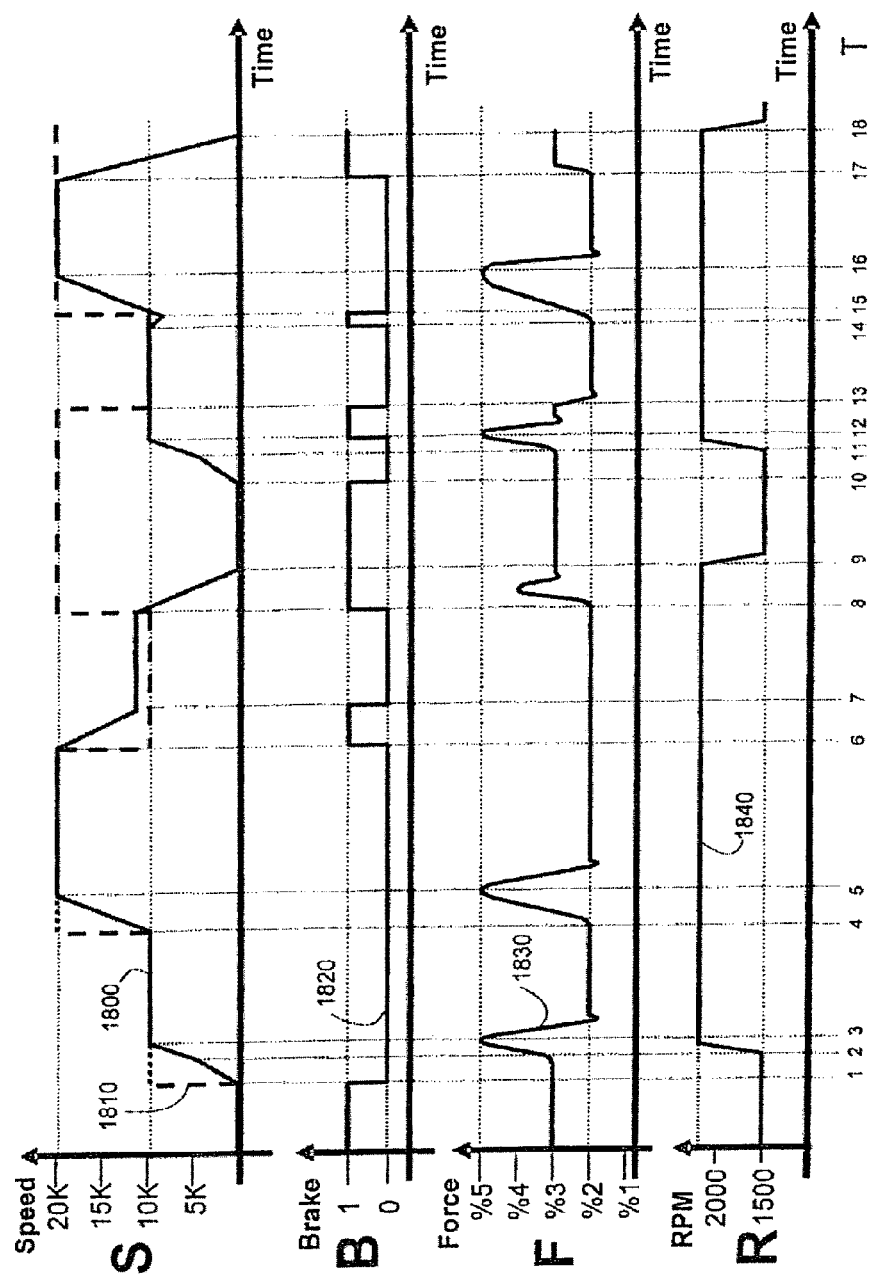
FIG. 16 are plots of speed, pilot brake, traction force, and motor RPM, each as function of time, and related to desired and actual speed of towbarless airplane tugs.

FIG. 16 is a timing diagram that illustrates a relationship between desired speed and actual speed.

By way of explanation, FIG. 18 includes speed values, force value, and RPM values. These are non-limiting examples of speeds, forces, and RPMs.

The timing diagram illustrates an example of changes (over time) of a desired speed of a towbarless tug (also referred to "desired speed"), an actual speed of a towbarless tug (also referred to "actual speed"), braking applied by a pilot, force applied on the landing gear of the airplane (that is supported by the towbarless airplane tug) and revolution rate of a diesel motor of the towbarless airplane tug.

Table 1 illustrates these values during points in time $t_0$-$t_{18}$.

TABLE 1

| Time | Desired speed | Actual speed | Braking applied by pilot? | Force applied on landing gear by tug - percent of airplane takeoff weight | RPM of diesel motor |
|---|---|---|---|---|---|
| $t_0$ | 0 | 0 | Yes | 3% | 1500 |
| $t_1$ | 10 | 0 | No | 3% | 1500 |
| $t_2$ | 10 | 5 | No | 3-5% | 2200 |
| $t_3$ | 10 | 10 | No | 5-2% | 2200 |
| $t_4$ | 20 | 10 | No | 2% | 2200 |
| $t_5$ | 20 | 20 | No | 5% | 2200 |
| $t_6$ | 10 | 20 | Yes | 2% | 2200 |
| $t_7$ | 10 | 11 | No | 2% | 2200 |
| $t_8$ | 20 | 11 | Yes | 2% | 2200 |
| $t_9$ | 20 | 0 | Yes | 3% | 2200 |
| $t_{10}$ | 20 | 0 | No | 3% | 1500 |
| $t_{11}$ | 20 | 5 | No | 3-5% | 2200 |
| $t_{12}$ | 20 | 10 | Yes | 5% | 2200 |
| $t_{13}$ | 10 (20) | 10 | No | 2% | 2200 |
| $t_{14}$ | 10 (20) | 10 | Yes | 2% | 2200 |
| $t_{15}$ | 20 | 8 | No | 3-5% | 2200 |
| $t_{16}$ | 20 | 20 | No | 5% | 2200 |
| $t_{17}$ | 20 | 20 | No | 2% | 2200 |
| $t_{18}$ | 20 | 0 | Yes | 3% | 1500 |

The towing process starts at $t_1$. Between $t_0$ and $t_1$ the pilot presses the brakes and the towbarless airplane tug is motionless.

At $t_1$ the towbarless airplane tug starts moving and its actual speed increases until it reaches (at $t_3$) a desired speed of 10 knots. At $t_4$ the desired speed increases to 20 knots and between $t_4$ and $t_5$ the speed of the towbarless airplane tug increases until it reaches (at $t_5$) the desired speed of 20 knots. Between $t_5$ and $t_6$ the actual speed and the desired speed are equal to 20 knots and the tug maintains its speed. Between $t_6$ and $t_7$ the pilot presses the brakes (because of a possible turning maneuver with a lower desired speed of 10 knots) and the actual speed of the towbarless airplane tug decreases to 11 knots until $t_8$. Between $t_8$ and $t_{10}$ the pilot hits the brakes and although the desired speed is 20 knots the actual speed decreases to zero (at $t_9$) and is maintained at this level until $t_{10}$. Between $t_{10}$ and $t_{12}$ the speed of the tug increases to 10 knots. Between $t_{12}$ and $t_{13}$ the pilot maintains the speed of the airplane to about 10 knots and this causes the desired speed to be changed to 10 knots. In other words, the pilot sets the cruise speed to be 10 knots. This speed is maintained until the pilot presses the brakes during a short period (between $t_{14}$ and $t_{15}$) and disconnects the cruise control. Accordingly, the desired speed is reset to 20 knots and between $t_{15}$ and $t_{16}$ the speed increases until it reaches 20 knots. At $t_{17}$ the pilot starts a braking session that causes the towbarless airplane tug to stop.

The timing diagram also illustrates that these accelerations and decelerations may result in changes in the force applied on the landing gear by the towbarless airplane tug. Peaks are detected at $t_3$, $t_5$, between $t_8$ and $t_9$, at $t_{12}$, and at $t_{16}$.

FIG. 17 illustrates method 1900 for controlling a towbarless airplane tug.

Method 1900 starts by stage 1910 of obtaining, by the towbarless airplane tug, speed and location information of at least one other towbarless airplane tug that are expected to share at least a portion of a towing path with the towbarless airplane tug.

Stage 1910 is followed by stage 1920 of calculating the desired speed of the towbarless airplane tug based upon a speed and a location of the towbarless airplane tug and the speed and location information.

Stage 1920 can be followed by either one of stages 1930 and 1940.

Stage 1930 includes providing the desired speed to the towbarless airplane tug. Stage 1930 is followed by stage 1940 of determining the actual speed of the towbarless airplane tug in response to the desired speed.

Stage 1940 is followed by stage 1950 of towing an airplane by the towbarless airplane tug in response to the desired speed.

Method 1900 can include applying a cruse control scheme, and additionally or alternatively, determining a desired speed based upon at least one other towbarless airplane tug speed and/or location.

Stage 1920 can include at least one of the following:
  calculating the desired speed of the towbarless airplane tug based upon a location of the towbarless airplane tug and a desired time of arrival of the towbarless airplane tug to an end of towing location; and
  calculating the desired speed of the towbarless airplane tug based upon a location of the towbarless airplane tug, an estimated time of arrival of at least one other towbarless airplane tug to an end of towing point and desired time of arrival of the towbarless airplane tug to the end of towing location.

Method 1900 can also include one or more of the following stages:
  stage 1990 of transmitting speed and location information to at least one other towbarless airplane tug;
  stage 1992 of transmitting speed and location information to a remote command center;
  stage 1993 of receiving from the remote command center speed and location information of at least one other towbarless airplane tug; and
  stage 1994 of detecting a speed and a location of at least one other towbarless airplane tug by utilizing a sensor such as a radar, laser sensor, or the like.

The controller 119 of towbarless airplane tug 100 can participate in the execution of either one of methods 1700 and 1900.

For example, controller 119 can be configured to perform at least one of the following operations or a combination thereof:
  comparing between an actual speed of a towbarless airplane tug and a desired speed thereof;
  controlling the at least one tug wheel driver to maintain the actual speed of the towbarless airplane tug if the actual speed of a towbarless airplane tug is lower than the desired speed of the towbarless airplane tug, and if the actual speed of the towbarless airplane tug was maintained within a predefined speed range (for example, a narrow predefined range) during a predefined period that preceded the comparing;
  controlling the at least one tug wheel driver to maintain the actual speed of the towbarless airplane tug if the actual speed of a towbarless airplane tug is higher than the desired speed of the towbarless airplane tug, and if at least one of an airplane pilot-controlled braking and deceleration of the airplane is detected;
  controlling the at least one tug wheel driver to change the actual speed of the towbarless airplane tug to match the desired speed of the towbarless airplane tug if an airplane pilot-controlled braking is detected;
  calculating the desired speed of the towbarless airplane tug;
  calculating the desired speed of the towbarless airplane tug based upon a location of the towbarless airplane tug;
  calculating the desired speed of the towbarless airplane tug based upon its location and a location of at least one other towbarless airplane tug;
  calculating the desired speed of the towbarless airplane tug based upon its location and a location and a speed of at least one other towbarless airplane tug that shares at least one path with the towbarless airplane tug;
  calculating the desired speed of the towbarless airplane tug based upon its location and a desired time of arrival of the towbarless airplane tug to an end of towing location; and
  calculating the desired speed of the towbarless airplane tug based upon its location, an estimated time of arrival of another towbarless airplane tug to an end of towing point, and desired time of arrival of the towbarless airplane tug to the end of towing location.

In accordance with another example, controller 119 can be configured to perform at least one of the following operations or a combination thereof:
  receive speed and location information of at least one other towbarless airplane tug that are expected share at least a portion of a towing path with the towbarless airplane tug;
  calculate the desired speed of the towbarless airplane tug based upon its speed and location and the speed and location information;
  calculate the desired speed of the towbarless airplane tug based upon its location and a desired time of arrival of the towbarless airplane tug to an end of towing location; and
  calculate the desired speed of the towbarless airplane tug based upon its location, an estimated time of arrival of at least one other towbarless airplane tug to an end of towing point, and desired time of arrival of the towbarless airplane tug to the end of towing location.

The towbarless airplane tug may include a receiver and a transmitter. Referring to the example set fourth in FIG. 4E, they may be included in or otherwise integrated within controller 119. The transmitter can be arranged to transmit speed and location information to at least one other towbarless airplane tug. The transmitter can transmit speed and location information to a remote command center (such as the control system in the airport tower) and the receiver can receive from the remote command center speed and location information of at least one other towbarless airplane tug.

The towbarless airplane tug may further include a radar, laser sensor, or the like, that is configured to detect a speed and a location of at least one other towbarless airplane tug. The radar, laser sensor, or the like may have a range of few hundred meters and may operate at very high frequencies (40 GHz and above).

It will be appreciated by persons skilled in the art that the present invention is not limited by what has been particularly shown and described hereinabove. Rather the invention includes both combinations and sub-combinations of various features described hereinabove as well as modifications thereof which would occur to persons skilled in the art upon reading the foregoing description and which are not in the prior art. In addition, those skilled in the art to which this invention pertains will readily appreciate that numerous changes, variations and modifications can be made without departing from the scope of the invention mutatis mutandis.

The invention claimed is:

1. A towbarless airplane tug configured for receiving a landing gear of an airplane and towing the airplane thereby at an actual speed, said towbarless airplane tug comprising:
  a chassis configured for receiving thereon at least a portion of said landing gear;
  a propulsion arrangement configured to move the towbarless airplane tug in a direction along a trajectory; and a controller configured to compare between the actual speed of the towbarless airplane tug, when towing the airplane, and a predetermined desired speed thereof, and to direct said propulsion arrangement to maintain the actual speed of the towbarless airplane tug if:

the actual speed is lower than the desired speed; and the actual speed was maintained within a predefined speed range during a predefined period that preceded the comparing.

2. The towbarless airplane tug according to claim 1 wherein the controller is further configured to detect airplane pilot-controlled braking and deceleration of the airplane, and is further configured to direct said propulsion arrangement to maintain the actual speed if:

the actual speed is higher than the desired speed; and at least one of an airplane pilot-controlled braking and deceleration of said airplane is detected.

3. The towbarless airplane tug according to claim 2, wherein the controller is further configured to direct said propulsion arrangement to change the actual speed of the towbarless airplane tug to match the desired speed if an airplane pilot-controlled braking is detected.

4. The towbarless airplane tug according to claim 1, being further configured to apply a positive traction force at all times during a towing of the airplane.

5. The towbarless airplane tug according to claim 1, being further configured to protect in real time the landing gear from exceeding its maximum allowed fatigue load.

6. The towbarless airplane tug according to claim 1, wherein the controller is further configured to calculate the desired speed.

7. The towbarless airplane tug according to claim 1, wherein the controller is further configured to calculate a desired traction force corresponding to the desired speed.

8. The towbarless airplane tug according to claim 1, wherein the controller is further configured to calculate the desired speed at least based upon a location of the tug.

9. The towbarless airplane tug according to claim 1, wherein the controller is further configured to calculate the desired speed at least based upon a location of the tug and a location of at least one other tug.

10. The towbarless airplane tug according to claim 1, wherein the controller is further configured to calculate the desired speed at least based upon a location of the tug and a location and a speed of at least one other tug that shares at least one path therewith.

11. The towbarless airplane tug according to claim 1, wherein the controller is further configured to calculate the desired speed at least based upon a location of the tug and a desired time of arrival thereof at an end of towing location.

12. The towbarless airplane tug according to claim 1, wherein the controller is further configured to calculate the desired speed at least based upon a location of the tug, an estimated time of arrival of another tug at an end of towing point, and a desired time of arrival of the tug at the end of towing location.

13. The towbarless airplane tug according to claim 1, further comprising a detector configured to detect a speed and a location of at least one other tug by utilizing a sensor; said controller being configured to calculate the desired speed at least based upon the speed and location of said other tug.

14. The method according to claim 1, wherein said tug obtains said information relating to speed and location of at least one other tug utilizing a sensor.

* * * * *